US006313789B1

(12) United States Patent
Zhodzishsky et al.

(10) Patent No.: US 6,313,789 B1
(45) Date of Patent: Nov. 6, 2001

(54) JOINT TRACKING OF THE CARRIER PHASES OF THE SIGNALS RECEIVED FROM DIFFERENT SATELLITES

(75) Inventors: Mark Zhodzishsky, Moscow (RU); Javad Ashjaee, Saratoga, CA (US)

(73) Assignee: Topcon Positioning Systems, Inc., Pleasanton, CA (US)

( * ) Notice: Subject to any disclaimer, the term of this patent is extended or adjusted under 35 U.S.C. 154(b) by 0 days.

(21) Appl. No.: 09/330,221

(22) Filed: Jun. 10, 1999

Related U.S. Application Data

(60) Provisional application No. 60/091,004, filed on Jun. 10, 1998.

(51) Int. Cl.[7] .................................................. H04B 7/185
(52) U.S. Cl. ....................................................... 342/357.12
(58) Field of Search ........................ 342/357.12, 357.02, 342/357.03; 375/343

(56) References Cited

U.S. PATENT DOCUMENTS

| 4,809,005 | * | 2/1989 | Counselman, III | ............. | 342/357.12 |
| 4,894,662 | * | 1/1990 | Counselman | .................... | 342/357.12 |
| 5,398,034 | | 3/1995 | Spilker, Jr. | ............................ | 342/357 |
| 5,864,315 | * | 1/1999 | Welles, II et al. | .............. | 342/357.12 |
| 5,901,183 | * | 5/1999 | Garin et al. | .......................... | 375/343 |

OTHER PUBLICATIONS

Global Positioning System: Theory and Applications, vol. I—vol. 163, Progress in Astronautics and Aeronautics, Published by the American Institute of Aeronautics, Inc., pp. 245–327, 1996.

\* cited by examiner

Primary Examiner—Daniel T. Pihulic
(74) Attorney, Agent, or Firm—Coudert Brothers

(57) ABSTRACT

Disclosed are methods for increasing the fail-safety characteristics of tracking systems for navigation receivers which receive signals from many satellites. In an exemplary embodiment of the present invention, an individual PLL circuit is used to track the phase of each satellite's carrier signal, and a vector common tracking loop is used to track the disturbances of the carrier phases which are caused by one or more common sources, such as the movement of the receiver's antenna(s) and/or the phase fluctuation of the receiver's main reference oscillator. The vector common tracking loop uses phase information from all of the satellites being tracked, and for this reason can be made more wide-band than each of the individual PLL circuits. The wider bandwidth of the vector common tracking loop provides higher dynamic properties and more safe tracking when faint and weakening satellite signals are present. In another embodiment of the invention, the receiver receives the satellite signals from $M \geq 3$ antennas mounted on a common object, and three common tracking loops are added to track the object's rotation about its three rotational axes. The common object may comprise any structure, rigid member, or vehicle, such as for example: a platform, pole, aircraft, ship, boat, car, truck, train car, etc. With N satellites being tracked with M antennas, this embodiment performs the joint tracking of up to N×M signals, which increases tracking reliability. The present invention may be used in digital receivers of GPS and GLONASS(GLN) systems where the receiver receives a large number of such signals from many satellites and processes them in order to receive information about the current time and the location and movement of the receiver.

90 Claims, 14 Drawing Sheets

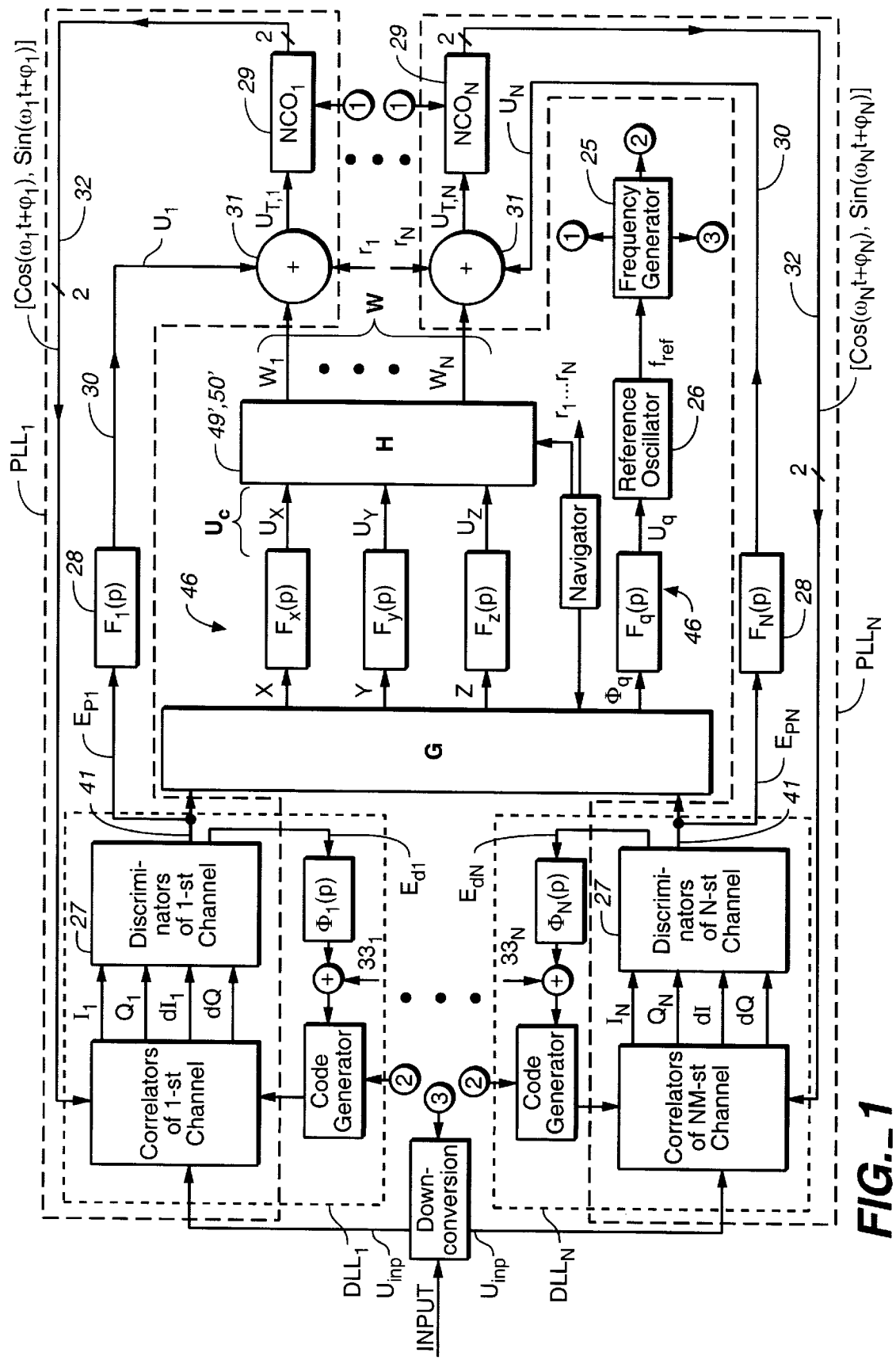
FIG._1

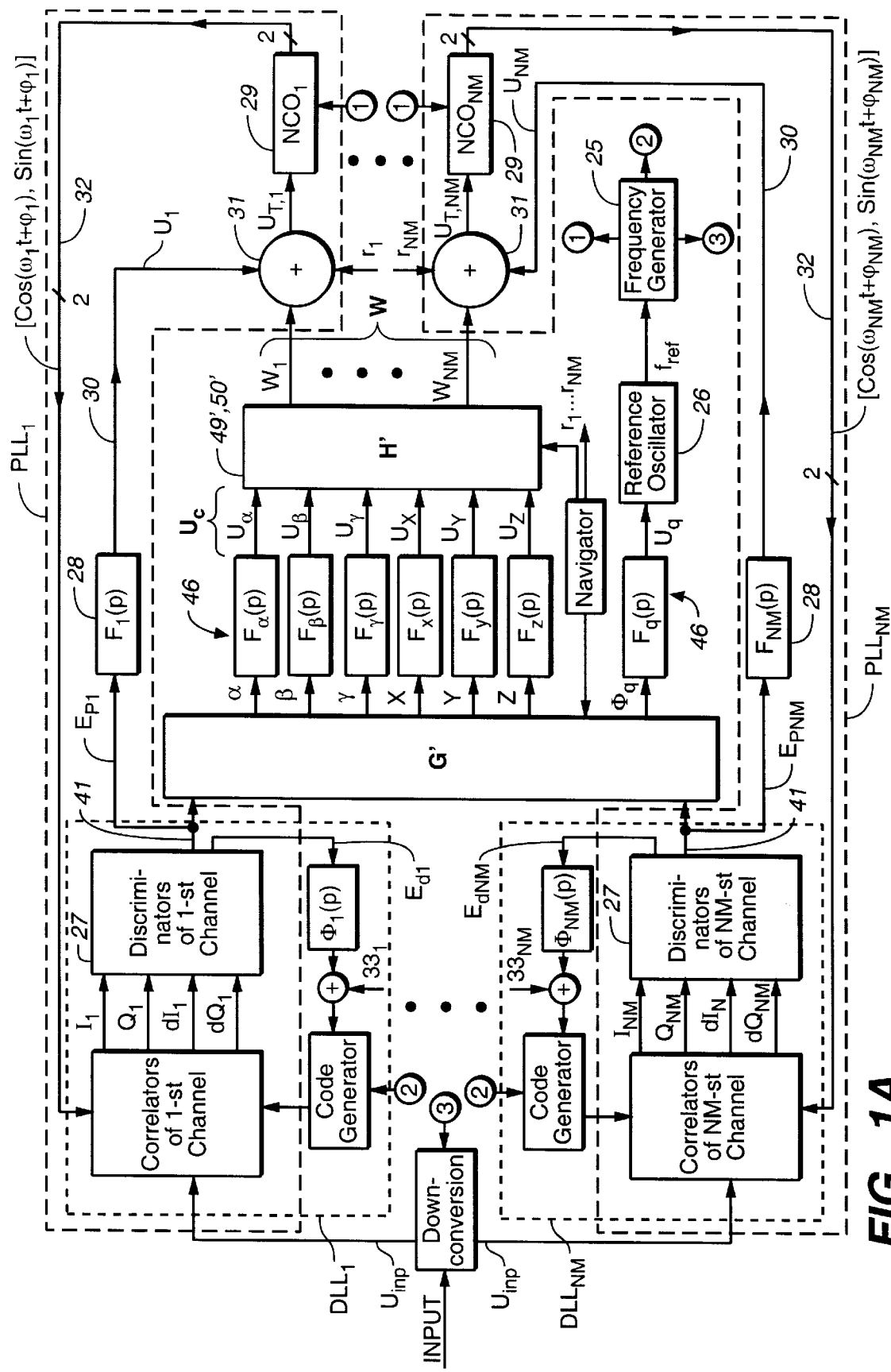
FIG._1A

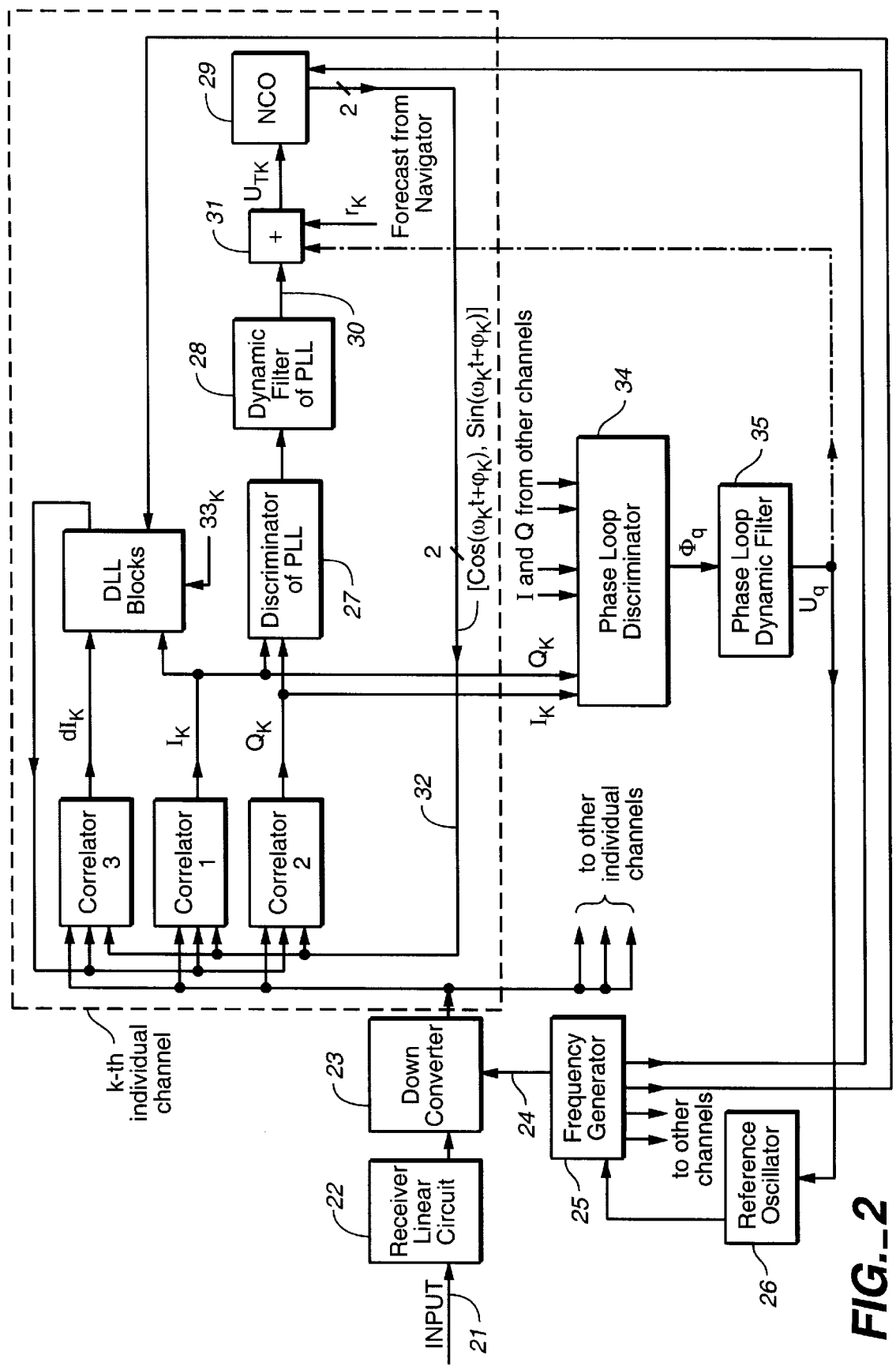
FIG._2

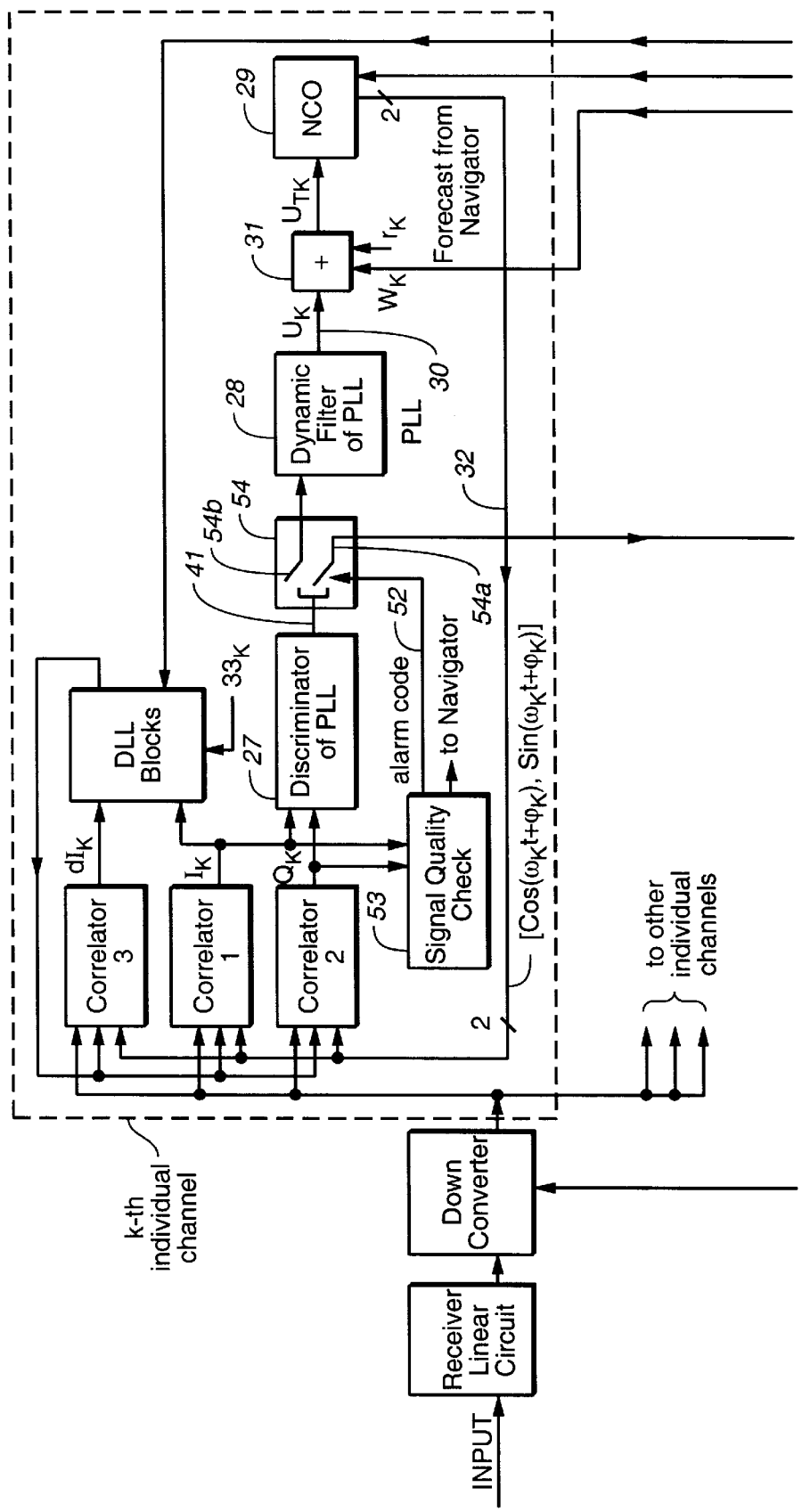
FIG._3A
FIG._3
FIG._3A
FIG._3B

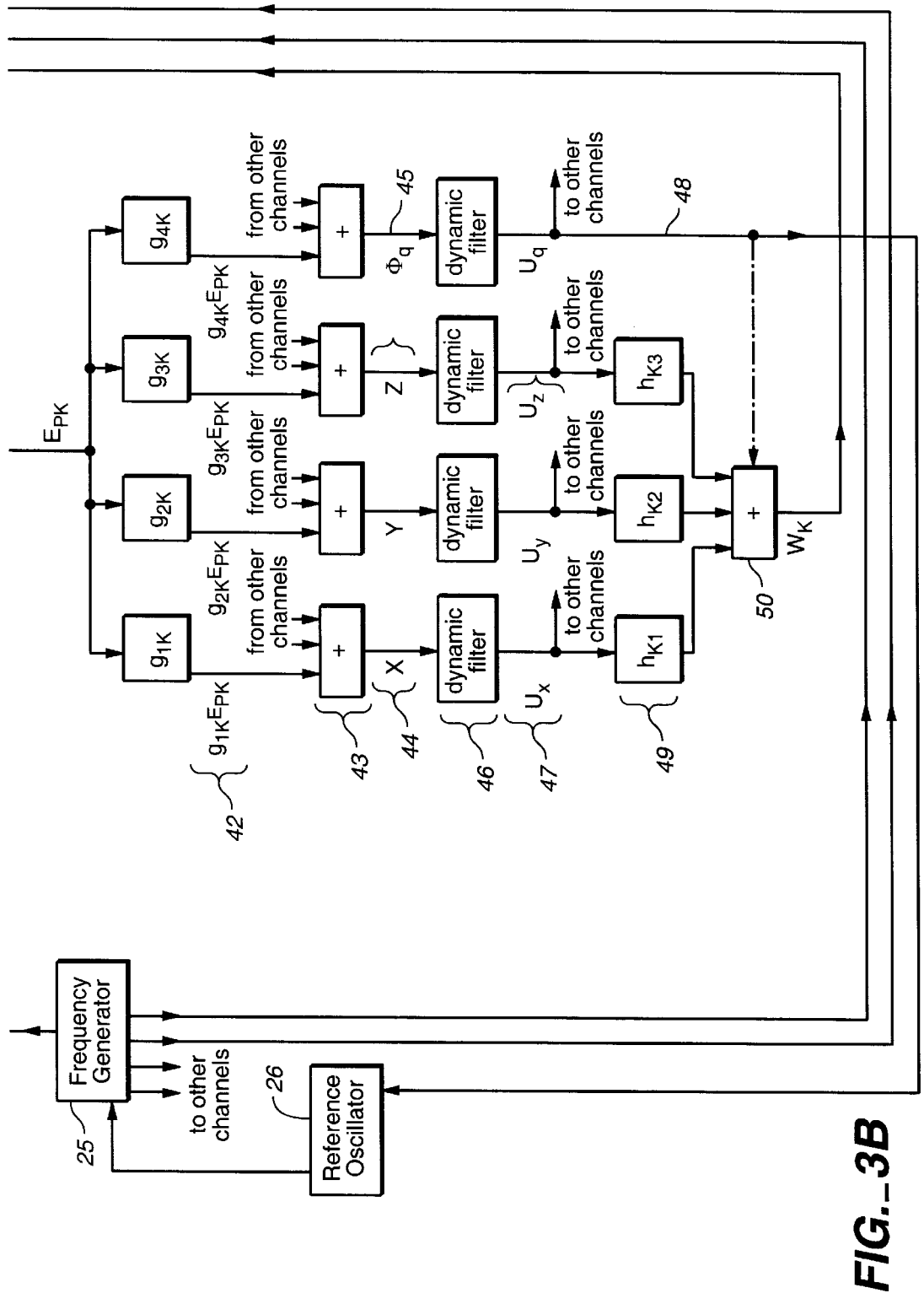
FIG._3B

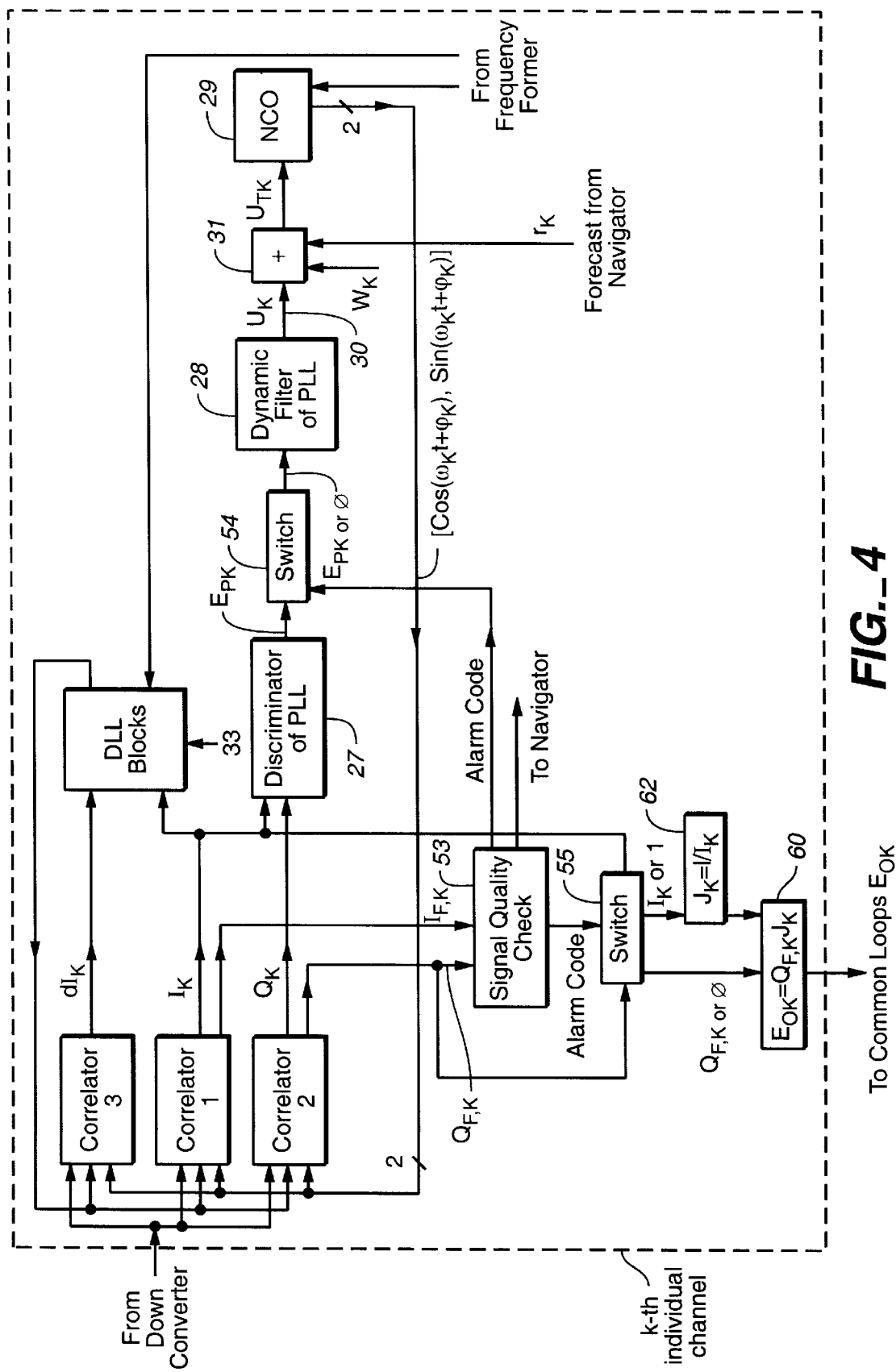
FIG._4

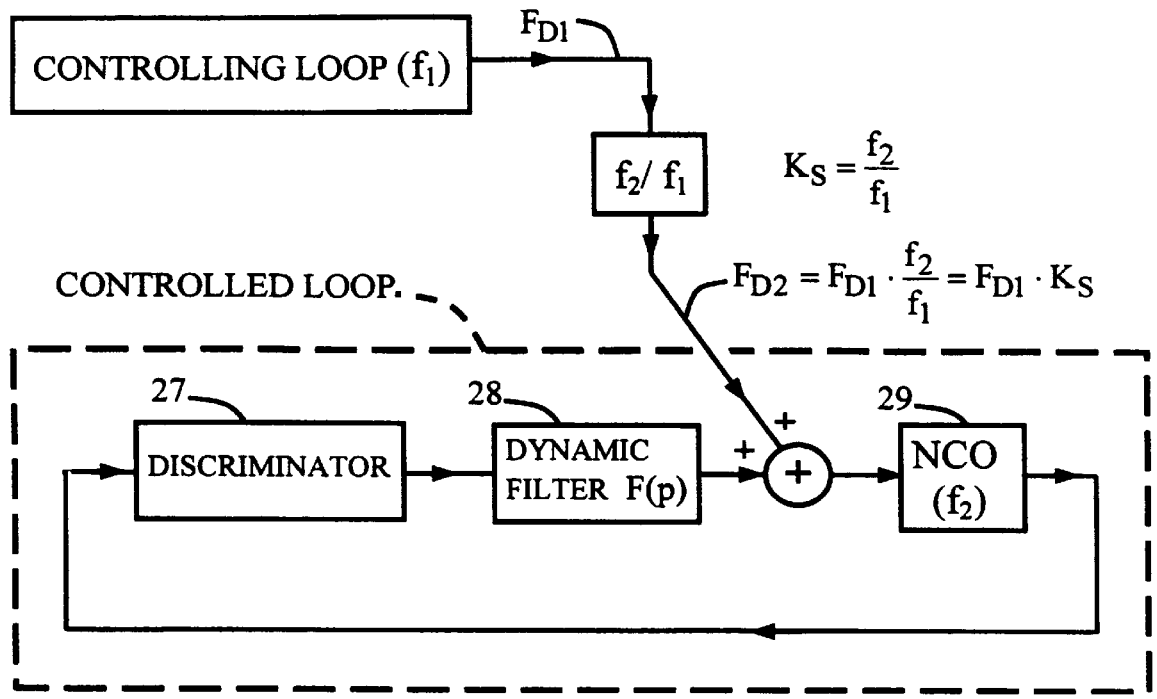
FIG._5
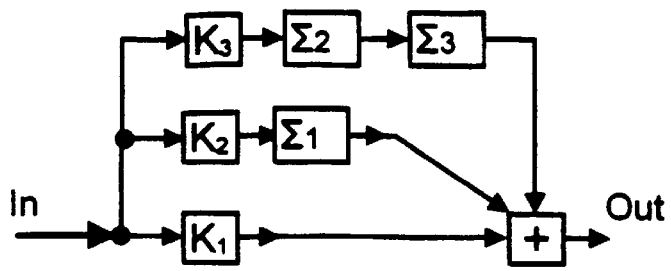
FIG._6
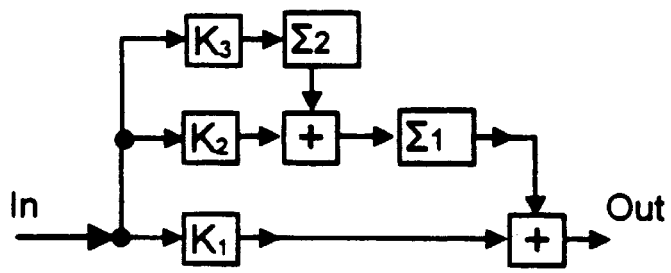
FIG._7

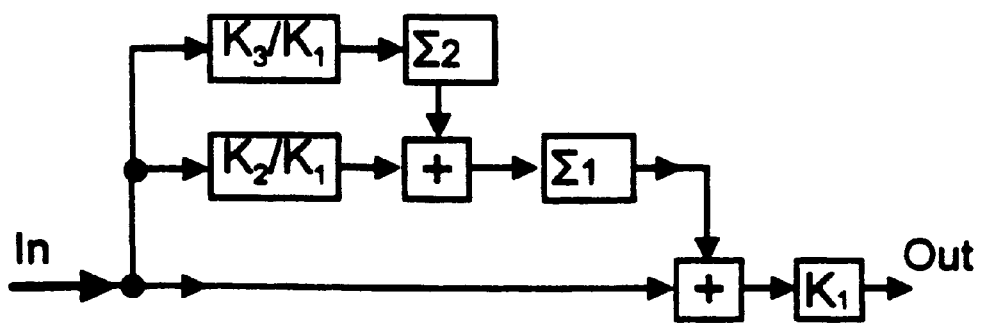
FIG._8
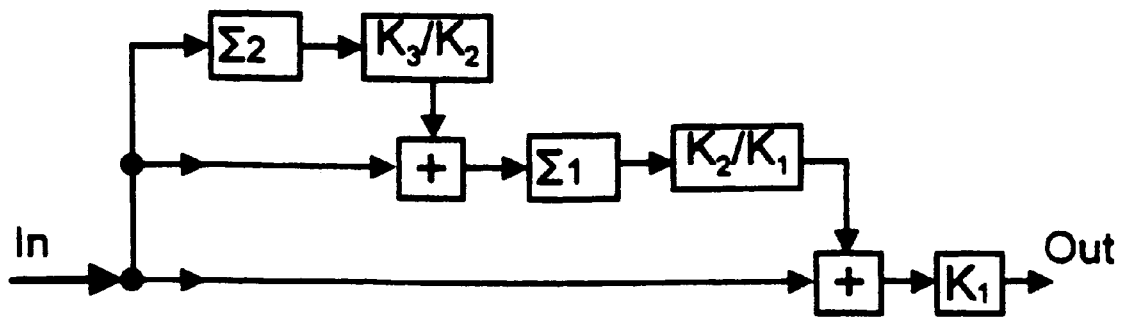
FIG._9
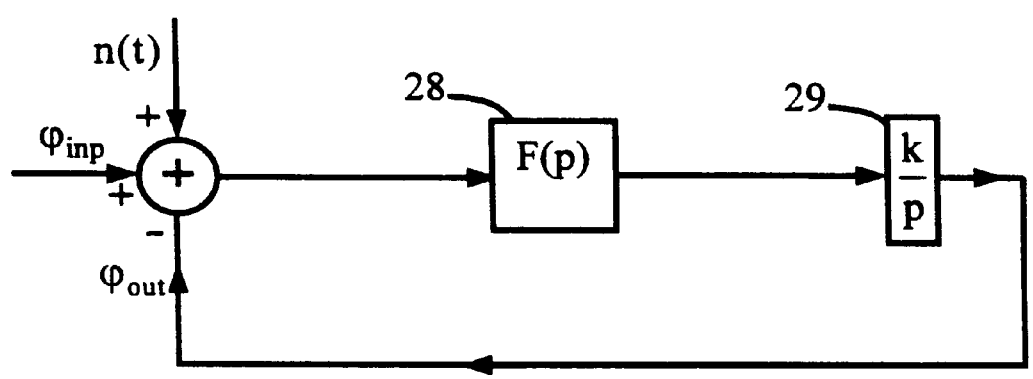
FIG._10

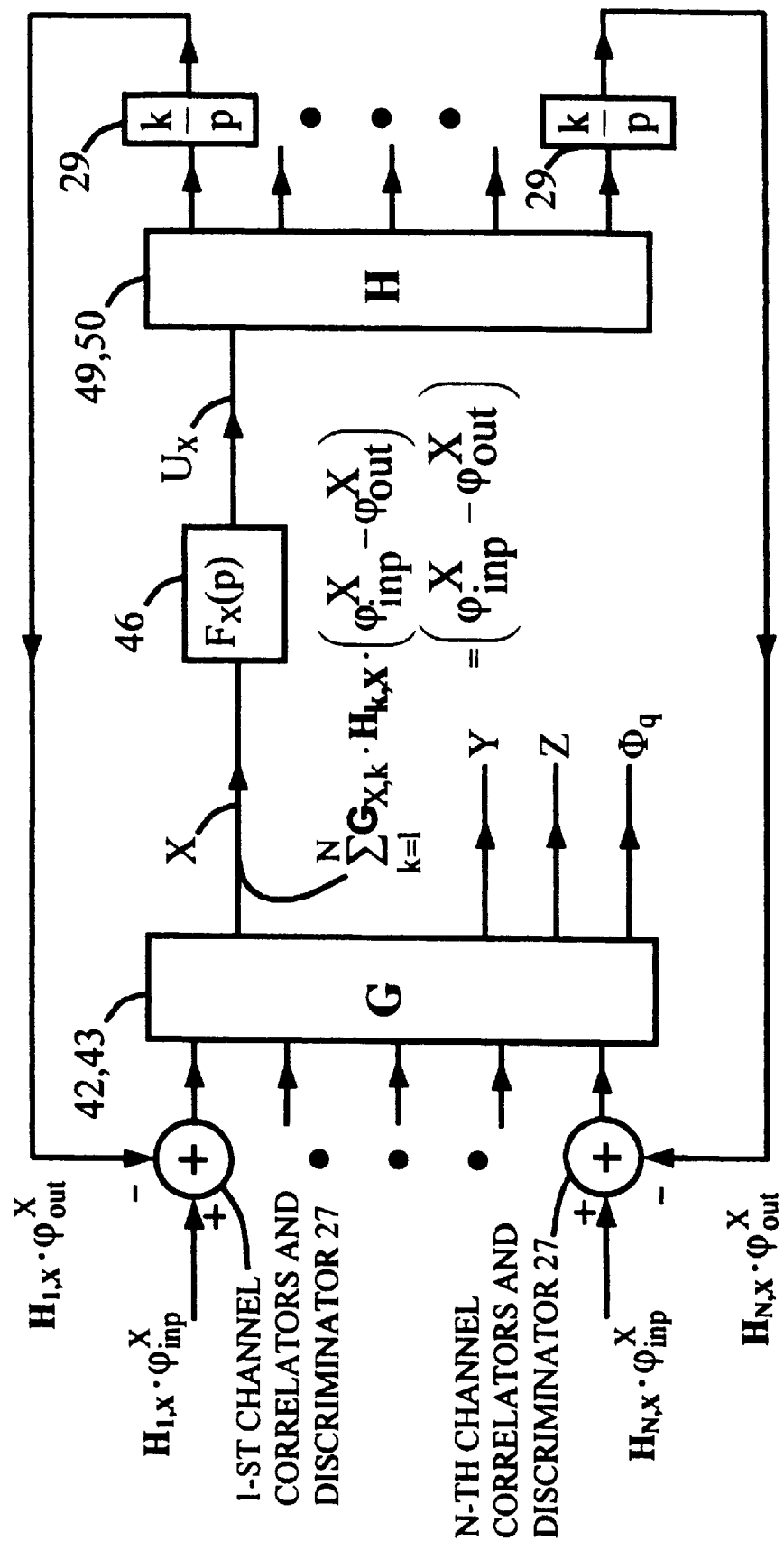
FIG._11

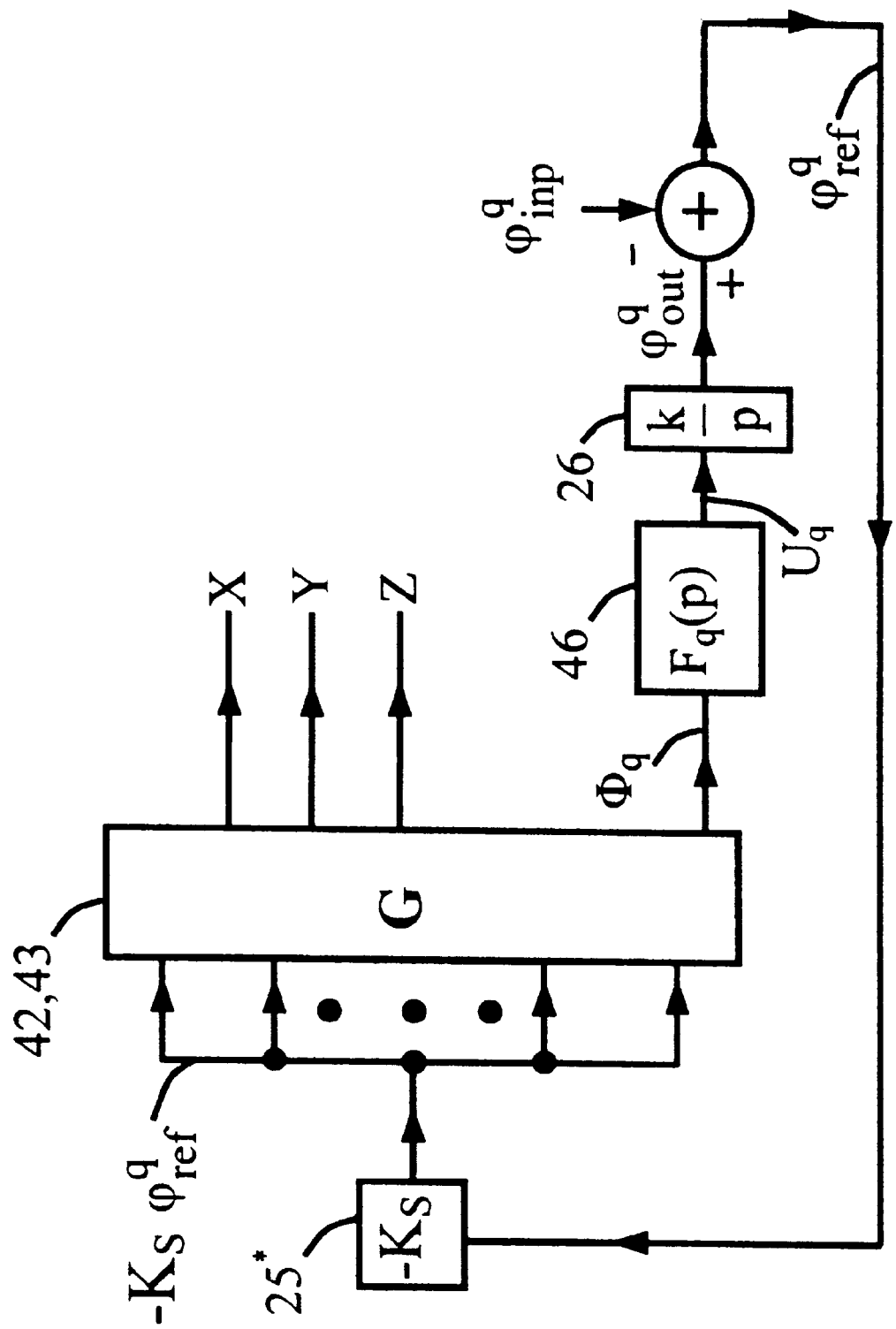
FIG._12

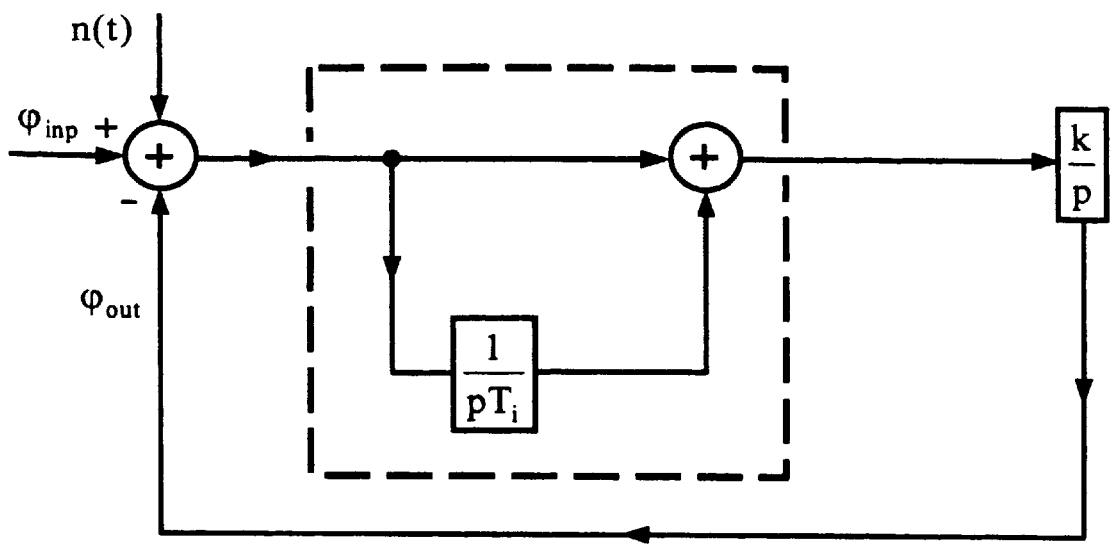
FIG._13
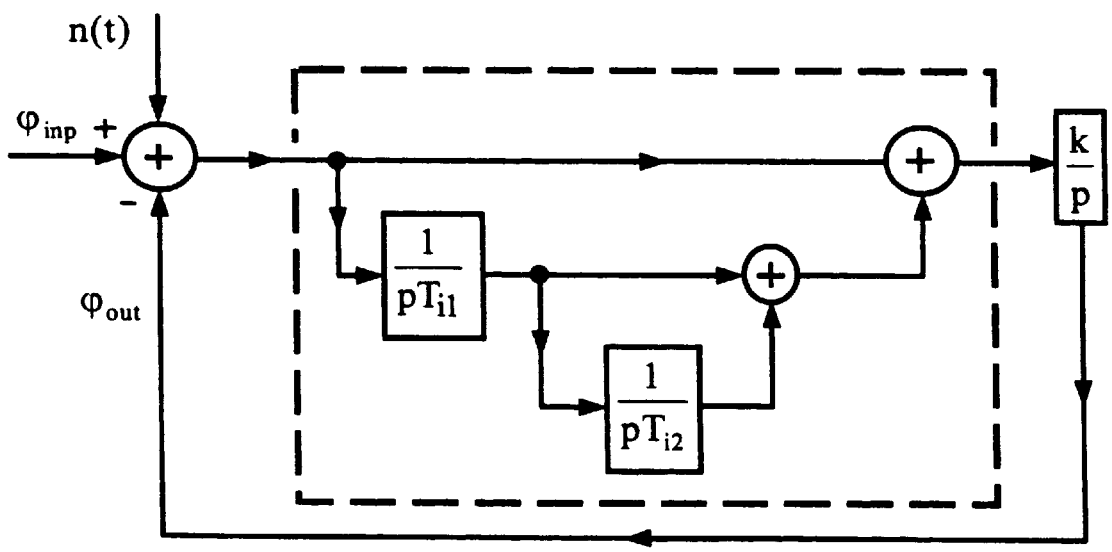
FIG._14

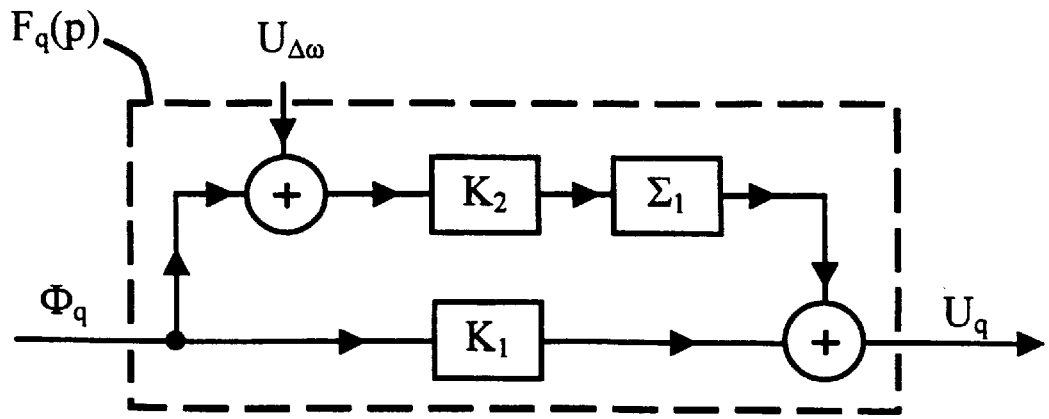
FIG._15
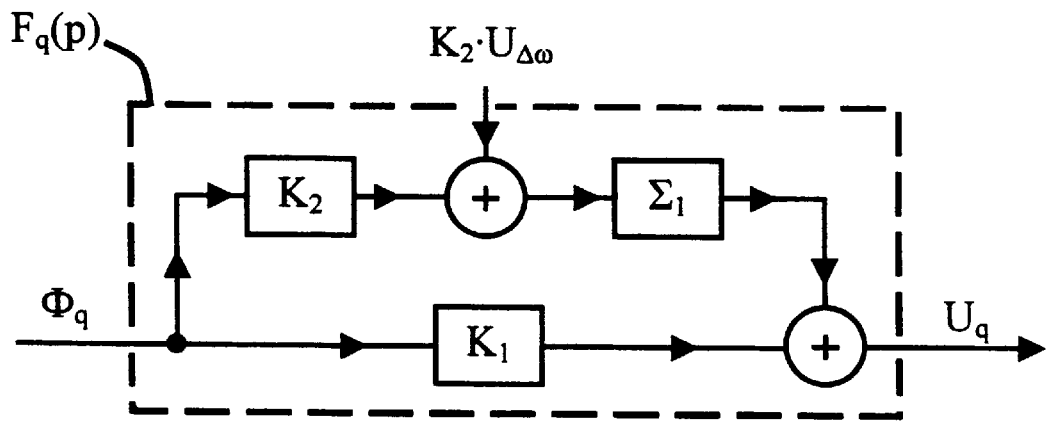
FIG._16
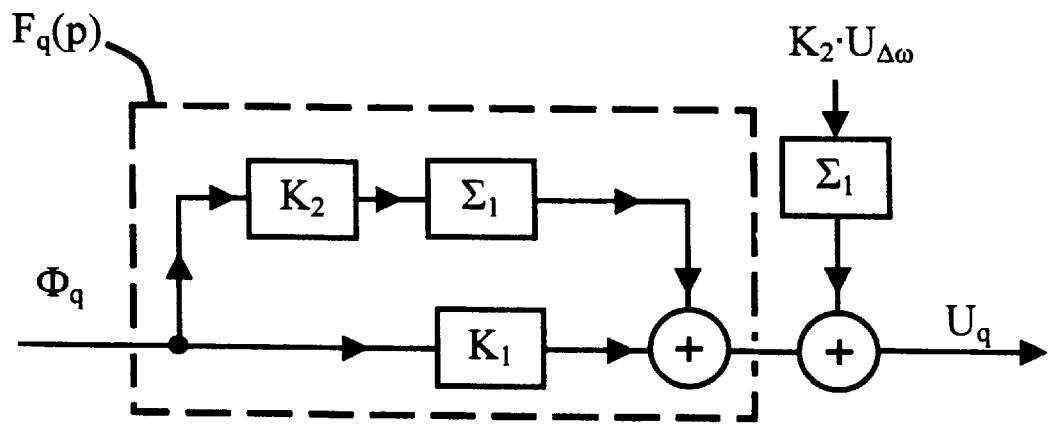
FIG._17

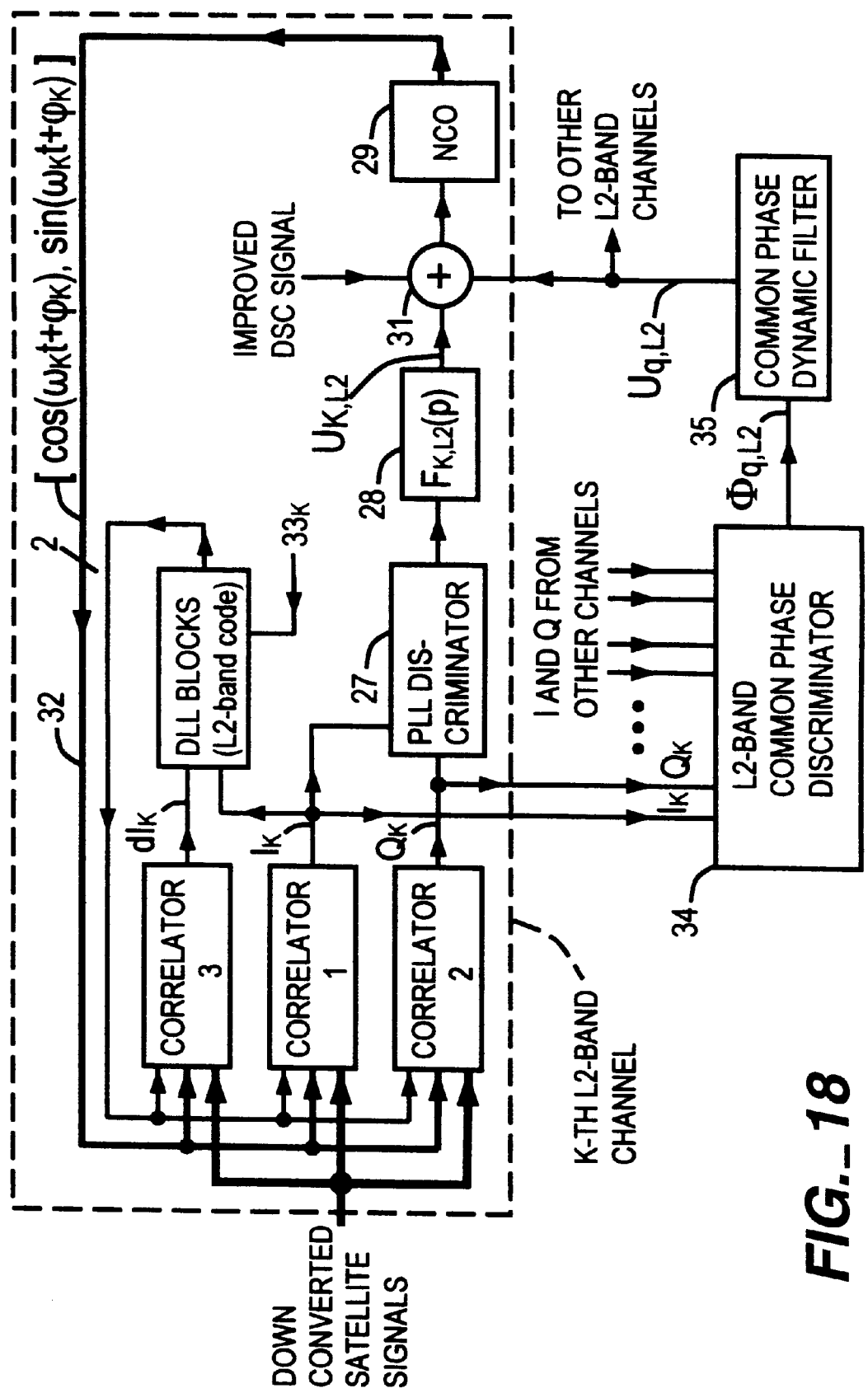
FIG._18

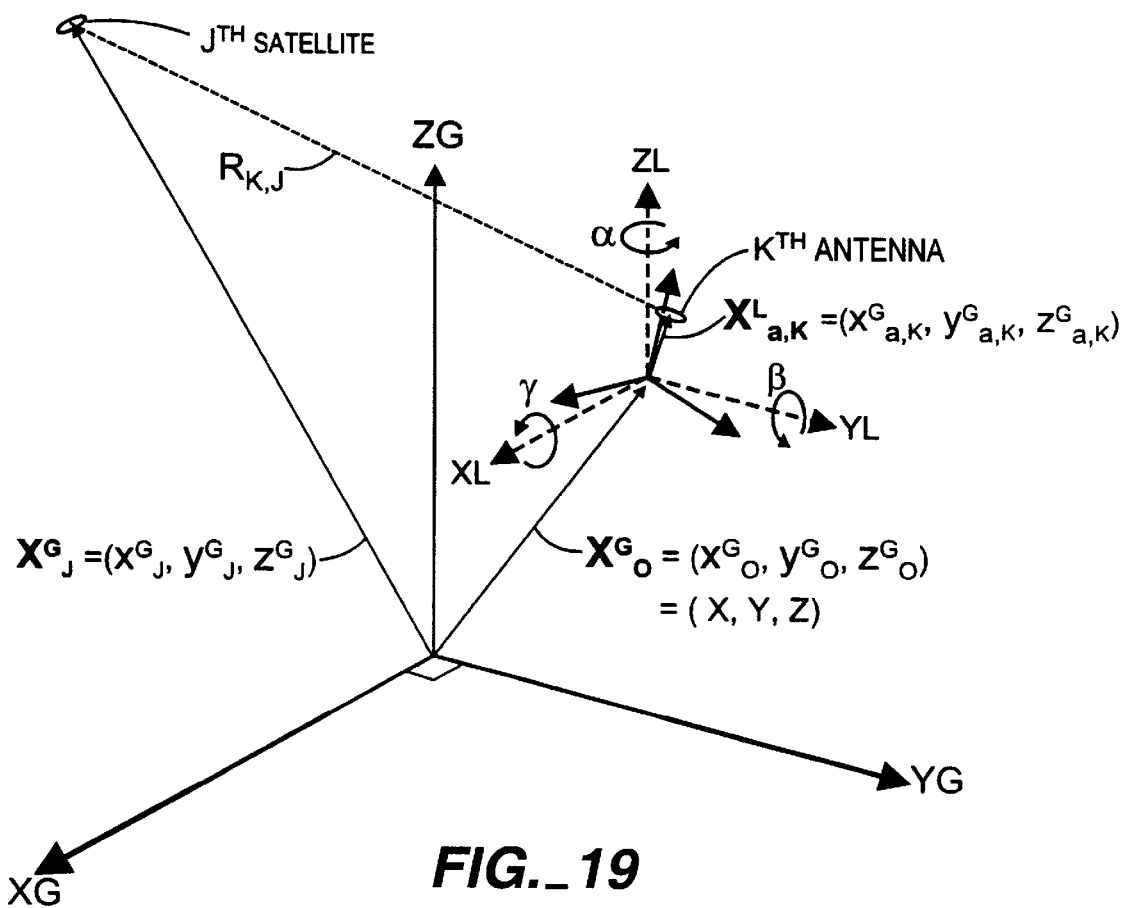
FIG._19

JOINT TRACKING OF THE CARRIER PHASES OF THE SIGNALS RECEIVED FROM DIFFERENT SATELLITES

CROSS-REFERENCE TO RELATED APPLICATIONS

This application claims the benefit of priority to U.S. patent application Ser. No. 60/091,004, filed Jun. 10, 1998, the contents of which is incorporated herein.

FIELD OF THE INVENTION

The present invention relates to receivers which are employed for the determination of the user location with the use of the signals received from many navigation system satellites.

BACKGROUND OF THE INVENTION

Multichannel receivers for radio signals which are encoded by pseudo-random (PR) code signals are employed by consumers using global satellite navigation systems—for example, GPS ("NAVSTAR") and GLN ("GLONASS") systems. These systems enable one to determine the receiver's location, its velocity vector, and to also correct errors in the receiver's time clock (in other words, to make the time scale of the receiver more precisely synchronized to the GPS time).

Such a receiver receives signals simultaneously from many satellites. Each of these satellite radiates signals in two bands: the L1 band and the L2 band. Two carrier signals are simultaneously transmitted in the L1-band; both carrier signals have the same frequency, but are shifted in phase by π/2 (90°). The first L1 carrier signal is modulated by the clear acquisition C/A-code signal and the second L1 carrier signal is modulated by the precision P-code signal. One carrier signal is transmitted in the L2 band, but using a different frequency than the L1 carrier signals. The L2 carrier signal is modulated by the same P-code signal used to modulate the second L1 carrier signal. Each C/A-code signal and P-code signal comprises a repeating sequence of segments, or "chips", where each chip is of a predetermined time period (Δ) and has pre-selected value, which is either +1 or −1. The segment values follow a pseudo-random pattern, and thus the C/A-codes and the P-codes are called pseudo-random code signals, or PR-code signals. Additionally, before each C/A-code signal and P-code signal is modulated onto its respective carrier signal, each code signal is modulated by a low frequency (50 Hz) information signal (so-called information symbols).

In the receiver, the time delay between transmission from the satellite and reception by the receiver is measured for each of the incoming satellite signals. The delays are measured relative to a time clock within the receiver, which is based upon a main reference oscillator. Typically, the time base of all of the clock signals, reference carrier signals, and reference code signals generated by the receiver is derived from this main reference oscillator, and each of these signals drifts with any drift in the main reference oscillator. While the receiver's main reference oscillator and time clock are relatively precise, they are usually not as precise as the satellite's clock and reference oscillator and, accordingly, they drift in time with respect to the satellite's clock and oscillator.

For each satellite, the delay is measured with the aid of several time scales present within the received satellite signal. There is the low-frequency information signal, which provides the least precise timing information, and then there is the more precise time scale in the delay measurement of the C/A-code signal, and the even more precise time scale in the delay measurement of the P-code signal. Additionally, the delay can be measured by using the phase of the satellite's carrier signal, which can provide more precise measurements than the P-code signal. Carrier-phase measurements have a small ambiguity interval (the carrier frequency period), but provide higher precision, and are of importance in differential navigation applications. With the exception of the low-frequency information signal, the accuracy of each of the time scales is affected by the drift in the oscillation frequency of the main reference oscillator.

A typical receiver has several individual tracking channels, each channel for tracking one satellite signal, as received by one antenna. Each tracking channel measures the delay of one PR-code signal within the satellite signal (e.g., C/A-code or P-code signal) and usually also the phase of the satellite's carrier signal. A typical tracking channel may comprise a Delay-Lock Loop (DLL) circuit for tracking the delay of the PR-code, and a Phase-Lock Loop (PLL) circuit for tracking the phase of the satellite's carrier signal.

The processing of the received signal in each individual tracking channel of the receiver comprises the steps of sequential multiplying the received signal (as already passed through the input and filter circuits and down converter) with a reference carrier signal and a reference code signal, both of which are generated within the tracking channel, and then accumulating (or integrating) the resulting multiplication products. The reference carrier signal corresponds to the received carrier signal for the given satellite, and the reference code signal corresponds to the corresponding PR-code signal of the same satellite. Devices that carry out the two multiplication steps and the subsequent accumulation step are called correlators, and the corresponding process is called the correlation of the input signal with the reference signals. Each tracking channel generates three or more correlation signals, each such signal being generated in a respective correlator, which correlates the input signal with a respective reference code signal and the reference carrier signal for the channel. At least two of the reference code signals used in a channel are different from one another (in form and/or by phase shift). However, each of the channel's reference code signals has a range of high correlation with the satellite code signal being tracked. Also, for GPS satellite signals, each of channel's reference code signals has substantially no correlation with the code signals of other satellites; this enables a receiver channel to distinguish the satellites from one another. In the GLN system the same C/A-code is used, but each satellite has a different carrier frequency, which enables a receiver channel to distinguish the satellites from one another.

There are many different structures for the individual tracking channel known in the prior art. Most typical is a structure which uses a coherently-generated reference carrier signal, three correlators, a Delay-Lock Loop (DLL) circuit, and a Phase-Lock Loop (PLL) circuit. The reference carrier signal may be a sinusoid, a square wave, a triangular wave, or other periodic waveform. The PLL circuit relies on the output of one or more of the correlators and controls the generation of the reference carrier signal so that the carrier signal is synchronized to the satellite's carrier signal (i.e., coherent). This action of synchronizing the reference carrier signal to the satellite's carrier signal by controlling the generation of the reference signal is referred to as the tracking action of the PLL circuit. Typically, the PLL circuit adjusts the phase of the reference carrier signal in order to reach synchronization. The phases of the satellite carrier signal and the reference carrier signal are the same when the two are synchronized, and are approximately the same when the phase of reference carrier signal is being adjusted to reach synchronization. (By approximately, we mean that the phases are within $\pi$ of one another when the low-frequency information signal is not present, and within $\pi/2$ of one another when the low-frequency information signal is present; typically, the phases are within 10% of a cycle.) The phase difference between the signals may be measured and defined by the distance between corresponding zero-crossings.

As a result of synchronizing the phases of the two signals, their average frequencies coincide. When the phases are being adjusted to reach synchronization, the average frequencies are approximately the same, typically being within 10% of one another. When we speak of the frequency of the satellite's carrier signal in the context of PLL synchronization and tracking, we mean the frequency that the carrier signal has when it is presented to the PLL circuit, which is typically (but not necessarily) after the satellite signal has been frequency down-converted. Thus, the frequency of the satellite's carrier signal at the PLL circuit is typically at a value which is lower than its original transmitted value.

The DLL circuit relies on the output of one or more of the correlators and adjusts the phase (often called delay) of the reference code signals for the correlators so that these code signals are synchronized to the PR-code signal of the satellite signal. This action is referred to as the tracking action of the DLL circuit.

As indicated above, each correlator multiplies the satellite signal with the coherent reference carrier signal and a respective reference PR-code signal. The reference carrier signal is typically in quadrature format (e.g., $\cos(\omega_0 t)$ and $\sin(\omega_0 t)$), and each correlator effectively multiplies the input signal by one of the quadrature components. We now describe three typical correlation signals, after which we describe how typical DLL and PLL circuits use the correlation signals.

The first correlator generates the "in-phase" correlation signal I(*), which may be generated by multiplying the input satellite signal with the in-phase component (e.g., $\cos(\omega_0 t)$) of the coherent reference carrier signal, and with a reference code signal that is a scaled replica of the satellite's PR-code signal. The final multiplication products are then accumulated over a specific amount of time to generate signal I(*). The correlation signal I(*) is used to demodulate the information symbol present within the satellite signal and to normalize the discriminator outputs generated in the DLL and PLL circuits to make them relatively invariant to changes in the signal strength of the received satellite signal. The correlation signal I(*) may be represented in the following form:

$$I(\epsilon_1,\psi)=M*R_0(\epsilon_1)*\cos(\psi),$$

where M represents the input signal strength, $R_0(\epsilon_1)$ is the cross-correlation function of the satellite's filtered PR-code signal and the locally generated reference code signal which may be a replica of the satellite's un-filtered PR-code signal, where the $\epsilon_1$ is the time shift between the sequence start of the two PR-code signals being correlated, and where the term $\cos(\psi)$ accounts for variations in the magnitude of I(*) caused by a phase difference $\psi$ between the satellite's carrier signal and the reference carrier signal of the receiver channel. (The satellite's PR-code signal is filtered because of the filtering done in the down-conversion process). For the sake of simplicity, we have not shown the dependency of I(*) on the low-frequency information signal since the demodulation of this signal is a trivial matter.

The second correlator of the tracking channel generates the quadrature correlation signal Q(*). This signal may be generated by multiplying the input signal with a second reference PR-code signal, and with the quadrature component (e.g., $\sin(\omega_0 t)$) of the coherent reference carrier signal, and then accumulating the resulting multiplication products. The second reference PR-code signal may be the same as the reference code signal used in the first correlator. Signal Q(*) is used for generating the error signal in the PLL circuit, and may be represented in the following form:

$$Q(\epsilon_2,\psi)=M*R_0(\epsilon_2)*\sin(\psi).$$

where the $\epsilon_2$ is the time shift between the sequence start of the two PR-code signals being correlated, and where the term $\sin(\psi)$ accounts for variations in the magnitude of Q(*) caused by a phase difference $\psi$ between the satellite's carrier signal and the reference carrier signal of the receiver channel. For the sake of simplicity, we have not shown the dependency of Q(*) on the low-frequency information signal.

The third correlator generates the main correlation signal dI(*), which is used by the DLL circuit to control the generation of the reference code signals and to synchronize the reference code signal to the satellite's code signal. Signal dI(*) may be generated by multiplying the input satellite signal with a strobed version of the satellite's PR-code signal, which is called the "main reference code signal", and with the in-phase component (e.g., $\cos(\omega_0 t)$) of the coherent reference carrier signal, and then accumulating the resulting multiplication products. A strobed version of the satellite's PR-code signal may comprise a sequence of short strobe-pulses, each pulse corresponding to a boundary (also called end) between two chips of the input PR-code signal where there is a change in the sign of the input PR-code signal, and having a polarity which corresponds that of the later chip. The dI(*) signal may be represented as:

$$dI(\epsilon,\psi)=M*\Delta R_0(\epsilon)*\cos(\psi),$$

where $\Delta R_0(\epsilon)$ is the cross-correlation function of the satellite's PR-code signal and the locally generated main reference code signal (i.e., the sequence of short strobe-pulses), where the $\epsilon$ is the time shift between the sequence start of the two PR-code signals being correlated, and where the term $\cos(\psi)$ accounts for variations in the magnitude of dI(*) caused by a phase difference $\psi$ between the satellite's carrier signal and the reference carrier signal of the receiver channel. (The dependency of dI(*) on the low-frequency information signal has not been shown for the reasons given above.) It is known that such a strobed reference code signal provides the DLL characteristics which can be obtained with the use of the early-late narrow correlator structure.

The DLL circuit adjusts the value of the time shift $\epsilon$ to bring the two PR-code signals into a desired alignment (i.e., synchronization). The time shifts $\epsilon_1$ and $\epsilon_2$ of the reference PR-code signals in the first and second correlators are synchronized to the time shift $\epsilon$. As such, when the reference code signal of the third correlator is advanced (or retarded) in phase by an amount, each of the reference code signals for the first and second correlators is advanced (or retarded) by the same amount. Time shifts $\epsilon_1$ and $\epsilon_2$ are usually set equal to the DLL time shift $\epsilon$; however, they could be off set in time by constant offsets $\epsilon_K$ and $\epsilon_S$ respectively (e.g., $\epsilon_1=\epsilon-\epsilon_K$ and $\epsilon_2=\epsilon-\epsilon_S$).

For controlling the adjustment of time shift $\epsilon$ in the DLL circuit, the DLL circuit comprises a code-delay discriminator which generates a delay-error signal Ed representative of the error between time shift $\epsilon$ and the desired operating value, which is designated as $\epsilon_0$. Delay-error signal Ed may be generated in any of the forms:

Ed=dI, or
Ed=dI*I, or
Ed=dI/I, or
Ed=dI*Sgn(I), or
Ed=dI/Sgn(I), where the function Sgn(*) generates a +1 or −1 value depending upon the sign of its parameter. Each of these forms uses the signal dI(*), which in turn is proportional to the correlation function $\Delta R_0(\epsilon)$. In a neighborhood around the desired operating point, correlation function $\Delta R_0(\epsilon)$ has a zero-crossing at the operating point, and has values of opposite polarity on either side. As is known in the GPS art, the DLL circuit uses these features of $\Delta R_0(\epsilon)$ to control the phase of the reference code signal.

It is noted that each of the first and third correlators multiplies the input satellite signal with the in-phase component (e.g., $\cos(\omega_0 t)$) of the coherent reference carrier signal. Thus, the number of components may be reduced by using a common multiplier which provides this common multiplication product for these correlators. Similarly, each of the second and fourth correlators multiplies the input satellite signal with the quadrature component (e.g., $\sin(\omega_0 t)$) of the coherent reference carrier signal; and thus a second common multiplier may be similarly used for these correlators to reduce the number of components. Along these lines, a typical implementation approach is to digitize the satellite input signal with a quadrature analog-to-digital converter (QADC) at a high intermediate frequency, which provides the input signal in quadrature format, and to thereafter multiply the digitized input signal with the reference carrier signal in quadrature format. The multiplication may be performed by a complex multiplier or a conjugating complex multiplier, and provides an output which is in quadrature format. The in-phase component of the multiplier's output is provided to the first and third correlators, and the quadrature component of the multiplier's output is provided to the second correlator. The output signals of the complex multiplier are at or near the baseband for the satellite PR-code signal.

Another structure known to the art for the individual tracking channel comprises four correlators and uses an incoherently generated reference carrier signal. In this structure, the satellite signal is down converted using a reference carrier signal which is not phased adjusted to follow the phase of the satellite's carrier signal (i.e., it is incoherent). The incoherent reference carrier signal is in quadrature format, and the down-converted satellite signal is provided in quadrature format, having a first orthogonal component and a second orthogonal component. (In this situation, we do not use the terms "in-phase component" and "quadrature-phase component" because neither of the quadrature components of the down-converted satellite signal are always in-phase with the original satellite carrier signal). Each of the orthogonal components of the down-converted satellite signal is multiplied with a replica of the satellite's PR-code signal and thereafter accumulated by two respective correlators to generate two orthogonal correlation signals $I_0$ and $Q_0$:

$$I_0(\epsilon,\psi)=M*R_0(\epsilon)*\cos(\psi),$$

and $$Q_0(\epsilon,\psi)=M*R_0(\epsilon)*\sin(\psi).$$

These correlation signals also depend upon the magnitudes of $\epsilon$ and $\psi$, as in the coherent technique. In this case, $\psi$ is not controlled and can have any phase shift value. In the third correlator, the first orthogonal component of the down-converted satellite signal is multiplied with a reference code signal that has the form of short strobe-pulses and the resulting product is accumulated to generate a third correlation signal $dI_0(\epsilon,\psi)=M*\Delta R_0(\epsilon)*\cos(\psi)$. In the forth correlator, the second orthogonal component of the down-converted satellite signal is multiplied with the same reference code signal as used in the third correlator and the resulting product is accumulated to generate a fourth correlation signal $dQ_0(\epsilon,\psi)=M*\Delta R_0(\epsilon)\sin(\psi)$.

From these four correlation signals, a code-delay discriminator generates a delay-error signal Ed(*) by summing the product of signals $I_0$ and $dI_0$ with the product of signals $Q_0$ and $dQ_0$ as follows:

$$Ed(\epsilon,\psi)=I_0*dI_0+Q_0*dQ_0$$

It may be readily shown that the quantity $(I_0*dI_0+Q_0*dQ_0)$ is proportional to the product of the two cross-correlation functions $\Delta R_0(\epsilon)*R_0(\epsilon)$:

$$I_0*dI_0+Q_0*dQ_0=M^2*\Delta R_0(\epsilon)*R_0(\epsilon)*\cos^2(\psi)+$$
$$M^2*\Delta R_0(\epsilon)*R_0(\epsilon)*\sin^2(\psi)=M^2*\Delta R_0(\epsilon)*R_0(\epsilon)*\{\cos^2(\psi)+$$
$$\sin^2(\psi)\}=M^2*\Delta R_0(\epsilon)*R_0(\epsilon)$$

Thus, this generated form of Ed(*) is proportional to the product of both correlation functions. In a neighborhood around the desired operating point, correlation function $R_0(\epsilon)$ has a relatively constant value, whereas correlation function $\Delta R_0(\epsilon)$ has a zero-crossing at the operating point, and has values of opposite polarity on either side. As is known in the GPS art, the DLL circuit uses these features of $\Delta R_0(\epsilon)$ to control the phase of the reference code signal.

The code-delay discriminator in the DLL circuit of an incoherent receiver may also generate the delay-output signal Ed(*) in the following form:

$$Ed(\epsilon)=(I_0*dI_0+Q_0*dQ_0)/(I_0^2+Q_0^2)$$

It may be readily shown that the quantity $(I_0*dI_0+Q_0*dQ_0)/(I_0^2+Q_0^2)$ is equal to the product of the two cross-correlation functions $\Delta R_0(\epsilon)*R_0(\epsilon)$. This form for Ed(*) substantially eliminates the dependancy on the signal strength (M). Both forms for Ed(*) eliminate the dependency on the phase since $\{\cos^2(\psi)+\sin^2(\psi)\}=1$. Other forms for Ed(*) in the incoherent receiver embodiment are possible, as is known to the GPS/GLN art.

In both the coherent and incoherent reference carrier systems, the delay-error signal Ed(*) from the DLL's discriminator is provided to a loop filter of the DLL circuit, which determines the pass band and the servo-system type of the DLL circuit. The output of the DLL filter provides the control signal of the DLL circuit and is provided to the generator of the main reference code signal, where it is used to adjust the frequency and phase of the reference code signals used in the above-described correlators. The DLL circuit brings the delay-error signal Ed of the discriminator to substantially zero and thus synchronizes the phases of all the channel's reference code signals with the PR-code signal of the input signal.

In a coherent tracking channel, the phase-lock loop (PLL) circuit is used to adjust frequency and phase of the reference carrier signal to follow that of the satellite's carrier signal. The PLL circuit has a carrier-phase discriminator which generates a phase-error signal Ep as a function of the difference between the phases of the satellite's carrier signal and the reference carrier signal. The phase-error signal Ep may be generated in any of the following forms:

Ep=Q, or

Ep=arctan(Q/I), or

Ep=Q/I, or

Ep=Q*Sgn(I), or

Ep=Q/Sgn(I), or

Ep=Q*I.

Each of these forms contains correlation function Q(*), which in turn is proportional to $\sin(\psi)$, where $\psi$ is the phase difference between the phases of the input signal and the reference carrier signal.

The phase-error signal Ep from the PLL's discriminator is provided to a loop filter of the PLL circuit which determines the pass band and the servo-system type of the PLL circuit. The output of the PLL filter provides the control signal of the PLL circuit, and is provided to the generator of the reference carrier signal, where it is used to adjust the phase and frequency of the reference carrier signal. The PLL circuit adjusts the phase shift $\psi$ until the achievement of the condition Ep=0 (i.e., Q=0, $\sin(\psi)$=0) and thus aligns the phases of the reference carrier signal with the satellite's carrier signal. This point (Ep=0) is known as the operating point, or the "point of steady balance," for the PLL circuit. In most channel implementations, the loop filter of the PLL circuit is set to a higher servo-system type (or order) than that of the DLL circuit, which provides the PLL circuit with a wider dynamic bandwidth than the DLL circuit.

The relationship of the PLL's phase-error signal Ep($\psi$) and the phase shift $\psi$ is substantially linear in a limited range of phase shifts $\psi$ nearby the point of steady balance for the PLL circuit, which is Ep=0. When large shifts are present, which can occur under the effect of large noise spikes or other strong disturbances, the PLL circuit can move to another point of steady balance which is an integer number of phase half-cycles away from the previous point of steady balance ($\pm n^*\pi$, n=1, 2, 3, . . . ). This event is known as the "cycle slip effect", and it impedes navigational measurements using the phase of the satellite's carrier signal. Cycle slip also sets a minimum threshold on the energetic potential of the input signal for which the input signal must exceed in order to assure proper PLL tracking. The energetic potential is the ratio of the signal power of the input signal (i.e., the received satellite signal) to the spectral noise power density present at the receiver's antenna.

Whenever the distance between the satellite and the receiver changes, the phases of the reference code signals and the reference carrier signal of the tracking channel are moved to new values to account for the change in distance, which of course corresponds to a change in the transmission delay between the satellite and the receiver. If the distance is changed rapidly, the phases of the reference signals will not immediately adjust to their new values since the DLL and PLL circuits have a degree of inertia (and sometimes over-shoot) in their adjustment loops. During the time the reference signals are moving to their new values, there will be dynamic errors (i.e., transient errors) in the phase values of the reference signals.

The pass bands of the PLL and DLL circuits according to the prior art must be selected so as to minimize these dynamic errors whenever the value of the measured delay changes. In this regard, it is necessary to take into account the following set of factors-the movement of the satellite and the receiver, the frequency fluctuations in the main reference oscillator of the receiver (which can mimic a change in the distance between the satellite and receiver), the changes of the delay due to spreading of the radiowaves in the atmosphere, the selective availability (in the GPS), etc. The dynamic errors can be minimized by increasing the bandwidths of the PLL and DLL feedback loops, which causes these loops to react more quickly to small changes in their discriminator output signals. However, for the PLL circuit, it is inadvisable to widen the band excessively because increasing the bandwidth increases the influence that noise signals (including noise generated within the receiver) have on the value of the phase-error signal Ep, and these noise signals can constructively add with one another, and with the above measurement factors, to cause the PLL circuit to over-react and slip one or more carrier cycles. Accordingly, widening the bandwidth of the PLL circuit increases the probability of a cycle slip or a loss of tracking. Therefore, there is a conflict which sets limits on the maximum bandwidth of the PLL circuit for a given energetic potential of a received satellite signal at which there is still provided safe operation, or conversely, sets limits on the value of the threshold energetic potential of the input signal at which there is still provided the safe operation for a given PLL bandwidth.

In order to make the DLL and PLL circuits of the individual channels of the receiver enter the tracking mode, a search system by delay and frequency is used. The search system by delay sets the initial delay of the reference code signal possibly close to that of the PR-code signal of the input signal. If the error of the initial delay setting does not exceed the lock range of the DLL circuit, the DLL circuit settles in its point of steady balance. The search system by frequency sets the initial value of the reference carrier frequency with an error not exceeding the lock range of the PLL circuit. These systems are well known to the art and do not form a part of the present invention.

During the operation of the receiver, the loss of the track in the PLL and DLL circuits can sometimes occur because of a short-term loss of the signal from the satellite caused by a local object shadowing the receiver's antenna. In this case, it is necessary to re-activate the search systems in order to re-acquire the satellite signal and to restore the DLL and PLL circuit to their tracking modes.

U.S. Pat. No. 5,398,034 to Spilker, Jr. discloses a method which enables one to improve the precision and safety of the DLL operation. This method is carried out in a scheme called the "vector DLL". The idea of the method is based on a fact that some of the reasons causing changes in the measured delays in the individual tracking channels are common to all the receiver's channels even though the channels are tracking different satellite signals. The main common reasons are the frequency fluctuation caused by the instability of the main reference oscillator in the receiver, and the movement of the receiver's antenna. In the vector DLL scheme for the tracking of the common changes of the delays, the feedback adjustment loops of the DLL circuits of all the individual channels are replaced with a common vector DLL loop which receives all of the code delay-error signals Ed from all of the tracking channels, and which tracks and operates on these Ed signals in a coordinated manner. The vector DLL loop effectively sums together the signals from all the active channels, and therefore, increases the equivalent energetic potential of the satellite signals.

In addition, the vector DLL can operate when there is shadowing of some of the satellites, and can operate in this manner without losing the information of the delay changes on the shadowed satellites. Therefore, when a satellite signal re-appears after being shadowed by a local object, there is no need to waste time and have the search system re-perform acquisition of the signal in order to bring the vector DLL loop and the PLL circuits of the shadowed satellites (if coherent reference signals are being used) back in their tracking modes. The vector DLL loop also can provide better tracking characteristics when the receiver is being moved by the user. The tracking characteristics and the advantages of the vector DLL can be improved by increasing the number of active channels in the receiver tracking different satellites.

The structure of the vector DLL method can be described by the following way. The satellite input signal is applied to a group of tracking channels, each tracking channel having the usual set of correlators that would be found in an DLL circuit. The correlation signals are then applied to the set of incoherent code-delay discriminators used in typical DLL circuits, whose number N is equal to the number of channels where the signals from the satellites are received simultaneously. The delay-error signals Ed generated from the code-delay discriminators are filtered by respective low-pass filters and are corrected in order to take into account predictable factors, such as the forecasted satellite location, selective availability (if it is accessible), ionosphere delays, etc. Then, instead of being used individually to form a set of independently operating DLL loops, the filtered and corrected delay-error signals Ed are grouped together as a N-dimensional vector Z, and this vector is multiplied onto a pseudo-inverse geometric matrix G, and as a result the 4-dimensional vector $V_D$ is obtained:

$$V_D = G \cdot Z,$$

where $$G = (H_1^T \cdot R^{-1} \cdot H_1)^{-1} \cdot H_1^T \cdot R^{-1}, \qquad [1]$$

where matrix $H_1$ is the matrix H complemented by the unit vector $t=(1, 1, \ldots, 1)^T$: $H_1 = [H|t]$;

matrix H is the well-known Jacobian matrix, or matrix of observations, for the satellite-antenna pseudo-ranges (matrix H is also called the "geometric function matrix", the "Jacobian geometric matrix", and for certain coordinate system definitions it is called the "matrix of directional cosines");

matrix R is a covariance matrix of the estimated measurement errors, and its matrix elements depend upon the signal levels and the elevation angles of each of the satellites; R is a square N×N matrix); and where the first three components of vector $V_D = (X, Y, Z, \Phi_q)$ are the displacements of the three spatial coordinates (X, Y, Z) of the antenna's phase center in any coordinate system, and where the fourth component $\Phi_q$ of $V_D$ is the phase fluctuation of the reference code oscillator. As is known in the global positioning art, there are a number of spatial coordinate systems for representing the position of an object in three dimensions. The most commonly used coordinate systems are the Cartesian system, Earth-centered Earth-fixed (ECEF) system, geodesic system, and topocentric system. Some of these systems are variants of the Cartesian system. Once the coordinate system is selected for the receiver, the mathematical expression for computing the pseudo-range R, between a visible satellite (J) and the antenna may be determined. From this expression, the J-th row of the Jacobian matrix H is the set of mathematical derivatives of $R_J$ with respect to the antenna coordinates (X, Y, Z): the J-th row of $H = (\partial R_J / \partial X, \partial R_J / \partial Y, \partial R_J / \partial Z)$. Thus, the matrix elements of H are representative of the changes in the pseudo-ranges that would be caused by changes in the antenna's position in the selected coordinate system. The matrix elements of $H_1$ are also representative of these changes as well as changes in the pseudo-ranges that would be caused by frequency fluctuations in the main reference oscillator 26.

The generation of the $V_D$ vector provided by form [1] is based upon the method of least squares where the matrix G is a pseudo-inverse matrix, also called generalized inverse matrix, for the complemented Jacobian matrix $H_1$. To be a pseudo-inverse matrix of $H_1$, matrix G need only satisfy the relationships $G \cdot H_1 \cdot G = G$ and $H_1 \cdot G \cdot H_1 = H_1$. The multiplication of Z onto matrix G ($V_D = G \cdot Z$) generates an estimate of vector $V_D$ from a known vector Z, and the multiplication of $V_D$ onto matrix $H_1$ generates an estimate of the vector Z from a known vector $V_D$. These multiplications are usually performed in all GPS and GLN receivers when solving the navigation task, and are therefore well known to the art. The matrices H, R, $H_1$, and G are computed in every global positioning system, and thus the computation of the matrix elements is well known to the art, and need not be presented here in order for one of ordinary skill in the global positioning art to make and use the present invention. The matrix R is usually a diagonal matrix since the measurement errors in the satellite signals are usually considered to be independent of one another. Also, the matrix R may be set equal to a diagonal unity matrix (R=I) in some instances for simplicity. One may use the present invention with R=I, in which case matrix G may be more simple generated in the form: $G = (H_1^T \cdot H_1)^{-1} \cdot H_1^T$.

After generating vector $V_D$ from G and Z, the components of vector $V_D$ are filtered by four respective dynamic (loop) filters to form a 4-dimensional vector of common control signals. Then, by means of the multiplication with the matrix $H_1$, the common control signals are transformed into an N-dimensional vector of individual control signals, which are then used for the frequency control of the individual code signal generators in each channel. As a result, a vector common loop is formed which uses delay information from all of the tracking channels, and which tracks the delay changes in the satellite PR-code signals which are caused by one or more common sources. For each tracking channel and the corresponding satellite code signal which it tracks, the vector common loop changes the phase delay of the channel's reference code signals to follow the delay change in satellite code signal which is cause by the common sources.

The disadvantage of the described method is the following. The advantages of the vector tracking are realized only for the code-signal tracking, and not for carrier-phase tracking, which is more susceptible to loss of lock and cycle clips. It is impossible to modify the described method for carrier-phase tracking by replacing the code-delay discriminators with the carrier-phase discriminators, and replacing the code-signal generators with the carrier-signal generators. The point is that, besides the common disturbances that are present in all of the tracking channels, there are also individual disturbances in each of the channels which are not common to the other channels and which change the code and phase delays in the tracking channels in an independent manner. These changes of the code delay and phase delay cannot be completely corrected by using the forecasted navigation information, and are badly tracked by the common loop. Therefore the residual errors appear. These errors caused by individual disturbances can be viewed as time shifts of several nanoseconds in the alignment between the satellite signal and the reference signals of the corresponding tracking channel (both the code and carrier signals). The output from the carrier-phase discriminator of the tracking channel depends upon the value of the correlation signal Q(*), and usually also on the value of correlation signal I(*). In turn, the values of these correlation signals are dependent upon the alignment of the reference PR-code signal to the satellite's PR-code signal, as represented by the correlation function $R_0(\epsilon)$. They are also dependent upon the phase difference $\psi$ between the reference carrier signal and the satellite carrier signal, as represented by the function $\sin \psi$ for Q(*) and the function $\cos \psi$ for I(*). A time shift $\epsilon$ of several nanoseconds only causes a minor change in the value of $R_0(\epsilon)$ since the value $R_0(\epsilon)$ does not vary much over the span of a 10 nanosecond shift. Thus, errors in the alignment of the PR-code signals do not appreciably affect the output of the carrier-phase discriminator (or the output of the code-delay discriminator). However, time shifts of several nanoseconds correspond to several carrier cycles and will lead to errors of several cycles of the carrier phase. Because of the periodic nature of the functions $\sin(\psi)$ and $\cos(\psi)$, the carrier-phase discriminator of a channel can only generate a unique value over the limited range of $-\pi/2 < \psi < \pi/2$. Therefore, such a hypothetical vector PLL scheme based on the prior art vector DLL scheme will not be able to maintain a lock on the proper carrier cycle when a disturbance arises, and will not be able to move back to the proper carrier cycle after being disturbed. Moreover, the output of the carrier-phase discriminator will no longer be reflective of phase shift caused by the common source, and thus the value it presents to the vector PLL would be meaningless.

The aim of the present invention is the increase of the operation fail-safety of the navigation receiver by means of the joint (not separate) tracking of the carrier signals from all the observed satellites.

SUMMARY OF THE INVENTION

Broadly stated, the present invention encompasses methods and apparatuses for tracking a plurality $N \geq 3$ of global positioning satellite signals received by one or more antennas. Each of the satellite signals is tracked with a reference signal in an individual tracking circuit, which may be either a PLL circuit or a DLL circuit. The tracking circuit generates an output signal representative of the phase difference between the signal being tracked and the reference signal. From the outputs of the individual tracking circuits, a change in the signals caused by a common source is determined. Such a common source may be a fluctuation in the frequency of the main reference oscillator which is used to generate the reference signals, or may be a change in the position of one or more of the antennas, or may be a rotation of an antenna around the antenna's vertical axis. One or more correction signals are generated in relation to the determined change. The phase of the reference signal for at least one individual circuit is modified based on the value of a correction signal. This modification is in addition to the phase modifications that individual tracking circuits normally perform as part of their tracking operations.

Receivers according one application of the present invention comprise a plurality of individual PLL circuits as the individual tracking circuits and which track the carrier phases of N satellites in N respective tracking channels. These receivers further comprise a vector common tracking loop which tracks common disturbances to the phases of the satellite carrier signals (i.e., changes from common sources) and generates corresponding corrections signals for the individual PLL loops. Additionally, in each channel there is preferably an individual DLL loop which generates the reference code signals for itself and the individual PLL loop of the channel. In preferred embodiments of this application of the present invention, the vector common tracking loop has a higher bandwidth than the individual PLL feedback adjustment loops of the individual tracking channels. In further preferred embodiments, the clock rate for the reference code signals is corrected by a correction signal generated by the channel's PLL circuit or by the vector common tracking loop.

As a further application of the present invention, one or more antenna elements are added for a total of M antennas, each antenna receiving up to N satellite signals to be tracked. The receivers according to these further embodiments are augmented to include additional tracking channels, for example up to M*N tracking channels, and the vector common tracking loop is expanded to include the additional tracking channels.

BRIEF DESCRIPTION OF THE DRAWINGS

FIG. 1 shows a block schematic diagram of an exemplary unification of a plurality of individual PLL tracking circuits and a vector common tracking loop in a navigation receiver, in the case of one antenna, according to the present invention.

FIG. 1A shows the block schematic diagram of an exemplary unification of a plurality of individual PLL tracking circuits and a vector common tracking loop in a navigation receiver in the case of M antennas, according to the present invention.

FIG. 2 shows a block schematic diagram of an exemplary unification of individual PLL and DLL circuits with a common phase loop which may be used when the antenna is held in a fixed position, according to the present invention.

FIG. 3 shows a block schematic diagram of an exemplary unification of the individual PLL and DLL circuits of one channel with common coordinate and phase loops which may be used when the antenna is moving, according to the present invention.

FIG. 4 shows a block schematic diagram of a modified individual channel, according to the present invention.

FIG. 5 shows a block schematic diagram of a controlling loop and a controlled loop.

FIGS. 6–9 show schematic block diagrams of representative filter topologies which may be employed in embodiments according to the present invention.

FIG. 10 shows a schematic diagram of a small signal model for an exemplary individual phase lock loop (PLL) according to the present invention.

FIG. 11 shows a schematic diagram of a small signal model for an exemplary common coordinate loop according to the present invention.

FIG. 12 shows a schematic diagram of a small signal model for an exemplary common phase loop according to the present invention.

FIG. 13 shows a schematic diagram of a small signal model for an exemplary second-order phase lock loop according to the present invention.

FIG. 14 shows a schematic diagram of a small signal model for an exemplary third-order phase lock loop according to the present invention.

FIG. 15 shows a partial schematic diagram of a common phase loop to show a first exemplary loop configuration for enabling accurate tracking of the satellite reference frequencies according to the present invention.

FIGS. 16 and 17 show a partial schematic diagrams of common phase loops to show additional exemplary loop configurations for enabling accurate tracking of the satellite reference frequencies according to the present invention.

FIG. 18 shows a schematic diagram of an exemplary common phase loop for L2-band signal channels which corrects for rotations of the antenna about the vertical axis according to the present invention.

FIG. 19 is an isometric drawing showing an exemplary local coordinate system (vehicle body) within an exemplary global coordinate system (Earth-centered, Earth-fixed) which is useful for the derivation of the Jacobian matrices H' for the embodiments which track multiple satellites with multiple antennas according to the present invention.

DETAILED DESCRIPTION OF THE PREFERRED EMBODIMENT

In a first embodiment according to the present invention, as shown in the block schematic diagram of FIG. 1, the receiver comprises N tracking channels with N respective (individual) PLL circuits tracking the carrier phases of N satellites. The construction of an exemplary PLL loop is described in greater detail below with reference to FIG. 3. The embodiment further comprises a vector common tracking loop which tracks disturbances which are common to the phases of all the satellite carrier signals, so-called "common disturbances." The vector common tracking loop provides correction signals $W_1, \ldots, W_K, \ldots, W_N$ to the individual PLL circuits and, as an option, may provide a phase correction signal Uq (also called the "phase control signal" Uq) to the main reference oscillator 26 of the receiver. (As indicated above, the frequency of a reference oscillator, including main reference oscillator 26, may vary with the time.) These correction signals W from the vector common tracking loop modify the operation of the PLL circuits. The correction $W_K$ signal to the k-th PLL circuit is combined with the PLL's phase-error signal $EP_K$, preferably after $EP_K$ has been filtered by a respective filter 28 ($F_K(P)$). This combination is performed by a respective summator 31, as described below in greater detail.

Also, in each channel there is an individual DLL circuit where the clock rate of the reference code signal may be corrected by a control signal generated by the channel's PLL circuit, or optionally, may be corrected through corrections made to the main reference oscillator 26 by the vector common tracking loop. Each of these components are described in greater detail below. While correction of the individual DLL circuits by the vector common tracking loop is advantageous, the use of this correction is not needed to practice some embodiments of the present invention.

The input signal of the receiver (INPUT), after initial amplification and filtering, is frequency down-converted to an intermediate frequency with the help of a reference signal ③ which is generated by a frequency generator 25. Generator 25 also generates at least two other reference signals ① and ②. The initial amplification and filtering are well known to the art and do not form part of the present invention, and are therefore not shown. To generate its signals from main reference oscillator 26, generator 25 may divide down the frequency oscillations from the output of oscillator 26, such as by using counters, or may provide the output of oscillator 26 to a synthesizer to multiply the frequency by an integer multiple (up-convert), or may simply pass through the output unaltered. In each case, the frequency of the signals generated by generator 25 are proportional to the output frequency of main reference oscillator 26 by a constant of proportionality, and change in value as the output frequency of oscillator 26 changes, the degree of change being related to the constant of proportionality. Thus, the vector common tracking loop may vary all of the reference signals of generator 25 by varying the oscillation frequency of oscillator 26.

The down-converted signal $U_{INP}$ is applied to all the channels of the receiver, and in each of the channels a number of correlators produce the correlation signals describe above: signals I, Q, and dI for a coherent implementation, and signals I, Q, dI, and dQ for an incoherent implementation. Each set of correlation signals is used to generate the error signals Ed and Ep for the DLL and PLL circuits of its respective tracking channel. For the sake of visual simplicity, FIG. 1 only shows the 1-st and the N-th channels, where the signals are marked with the corresponding indexes 1 and N as subscripts on the signal notations. The error signals for the k-th tracking channel are denoted by using the subscript "K" as follows: $Ed_K$ and $Ep_K$. The delay-error signal $Ed_K$ is generated by a respective code-delay discriminator in the DLL circuit (the "DLL discriminator"), and the phase-error signal $Ep_K$ is preferably generated by a respective carrier-phase discriminator in the PLL circuit (the "PLL discriminator"). As is known in the art, each correlator use a finite accumulation period $T_A$ to correlate the input signal with the reference signals. The correlation signals are therefore discretized in time and their values are provided at a frequency of $f_A=1/T_A$. Because the error signals $Ed_K$ and $Ep_K$ are based on the correlation signals, their information rate is limited to $f_A=1/T_A$, and their values are also provided at a rate of $f_A=1/T_A$. In typical implementations, $f_A$ may range between 10 and 1,000 times per second. Exemplary implementations for correlators and discriminators are well known to the art and we have provided many examples thereof in a previous section of this patent. As is conventionally known, each tracking channel may be implemented entirely with analog components, or entirely with digital components, or with a combination of both analog and digital components.

The individual PLL circuits also generate a phase output signal for the vector common tracking loop. The PLL's phase output signal is representative of the phase difference between the satellite carrier signal being tracked by the PLL circuit and the corresponding reference carrier signal of the PLL circuit. The phase-error signal $Ep_K$ of the PLL is also representative of such a difference, and is used for the PLL's phase output signal for the vector common tracking loop in preferred implementations of the system shown in FIG. 1. However, one skilled in the global-positioning art will appreciate that PLL may use an additional circuit to generate the PLL's phase output signal in a different form. In either case, the phase output signal is based on one or more correlation signals, and thus its values are provided to the vector common tracking loop at a rate of $f_A=1/T_A$.

The error signals $Ep_K$ and $Ed_K$ are filtered by respective loop filters $F_K(p)$ and $\Phi_K(p)$ to generate corresponding "local" control signals for the PLL and DLL circuits. Filters $F_K(p)$ are shown at reference numbers 28 in FIG. 1. The local control signals of the individual PLL are designed herein as $U_1, \ldots, U_N$, and each is combined with a respective correcting signal $(W_1, \ldots, W_N)$ from the vector common tracking loop, and preferably with a respective program signal $(r_1, \ldots, r_N)$, the last of which accounts for the effects of Doppler shifts in the satellite carrier signals because of the satellites' movement. These signals are combined by a respective summator 31, and the combined signal ($U_K+W_K+r_K$) for the k-th channel is designated as $U_{T,K}$. Each of these combined signals ($U_K+W_K+r_K$) is used to control the phase and frequency of the individual generator 29 of the reference carrier signal in each channel. In this manner, each correction signals $W_K$ modifies the operation of its corresponding tracking channel by modifying the phase and frequency of the channels generator (NCO) 29. The output of generator 29 is in quadrature format and is provided back the correlators of the channel on a respective signal line 32. This forms a PLL feedback loop which includes the channel's PLL discriminator 27, PLL loop filter 28, generator 29, and the correlators whose outputs are used by the PLL discriminator 27. In preferred embodiments, the characteristics of the PLL filter 28 are selected to make the feedback loop second-order and with a selected bandwidth. In the illustrated embodiment of FIG. 1, a digital implementation is used and generator 29 is implemented with a numerically-controlled oscillator (NCO). (In analog PLL implementations, generator 29 may comprise a voltage-controlled oscillator).

The program signals ($r_1, \ldots r_N$) are generated based on the forecast of the satellite's movement (which may be readily determined from the low-frequency information signal), and take into account the corresponding Doppler shifts of the satellite carrier frequencies and other factors which can be forecasted. Specifically, each program signal $r_K$ comprises the following two components: a variable factor $r_{D,K}$ which represents the present Doppler shift of the k-th satellite signal, and a constant factor $r_C$ which represents the nominal down-converted frequency, or "pedestal" frequency, of the satellite carrier signal, as provided at the input of the correlators. A GPS satellite signal has a nominal L1-band carrier frequency of $F_1=1575.42$ MHz, and is usually down-converted to some non-zero pedestal frequency (e.g., 10 kHz, 1 MHz, and so on) by the time it is presented to the correlators. Factor $r_C$ represents this pedestal frequency and is usually the same for all GPS signals since all GPS signals are transmitted at the same nominal carrier frequency, and since the receiver usually down-converts the frequency of each satellite signal by the same amount. The Doppler shift of the satellite signal is not affected by the down-conversion process, and the factor $r_{D,K}$ may be readily predicted from the 50-Hz low frequency information signal and a course location of the receiver (as provided by the navigator unit). In the case of GLN satellite signals, the receiver's pedestal frequencies are usually different for the different satellites since GLN satellites transmit at different nominal carrier frequencies. Factor $r_C$ will be different for each satellite, and these factors are designated as factors $r_{C1}, \ldots, r_{CN}$. Like the GPS signals, the Doppler shift of a GLN satellite signal is not affected by the down-conversion process, and the factor $r_{D,K}$ may be found as previously described. It is important to note that embodiments of the present invention, such as those illustrated by FIG. 1, will operate without including the Doppler factors $r_{D,K}$ in the program signals $r_K$. Nonetheless, the inclusion of the Doppler factors $r_{D,K}$ improves the performance of the individual PLL circuits. Apparatuses and methods for generating the program signals are well known to the GPS/GLN art and do not form part of the present invention in its broadest embodiments.

Processing in the Vector Common Tracking Loop

The correcting signals ($W_1 \ldots W_N$) are generated on the output of the vector common tracking loop, which combines positional information from all of the tracking channels of the receiver. The input of the vector common tracking loop is an N-dimensional vector $E_p$ of the PLL phase output signals. For the illustrated embodiment shown in FIG. 1, we have used the phase-error signal $Ep_K$ of each PLL circuit for its phase output signal, in which case the components of vector $Ep=(E_{P1}, \ldots E_{PK}, \ldots E_{PN})$. While the vector common tracking loop could be implemented with analog circuits, it is preferred to implement it with a digital signal processor running under the direction of a control program. This is easily done since the rate at which the input vector $E_p$ of signals is updated is slow in comparison to typical processor speeds.

The vector $E_P$ of phase output signals is used to generate a vector $V_D$ which is representative of a change of the antenna's position within a selected coordinate system, and a change in the frequency of main reference oscillator 26. The generation of vector $V_D$ is generally shown at reference numbers 42 and 43 in FIG. 1. The structure of vector $V_D$ was described in a previous section of this patent, and is generated in the form [1] provided above using $E_p=Z$. As already has been said in that previous section, the generated form [1] is usually performed in all GPS and GLN receivers when solving the navigation task and also in the vector DLL. The specific generated form is $$V_D = G \cdot E_P,$$

where $$G=(H_1^T \cdot R^{-1} \cdot H_1)^{-1} \cdot H_1^T \cdot R^{-1} \text{ and } V_D=(X, Y, Z, \Phi_q).$$

As indicated in the previous section, the components X, Y, and Z of $V_D$ are the displacements of the three spatial coordinates of the antenna's phase center in any selected coordinate system, and $\Phi_q$ is representative of the phase fluctuation of main reference oscillator 26. By convention in the GPS art, each of the components, including $\Phi_q$, has the units of meters. (The signal $\Phi_q$ is proportional to the drift in the local time scale and is provided in units of distance, with the constant of proportionality being the speed of light, by convention.) The spatial components may be grouped together as a sub-vector $V_C$ of vector $V_D$. Also, the matrix R may be set equal to a diagonal unity matrix (R=I) in some instances for simplicity, in which case matrix G may be more simple generated in the form: $G=(H_1^T \cdot H_1)^{-1} \cdot H_1^T$. It may be appreciated that the above processing provides the step of detecting a change in the position of the antenna within a selected coordinate system and the fluctuations of the main reference oscillator, as represented by vector $V_D$, from the group of phase output signals $E_p$ from the individual PLL circuits. Since the group of phase output signals $E_p$ are updated at a rate of $f_A$, the values of vector $V_D$ are also updated at a rate of $f_A$.

As is known in the global positioning art, there are a number of spatial coordinate systems for representing the position of an object in three dimensions. The most commonly used coordinate systems are the ECEF, Cartesian, geodesic, and topocentric systems. Other systems are the cylindrical coordinate system and the spherical coordinate system. As is well known in the art, each of these systems may be used to represent positions in a two-dimensional space by holding one of the three coordinates fixed. The present invention may be used with any spatial coordinate system, with X, Y, and Z representing the three coordinate axes of the chosen system. There are well known transformations for converting the coordinate of a position in one system to all of the other systems, and such transformations can be readily derived by those of ordinary skill in the art. The choice of a coordinate system is not critical to practicing the present invention and does not form part of the present invention.

We also refer to the components X, Y, Z of $V_D$ as the output signals of "the common-coordinate-loop discriminators", and the component $\Phi_q$ as the output signal of "the common-phase-loop discriminator" in view of what the signals represent and how they are generated. The terms "common-coordinate-loop discriminators" and "common-phase-loop discriminator" refer to the fact that there are no independent discriminators for the coordinate and phase loops because the generated form [1] provided above performs the duties of the discriminators in a coordinated and common manner. (In the case that the receiver's antenna is maintained in a fixed position, the common coordinate loops may be eliminated, and the common phase loop may be generated according to a form provided below in greater detail.)

As the next step in the processing of the vector common tracking loop, the common discriminator output signals X, Y, Z, and $\Phi_q$ are applied to respective loop filters 46 with the transfer functions $F_X(p)$, $F_Y(p)$ $F_Z(p)$, and $F_q(p)$, which transform them into the respective control signals of the common loops: $U_X$, $U_Y$, $U_Z$, and $U_q$. The filters 46 are preferably dynamic filters, meaning that their characteristics can be be adjusted during operation, if desired. The control signals may be represented in vector form: $U=(U_X, U_Y, U_Z, U_q)^T$, and the control signals $U_X$, $U_Y$, $U_Z$ may be group together as a sub-vector $U_C$ and considered as a vector of the common coordinate control signals: $U_C=(U_X, U_Y, U_Z)^T$. Control signal $U_q$ is the phase correction signal which is used to correct for the frequency fluctuations of the main reference oscillator 26. Each of the filters $F_X(p)$, $F_Y(p)$ $F_Z(p)$, and $F_q(p)$ preferably has a transfer function of the form:

$$F^*(p)=K_1+K_2/p+K_3/p^2,$$

where p is the Laplas (Laplace) transform operator, and the coefficients $K_1$, $K_2$, $K_3$ are the corresponding parameters of the filter $F^*(p)$, which set the desired frequency response of the common loop and its equivalent pass band. The transfer function is easily implemented by a digital signal processor operating under the direction of a control program. The transfer functions have units of Hertz/meters, and their output signals have units of Hertz. By convention, the matrix elements of matrices G, H, and $H_1$ have no units (they are dimensionless).

The values of coefficients $K_1$, $K_2$, and $K_3$ for all the coordinate loop filters may be the same, or they may differ for different coordinate loop filters. These coefficients are preferably chosen in accordance with a priori data about the nature of the receiver movement. For example, the maximum expected accelerations and maximum expected acceleration derivatives of the receiver in each of the three coordinate directions are preferably used to set the coefficients of the corresponding filter $F_X(p)$, $F_Y(p)$, $F_Z(p)$.

The values of coefficients $K_1$, $K_2$, and $K_3$ of the phase loop filter $F_q(p)$ are chosen in accordance with a priori data about the frequency fluctuations of the main reference oscillator 26. We describe this in greater detail below after we finish the overall description of the present invention.

The processing which occurs next in the vector common tracking loop can be divided into two parts. The first part tracks the changes in the receiver's spatial coordinates (e.g., Cartesian, geodesic, and topocentric, etc.). This part in the general case comprises three spatial-coordinate feedback loops, each of which corresponds to one of the three spatial coordinates (X, Y, Z). In a special case when it is known beforehand that the user can move only in a two-dimensional surface (e.g., in a horizontal plane in the geodesic system), it is possible to operate with just two spatial-coordinate loops rather than three (e.g., the X-latitude, Y-longitude). In the first part, an N-dimensional vector $W=(W_1, \ldots, W_N)^T$ of correction signals is generated from the vector $U_C$ of common coordinate control signals by a process which multiplies the Jacobian matrix H by vector $U_C$: $W=H \cdot U_C$, or by a process which produced equivalent results. This processing is generally shown at reference numbers 49 and 50 in FIG. 1. As previously indicated, the correcting signals $W=(W_1, \ldots, W_N)^T$ are then combined with the PLL control signals $U_1, \ldots, U_N$ of the individual channels and with the program signals $r_1, \ldots, r_N$ on an element-by-element basis (i.e., $U_K+W_K+r_K$) by a corresponding summator 31. The combined signals are used to control the phase and frequency of the individual generators 29 of the reference carrier signal in each channel (NCO), thereby modifying the operation of the individual PLL loops. It may be said that each NCO receives an input signal in the units of Hertz, and generates an output phase signal having units of meters. In this part, there are three common feedback loops for the three spatial coordinates (X, Y, and Z) whose characteristics may be set of the filters $F_X(p)$, $F_Y(p)$, and $F_Z(p)$. Exemplary constructions for the filters and for the matrices H and G are provided below after describing the second part.

The second part of the processing tracks the phase fluctuations of the main reference oscillator 26 and corrects for them. This part has only one phase feedback loop. It has a loop filter $F_q(p)$, whose frequency-response characteristics take into account the structure of the frequency spectrum of these fluctuations, and its output provides the phase correction signal $U_q$. The phase correction signal $U_q$ may be used in different ways. According to one approach of the present invention, the phase correction signal $U_q$ is used for the frequency adjustment of the receiver's main reference oscillator 26, which is used to generate the other reference clocks from generator 25 (see outputs ①, ②, and ③), and in turn the reference code signals and reference carrier signals of the tracking channels. In this approach, signal $U_q$ is provided to main reference oscillator 26 as an input. By using this approach, one can increase the stability of the receiver's main reference oscillator 26. Another approach according to the present invention comprises the step of adding the phase correction signal $U_q$ to each of the components $W_1 \ldots W_N$ of the coordinate correcting signal for the individual PLLs. This step is equivalent to using the complemented Jacobian matrix $H_1$ instead of the regular Jacobian matrix H to generate the correction signal vector W. In this latter approach, one achieves an improvement in the dynamic adjustment properties of the PLL and DLL circuits relatively to the main reference oscillator fluctuations Oust as in the case when $U_q$ is provided to main reference oscillator 26), but one does not achieve improved stability of the main reference oscillator 26. This approach is more simple in realization. In both of these approaches, the correction signal $U_q$ modifies the operations of the PLL loops by modifying the phase outputs of the NCOs 29.

It may be appreciated that the two processing parts do not always have to be present together in every embodiment of the present invention. For example, if the phase fluctuations in the main reference oscillator 26 are minimal for the accuracy desired or are corrected by other means, then only the above first processing part may be performed. In this case, matrix G may be generated from matrix H rather than from $H_1$. As another example, if the antenna is held in a fixed position, then only the second processing part may be performed (below, we give another processing approach for when the antenna is held in a fixed position).

Generation of Matrices G and H

Let us now provide definitions of the matrices H and G that are widely used in the solution of the usual navigation task. The Jacobian matrix H comprises an array of matrix elements which specify the mathematical derivatives of satellite pseudo-ranges $R_J$ with respect to the antenna coordinates (X, Y, Z): i.e., the J-th row of $H=(\partial R_J/\partial X, \partial R_J/\partial Y, \partial R_J/\partial Z)$. Matrix H relates changes in the measured pseudo-ranges of the N satellites $(R_1, R_2, \ldots, R_J, \ldots, R_N)$ to changes in receiver's spatial coordinates: $\Delta X, \Delta Y, \Delta Z$. By multiplying a set of coordinate changes $(\Delta X, \Delta Y, \Delta Z)$ by the matrix H, the corresponding changes in the pseudo-ranges may be found: $(\Delta R_1, \Delta R_2, \ldots, \Delta R_J, \ldots, \Delta R_N)$. The matrix G, which is the pseudo-inverse matrix (also called generalized inverse matrix) of $H_1$, performs the reverse process. By multiplying a set of changes in the pseudo-ranges $(\Delta R_1, \Delta R_2, \ldots, \Delta R_N)$ by the matrix G, the corresponding changes $(\Delta X, \Delta Y, \Delta Z)$ in the receiver's coordinates may be estimated. Matrices H and G are used in the navigator unit of most GPS receivers to compute the receiver's position using well known iterative computation processes. In general, matrix G is a pseudo-inverse matrix of $H_1$ if it satisfies the relationships $G \cdot H_1 \cdot G = G$ and $H_1 \cdot G \cdot H_1 = H_1$.

In our invention, we have used matrices H and G for the additional task of generating the correction signals $W_1, \ldots, W_N$. The correction signals are applied to PLL circuits of the individual tracking channels, which are indirectly measuring the satellite-receiver pseudo-ranges by tracking the corresponding pseudo-range time delays $\tau$. (Neglecting various error factors, each time delay $\tau$ is the time between transmission by the satellite and reception by the receiver's antenna). Aside from various errors, the pseudo-range $R_J$ between the J-th satellite and the receiver is equal to $R_J = (\tau_J + \delta_\tau)^* c$, where $\tau_J$ is the time delay, c is the speed of light, and $\delta_\tau$ is the drift in the local time scale. (The quantity $\tau_J^* c$ is the distance between the satellite and the receiver.) By multiplying a set of coordinate changes $(\Delta X, \Delta Y, \Delta Z)$ by the matrix H, the corresponding changes $(c \cdot \Delta \tau_1, c \cdot \Delta \tau_2, \ldots, c \cdot \Delta \tau_N)$ in the pseudo-range delays, as scaled by the speed of light c, may be estimated. Also, by multiplying a set of scaled changes in the pseudo-range delays $(c \cdot \Delta \tau_1, c \cdot \Delta \tau_2, \ldots, c \cdot \Delta \tau_N)$ by the matrix G, the corresponding changes $(\Delta X, \Delta Y, \Delta Z)$ in the receiver's coordinates may be estimated.

The satellites continuously move in the selected coordinate system in highly predictable orbits. Their motion effects the pseudo-ranges, and it is necessary to periodically recalculate the matrixes G and H during operation. Such recalculation is performed by the Navigator unit shown in FIG. 1. The recalculation of the matrix elements is done periodically or intermittently, and the time between recalculations may be relatively long (e.g., once every second to ten seconds) if processor resources economy is necessary. During the time between recalculations, the matrix elements may be extrapolated from their previous calculated values. At present, it is preferable to recalculate the matrix elements periodically, and to extrapolate the matrix elements between recalculations. While the present invention uses the H and G matrices, the method of calculating H and G is well known to the GPS/GLN art, and does not form part of the present invention. The Navigator unit takes into account the forecasted changes in the satellite constellation composition and also other useful information that can be predicted. So, for example, it is possible that when calculating of the matrix G (from the H and R matrices) it would be useful to give a smaller weight (in the matrix R) to those satellites which have low elevation because the probability of signal distortion is particularly higher for those satellites.

Exemplary Filter Structures

As mentioned above, the loop filters for the common loops have the form $F^*(p) = K_1 + K_2/p + K_3/p^2$ in preferred embodiments of the present invention. This form be achieved by the filter topology shown in FIG. 6, where each $K_1$, $K_2$, and $K_3$ block represent multiplication of the input signal by the amount shown in the block, where the "+" block represents summation, and where each $\Sigma_1$, $\Sigma_2$, and $\Sigma_3$ block represent integration (or accumulation). This filter topology has three parallel signal processing paths which receive the signal to be filtered and separately process the signal. The outputs of the paths are combined by the summator to provide the filtered output. The first path multiplies the signal by a first gain factor $K_1$, the second path multiplies the signal by a second gain factor $K_2$ and integrates the signal with one integrator (or accumulator), and the third path multiplies the signal by a third gain factor $K_3$ and integrates the signal with two integrators (or accumulators). In each of the second and third paths, the positions of the integrator(s) and the gain block may be exchanged.

There are several other filter topologies which provide the equivalent filter transfer function. Some of these are shown in FIGS. 7–9. In FIG. 7, the third integrator $\Sigma_3$ has been removed and the output of the second integrator $\Sigma_2$ has been routed to the input of the first integrator $\Sigma_1$ through a second summator. This enables the first integrator to provide the function of both the first and third integrators. The topology shown in FIG. 8 is similar to that of FIG. 7, but the multiplication by gain factor $K_1$ has been moved so that it occurs after the summation of the three paths. The topology shown in FIG. 9 is similar to that of FIG. 8 except that the ordering of the gain multiplication step and the integration step has been exchanged. In each of these cases (and in their equivalents), the input signal may be traced through three distinct paths, with the final result of the first path being the multiplication of the input by $K_1$, the final result of the second being the multiplication of the input by $K_2$ and one stage of integration, and the third being multiplication of the input by $K_3$ and two stages of integration.

Benefits of the Vector Common Tracking Loop

The combination of the vector common tracking loop with the N individual PLL circuits produces a multi-circuit adjustment system with new useful properties. As indicated above, some of the outside factors which change the phases of the satellite carrier signals are common to all of the satellite carrier signals, and therefore common to all of the channels. These factors comprise the movement of the receiver's antenna and the frequency fluctuations of the receiver's main reference oscillator. The impacts of these factors are mainly tracked with the vector common tracking loop. Other outside factors are specific to individual satellite signals (and their corresponding channels), and act substantially independent from one another. These factors are the selective availability (in the GPS), a substantial part of the atmosphere delays, frequency fluctuations in the satellite's reference oscillators, and errors in the forecasted satellite movement. The impacts of these factors are mainly tracked separately by the individual PLL circuits. Since the common impacts have a substantially wider spectrum (bandwidth) than the satellite-specific ones, the vector common tracking loop can have a wider bandwidth than the bandwidths of the feedback loops of the individual PLL circuits, and can sometimes have a higher servo-system type (or order) than the individual PLL loops. In further embodiments, each channel's DLL loop may have the phase of its reference code signal corrected by a correction signal 33 which is generated from the correction signal W for the channel's PLL loop. (Correction signal 33 is denoted with reference number $33_K$ for the DLL circuit of the k-th tracking channel). Each channel's DLL loop may also have the phase of its reference code signal corrected by changes made to the main reference oscillator 26 by the vector common tracking loop. Therefore, in these embodiments, the advantages provided by the presence of the vector common tracking loop for carrier phase tracking can be automatically provided to the tracking of the code-signal delays in the DLL circuits, and a vector common tracking loop for the reference code signals in the DLL circuits would not be necessary.

It should be mentioned that some of the inventive features of the present invention may be applied to receivers that have incoherent channels; such channels have incoherent DLL circuits but no PLL circuits. In such a case, each tracking channel would have its own individual DLL circuit, but the outputs of the DLL circuits would also be provided to a common vector DLL loop. The common DLL vector loop would have a larger bandwidth than the individual DLL circuits, and the outputs of the vector DLL loop would provide correction signals that would be added in with the local DLL control signals, and optionally could provide a correction signal to the main reference oscillator.

Inter-Channel Interference and Decoupling of Disabled PLL Circuits

With the employment of the individual PLL circuits with the vector common tracking loop, there is a chance that inter-channel interference will occur between the tracking channels under certain circumstances. Inter-channel interference is caused by the reciprocal influence each of the individual circuits has on another through the above application of the G and H matrices in generating the correction vector W and the phase correction signal $U_q$. Inter-channel interference usually occurs when one of the PLL circuit loses lock, and may result in the loss of track or cycle slips in the PLL circuits of one or more of the other channels.

To prevent the possibility of such inter-channel interference occurring, further embodiments of the present invention include circuitry for continuously monitoring the signal quality of the satellite signal in each tracking channel and for generating an alarm signal for each channel when its signal quality falls outside of an acceptable operating range. These embodiments also include circuitry for decoupling the channel from the vector common tracking loop when its alarm signal is generated. The signal quality may be judged in a number of ways, such as from the signal-to-noise ratio of the incoming satellite signal, and/or from monitoring when the magnitude of the PLL discriminator output exceeds an acceptable upper limit (which would indicate loss of lock). The affected tracking channel may then be re-coupled to the vector common tracking loop when signal quality of the affected satellite improves. A typical example of when an alarm signal would be generated and the channel subsequently decoupled is when there is a short-term shadowing of the satellite signal being tracked by the affected channel.

While the decoupling of a single tracking channel from the vector common tracking loop can usually be tolerated without failure of the system, decoupling of several affected channels can sometimes cause the operation of the entire system to fail. To prevent such failure, the following steps may be taken. When an individual PLL circuit is decoupled from the vector common tracking loop, a substitute signal may be provide to the vector common tracking loop which effectively substitutes for the phase output signal, or the vector common tracking loop may be reconfigured to account for the loss of information from the disabled PLL circuit. The latter approach is described next, with an example of the first approach being provided in the discussion of FIG. 2. In the reconfiguration approach, the matrix G is immediately recalculated (before the normal time of its periodic or scheduled recalculation) with the satellites of the affected channels being removed. The re-calculation of matrix G is performed by the receiver's navigator unit shown in FIG. 1 in response to a request by the vector common tracking loop, which provides an indication as to which satellite signals have been affected. The immediate recalculation will cause an unplanned increase in processor load (the navigation unit is typically implemented by a microprocessor which handles other tasks), which is acceptable for high performance processors or processors which have excess capacity. For lower performance processors or for processors which do not have much excess capacity, a second manner of reacting to the immediate need to recalculate the G matrix is to replace the disconnected PLL with an equivalent circuit which would partially substitute for it in the multi-circuit loop system. The substitution enables the tracking characteristics of the multi-circuit loop system to be preserved within acceptable limits until the affected channels are restored or until a next scheduled recalculation of the G matrix.

The following specific steps may be taken when recalculating matrix G under the condition of the shadowing of one or more satellite signals. Prior to the shadowing event, let us assume that there are "n" satellite signals being tracked by the receiver. For these n satellites, the receiver would have the matrices: $H^n$, $H_1^n$, $R^n$, and $G^n$. When the shadowing event occurs, let us then assume that "p" satellite signals are shadowed, and that m=n–p signals remain to be tracked. To immediately re-calculate matrix G, one may take the existing matrices $H_1^n$ and $R^n$, remove the rows of these matricies and the columns of matrix R which correspond to the "p" satellite signals that have been shadowed to form two new matrices $H_1^m$ and $R^m$, and then compute a new matrix $G^m$ as $G^m = [(H_1^m)^T \cdot (R^m)^{-1} \cdot (H_1^m)]^{-1} \cdot (H_1^m)^T \cdot (R^m)^{-1}$. These matrices are referred to as the "reduced" matrices $H^m$, $H_1^m$, $R^m$, $G^m$ because rows and columns have been removed. During the shadowing event, the generation of signals $W_1, \ldots, W_N$ from signals $U_1, \ldots, U_N$ continues to be performed at blocks 49, 50 in FIG. 1 with the use of matrix $H^n$, rather than with new matrix $H_1^m$. This latter step enables the common vector tracking loop to track and to predict the phase changes of the shadowed satellite signals (as well as the non-shadowed ones) during the shadowing event. When the short term shadowing event is over, the previously removed rows and columns are added back to the reduced matrices, usually to their original numbers of rows and columns. We call these matrices the "augmented" matrices because the rows and columns have been added.

As a further feature of these embodiments, the correcting signals W and $U_q$ are provided to the reference carrier generator (NCO) of the affected channel during the short-term shadowing event. As a result of this feature, when the short-term shadowing is over, the PLL circuit of the affected channel will automatically be restored to the synchronism mode, in most cases in the same point for the PLL circuit (i.e., without a cycle slip). Additionally, since correction signals $33_1, \ldots, 33_N$ are provided to the DLL circuits and since signals $33_1, \ldots, 33_N$ reflect the corrections provided by signals W and corrections for the Doppler shifts due to of the satellites' movements, the short term shadowing will not result in lost of lock in the DLL circuits as well.

Adaptability of the Vector Common Tracking Loop

The entire navigation receiver built according to the generalized embodiment shown in FIG. 1 comprises a multi-circuit system of whose topology and parameter values can be automatically changed and adjusted in response to predictable events and accidental events. The predictable events derive mainly from the orbit movements of the satellites. For example, the matrixes G and H are re-calculated several times per minute during operation. Also, the Doppler frequency shifts in the satellite signals are predictable events which are accounted for by the program signals $r_1, \ldots, r_N$.

The information about the way in which the receiver will be used can also lead to recognizing a predictable event. For example, if it is known beforehand that the receiver will be held immoveable during each measurement session in a number of measurement sessions, then it is advantageous to switch off the common coordinate loops during each session (in this case these loops would only hinder). It may be further advantageous to also change the manner in which the phase correction signal $U_q$ is used to provide corrections (Such as manner described with respect to FIG. 2). After completing a stationary measurement session, it is advantageous to switch on the coordinate tracking loops back on while the receiver is being moved to the next location for the next stationary measurement session. In this way, the receiver maintains the tracking of the satellites between the stationary measurement sessions in a more reliable manner. Therefore, in this example, the topology of the vector common tracking loop is being changed in response to a predictable event.

The accidental events most frequently encountered are connected with the short-term shadowing of the radiosignals, or with the sudden appearance of the strong fluctuating reflections from local objects. As mentioned above, in this case the channel affected by the shadowing should be decoupled or disconnected from the vector common tracking loop, and matrix G should be recalculated based on a reduced matrix H. This leads to a change in the topology of the vector common tracking loop.

Discussion of FIG. 3

Several of the above features of the embodiment of FIG. 1 are described in greater detail with reference to FIG. 3. FIG. 3 is a more detailed view of an exemplary receiver channel which uses coherent demodulation (therefore dQ signal is not needed), and shows those relevant portions of the vector common tracking loop that couple into the shown receiver channel. Those portions of the vector common tracking loop which are not shown in FIG. 3 are readily found in FIG. 1.

Referring to FIG. 3, each (k-th) individual channel ($1 \leq k \leq N$) uses the output signal 41 of the discriminator 27 as the phase output signal $E_{PK}$ for the vector common tracking loops, and provides the phase output signal $E_{PK}$ through a switch 54. The phase output signal $E_{PK}$ is multiplied by the corresponding matrix elements of a pseudo-inverse matrix G of a geometric Jacobian matrix $H_1$, as previously described, with the resulting multiplication signals being shown at 42 in FIG. 3.

Matrix G comprises the elements $g_{ik}$, where i is the row number (i=1, 2, . . . , 4) of the matrix G, k is the column number (k=1, 2, . . . , N) of G. The phase output signal $E_{PK}$ of the k-th individual channel is multiplied with the elements of the k-th column of the matrix G and the four resulting products $(g_{1k}*E_{PK})$, $(g_{2k}*E_{PK})$, $(g_{3k}*E_{PK})$, and $(g_{4k}*E_{PK})$ (shown at reference number 42) are provided to four corresponding summators 43, where they are added to the similarly generated signals from other channels. (In FIG. 3 this operation is shown only for the k-th channel for visual simplicity). On the summators' outputs the output signals of coordinate discriminators X, Y, Z (shown at reference number 44) and the output signal of the phase loop discriminator $\Phi_q$ (shown at reference number 45) are generated. The loop filters 46 of the common loops generate the coordinate control signals: $U_X$, $U_Y$, $U_Z$ (shown at reference number 47) and the phase correction signal $U_q$ (shown at reference number 48).

The next step comprises the multiplication of the coordinate components $U_X$, $U_Y$, $U_Z$ onto the corresponding elements of the matrix H (shown at reference number 49). The matrix H has elements $h_{ki}$, where k is the row number of matrix H (k=1, 2, . . . , N), and i is the number of the column (i =1, 2, 3). (As indicated above, the three elements of the k-th row of the H matrix are the mathematical derivatives of the pseudo-range for the k-th satellite with respect to the receiver's coordinates.) In the case that the global coordinate system comprises a Cartesian-based coordinate system, the three elements of the k-th row of the H matrix are the direction cosines of the range vector from the receiver's antenna to the k-th satellite; in this case, each component $h_{ki}$ has a value which not more than 1, and the three components in the row conform to the relationship: $h_{k1}^2+h_{k2}^2+h_{k3}^2=1$. The correcting coordinate signal $W_k$ of the k-th channel is generated in a summator 50 in the form:

$$W_k=U_x*h_{k1}+U_y*h_{k2}+U_z*h_{k3}$$

and afterwards it is added to the control signal $U_K$ of the individual PLL of the k-th channel by summator 31. The phase correction signal $U_q$ may be used in different ways. As shown in FIGS. 1 and 3, it may be used to adjust and control the frequency of the main reference oscillator 26. As shown by the dashed line in FIG. 3, it may be provided to summator 50 and added to $W_k$. (It is also possible, although more work, to split the phase correction signal $U_q$ between these two approaches.)

As indicated above, to prevent the occurrence of inter-channel interference, further embodiments of the present invention include circuitry for continuously monitoring the signal quality of the satellite signal in each tracking channel and generating an alarm signal when the signal quality falls outside of an acceptable operating range. The affected channel is then decoupled from the vector common tracking loop when its alarm signal is generated. In the embodiment shown in FIG. 3, the decoupling is provided by a pair of switches 54a,b in each individual channel. Switch 54a decouples the phase output signal $E_{PK}$ of the PLL discriminator 27 from the G-element blocks $g_{1k}$, $g_{2k}$, $g_{3k}$, and $g_{4k}$ (the output signal of which is shown at reference number 42) when the alarm signal 52 appears in the k-th channel. As a replacement for $E_{PK}$, switch 54a provides a zero value to blocks $g_{1k}$, $g_{2k}$, $g_{3k}$, and $g_{4k}$. This causes the channel to effectively disconnect from the common loops. Switch 54b disconnects the output 41 ($E_{PK}$) of the PLL discriminator 27 from the input of PLL loop filter 28 and substitutes a zero value in its place. Signals $W_K$ and $r_K$ continue to be provided to summator 31. This action effectively opens the PLL feedback loop. However, in a short-term shadowing event, this action keeps the PLL's phase error at a value which is sufficiently close to the point of steady balance of the PLL so that the PLL circuit can quickly re-establish lock when the shadowing event ends. When the alarm signal disappears, switch 54b re-couples the output 41 of the PLL discriminator 27 to the PLL loop filter 28, thereby re-closing the PLL feedback loop. Also, preferably after a relatively short delay, switch 54a switches state to provide the phase output signal $E_{PK}$ to the G-element blocks $g_{1k}, g_{2k}, g_{3k}$, and $g_{4k}$, which again provides $E_{PK}$ to the vector common tracking loop. The preferred delay is sufficient to enable the PLL circuit to re-lock to its point of steady balance before having its phase output signal reconnected to the vector common tracking loop. The re-locking process normally involves transient changes in the value of $E_{PK}$ which might adversely affect the tracking accuracy of the vector common tracking loop.

The alarm signal 52 is generated by a signal-quality monitoring unit 53. The input of unit 53 receives the correlation signals $I_K$ and $Q_K$ from correlators #1 and #2 of the channel, and generates a quality signal $S_K$ from $I_K$ and $Q_K$. Unit 53 may generate $S_K$ in a number of forms. One exemplary form is $S_K = I_K^2 + Q_K^2$, which provides a quality signal which is proportional to the power (or the amplitude by taking the square-root of $S_K$) of the input signal from the satellite. This form is suitable for both coherent and incoherent channels. When comparing it with a pre-set threshold value, the alarm signal may be produced when $S_K = I_K^2 + Q_K^2$ falls below the pre-set value. Another exemplary form of $S_K$, which is suitable for coherent channels, is $S_K = I_K^2 - Q_K^2$, which provides a quality signal that is related to both the signal power of the satellite input signal and the PLL's tracking phase error. This form of $S_K$ can determine the loss of track in the situation when the satellite's signal power is within acceptable limits but the difference between frequencies of the satellite carrier signal and the PLL reference carrier signal is greater than an acceptable value. The output of the PLL discriminator is reflective of such a difference, and an exemplary acceptable value would be on the order of the noise band of the PLL circuit. In this case, the alarm signal is produced when the signal $S_K$, after being passed through a low-pass filter, appears to be below a prescribed threshold. In a third form, the quality signal $S_K$ is generated with the help of the phase output signal $E_{PK}$ of the PLL discriminator: namely, signal $S_K$ is set to a high value if the absolute value of $E_{PK}$ exceeds a threshold value TH ($|E_{PK}| > TH$), otherwise $S_K$ is set to zero. The high value of $S_K$ is sufficient to cause the alarm signal to be generated. These processing steps of the third form are equivalent to generating the alarm signals when the absolute value of $E_{PK}$ exceeds a threshold value TH ($|E_{PK}| > TH$).

Other forms of $S_K$ are also possible, and a combination of different forms may be used depending on the conditions of the receiver operation.

The vector common tracking loop takes signal information from the tracking channels at discrete intervals corresponding to the accumulation periods of the correlators in the tracking channels. Quality signal $S_K$ for a tracking channel may be generated at the end of each accumulation period of its correlators. A typical accumulation period is 5 ms. When signal $S_K$ is generated at the end of each accumulation period using only the information provided by the most recent accumulation period, we will characterize it as being "inertia-free", and we will include an "F" superscript on the symbol as follows: $S_K^F$. We call this the "inertia-free" signal because the value of the quality signal $S_K^F$ does not depend upon the results of previous accumulation periods.

Quality signal $S_K$ may also be generated over the span of several accumulation periods (e.g., 20 5-ms periods, corresponding to 100 ms), where an inertia-free $S_K^F$ value is generated at the end of each period but the quality signal is generated as an average of the inertia-free values. This average may be weighted or un-weighted. In this case, we will characterize the quality signal as being "averaged" or "inertial", and we will include an "I" superscript on the symbol as follows: $S_K^I$.

The averaged quality signal $S_K^I$ may be generated as a running average. An example of a running average is as follows: $S_K^I(i) = \alpha \cdot S_K^F(i) + (1-\alpha) \cdot S_K^I(i-1)$, where "(i)" represent the current accumulation period, "(i-1)" represent the previous period, where $S_K^I(i)$ is the most recent value of the inertial quality signal at the end of the most recent accumulation period, where $S_K^F(i)$ is the most recent value of the inertia-free quality signal, where $S_K^I(i-1)$ is the previous value of the inertial quality signal, and where $\alpha$ is a weighting parameter between 0 and 1.

An apparatus which generates a quality signal as a function of the form $(I_K^2 + Q_K^2)$ will be called an amplitude indicator. We will add a superscript "A" to identify this form: $S_K^A$. As it is clear from the aforesaid, such a signal may be inertia-free ($S_K^{AF}$) or inertial ($S_K^{AI}$). An apparatus which generates a quality signal using as a function of the form $\arctan(Q_K/I_K)$ will be called an angle indicator. We will add a superscript "P" to identify this form: $S_K^P$. This signal may be inertia-free ($S_K^{PF}$) or inertial ($S_K^{PI}$).

As already stated above, removing and re-introducing signal $E_{PK}$ into the individual loop and the common loops is done in response to the value of the quality signal $S_K$. In general, any of the above embodiments of $S_K$ ($S_K^{AF}$, $S_K^{AI}$, $S_K^{PF}$, $S_K^{PI}$) and other embodiments may be used for this purpose. One preferred usage is as follows:

signal $E_{PK}$ is disconnected from the vector common tracking loops if signal $S_K^{AF}$ is smaller than a certain threshold and/or signal $|S_K^{PF}|$ is large than its threshold, and signal $E_{PK}$ is disconnected from its individual loop if $S_K^{AI}$ is smaller than its threshold.

In this preferred embodiment, three quality signals are generated during operation: $S_K^{AF}$, $S_K^{PF}$, and $S_K^{AI}$.

Application #2: Coordinate and Rotation Tracking with Multiple Antennas

We have so far examined the application where only one antenna is used by the receiver. The task of the processing in this application was the determination of the antenna's phase center coordinates and also, as an option, the derivatives of this coordinates (i.e., velocities). In another application, three or more antennas are mounted on a common object (e.g., structure, member, vehicle, plane, boat, etc.) and both the coordinates of the symmetry center of the common object (or any other point on this object) and the rotation angles $\alpha$, $\beta$, and $\gamma$ of the common object about three coordinate axes are determined. The derivatives (velocities) of the coordinates and the angles may also be determined. The rotational angles $\alpha$, $\beta$, and $\gamma$ are representative of the directional orientation that the object has within the selected coordinate system.

A receiver for the second application may be constructed by complementing the previously described system with three additional common tracking loops, as shown in FIG. 1A, for tracking the rotational angles $\alpha$, $\beta$, $\gamma$ of the common object. The loop filters in this loops have the transfer functions $F_\alpha(p)$, $F_\beta(p)$, and $F_\gamma(p)$. Accordingly, the dimensionality of the matrixes H and G is increased to account for the increased number of tracking loops and the additional tracking data provided by the additional antennas. The modified matrices are denoted as H' and G'. In the maximum case, matrix G' transforms N*M input signals from M*N corresponding PLL circuits, where N is the number of visible satellites that are being tracked, and M is the number of antennas (i.e. a separate PLL circuit for each antenna-satellite pair). However, in most implemented embodiments, matrix G' transforms fewer than N*M input signals because some satellites are not visible to some of the antennas, and because the receiver may not have enough channels. Typically, one allocates a substantially equal number of satellites to each of the antennas. Thus matrix G' transforms the PLL phase output signals on its input into 7 signals (X, Y, Z, $\alpha$, $\beta$, $\gamma$, $\Phi_q$) on its output. These seven signals are representative of changes in the position (X, Y, Z) of the object, changes in the directional orientation of the object ($\alpha$, $\beta$, $\gamma$), and frequency fluctuations of the main reference oscillator 26 ($\Phi_q$)

The quantity of the individual loops in this case increases to a value up to N*M, accordingly the quantity of the control signals ($U_1, \ldots, U_{NM}$) of the individual PLLs, the correcting signals ($W_1, \ldots, W_{NM}$) and the program signals ($r_1, \ldots, r_{NM}$) increase by a corresponding amount. The sum of these signals is still used for the control of the individual generators 29 ($NCO_1, \ldots, NCO_{NM}$) of the reference carrier signals, whose number also increased.

Similarly to the X, Y, Z signals, we call the signals $\alpha$, $\beta$, $\gamma$ the output signals of the angle loops discriminators, and the signals $U_\alpha$, $U_\beta$, $U_\gamma$ the control signals of these loops. In this exemplary case the vector of output signals from the common-loop discriminators and the common vector of the control signals are 7-dimensional.

Appendix A of the patent application provides a description of how the local coordinate system of the object interacts with the global coordinate system, and describes the form of matrices H' and G' in greater detail.

Application #3: Single-Antenna Held in a Fixed Position

An elementary application for the present invention is when it is known beforehand that all the navigation measurements will be performed with the receiver's antenna held in a fixed position (the immovable case). The main objective of the vector common tracking loop would be to track the phase fluctuation of the main reference oscillator in the receiver, and the vector common tracking loop tracking of the receiver's spatial coordinates may be omitted for simplicity. FIG. 2 shows a schematic block diagram of a first generalized embodiment for this elementary application. The input signal 21 passes through the preliminary filtration 22 and several steps of frequency down-converter 23, and is then applied to the individual channels, where the signal processing from each satellite is performed. The steps of frequency down-conversion are performed with the use of a set of oscillator reference signals 24 generated by frequency generator 25. In turn, the reference signals from generator 25 are derived, or based upon, on the receiver's main reference oscillator 26, as previously described. The frequency of the signals generated by generator 25 are proportional to the output frequency of main reference oscillator 26 by a constant of proportionality, and change in value as the output frequency of oscillator 26 changes, the degree of change being related to the constant of proportionality.

Usually in the receiver there are operating simultaneously many (N) individual channels, all of them having substantially the same structure. In FIG. 2, the structure of only one channel of N channels is shown in detail for visual simplicity, and is indicated as the K-th channel ($1 \leq K \leq N$). The typical structure of the channel comprises three correlators generating the correlation signals $I_K$, $Q_K$, and $dI_K$, respectively, and two adjustment circuits: the DLL circuit and PLL circuit (coherent type channel). Each correlator typically has three sections, a first section which multiplies the input signal with the PLL's reference carrier signal to generate a first intermediate product, a second section which multiplies the intermediate product of the first section with a suitable reference code signal to generate a second intermediate product, and a third section which accumulates the second intermediate product over fixed time intervals. (For a C/A-code signal, the accumulation interval is usually an integer multiple of 1 mS, with 1 mS, 2 mS, 5 mS, and 10 mS being typical choices). The order of the multiplication sections may, of course, be reversed so that the multiplication of the input signal with the reference code signal occurs first. The form of the correlation signals was previously provided above in the background of the invention section.

The PLL circuit, which is shown in more detail in FIG. 2, comprises a carrier-phase discriminator 27, a dynamic (loop) filter 28, and a digital numerically-controlled oscillator (NCO) 29 which generates the reference carrier signal for the channel. NCO 29 has two inputs and generates a quadrature output signal based on its two input signals. The quadrature output signal of NCO 29 for the k-th channel has an in-phase component $\cos(\omega_K t + \psi_K)$ and a quadrature-phase component $\sin(\omega_K t + \psi_K)$, where $\omega_K$ represent the instantaneous frequency of the output signal and $\psi_K$ represent the instantaneous phase. (without loss of generality, the quadrature-phase component may be provided with an opposite polarity: $-\sin(\omega_K t + \psi_K)$). The first input signal to NCO 29 is a frequency reference signal (having frequency $F_S$) from generator 25, which in turn is derived from main reference oscillator 26. The second input to NCO 29 is a control signal $U_{T,K}$, which is generated by combining the output of PLL filter 28 and a forecast program signal $r_K$ (by summator 31). Signal $r_K$ provides corrections which account for the Doppler shift caused by the satellite's orbital movement. NCO 29 generates reference carrier signal 32 with a frequency which is a function of the two NCO inputs. NCO signal 32 is provided as a quadrature reference carrier signal to correlators #1–#3, where it is correlated with the input signal. The provision of signal 32 to the input of correlator #2 closes the feedback loop for the PLL circuit. Correcting signal 33 is provided to the DLL circuit, and is used by the DLL circuit, (The DLL circuit generates the three reference code signals for the correlators #1, #2, and #3). In exemplary implementations, the frequency of NCO output 32 is proportional to the multiplication product of the frequency $F_S$ and the value of the control signal $U_{T,K}$, ($F_S * U_{T,K}$). With this form, the frequency of reference carrier signal 32 changes in proportion to changes in the phase PLL control signal $U_{T,K}$ and to changes that the common phase loop will make to the frequency of main reference oscillator 26.

Thus, the clock rate of the reference code signal of the DLL circuit in the individual channel depends both upon the frequency of the main reference oscillator 26 and correction signal 33. The loop filter 28 of the PLL circuit sets the type of servo system and the equivalent pass band of the PLL feedback loop. One inventive feature of the present invention is that the pass band of the PLL circuit may be made substantially more narrow (for example, at most 5 Hz) than that typically used at the present time in prior art navigational receivers. In preferred embodiments, the PLL feedback loop is second order.

Each individual tracking channel provides a phase output signal as an input to the common phase loop. The correlation signal $Q_K$ may be used for this purpose, and the correlation signal $I_K$ may be used as a normalizing signal to derive a relative weight for the phase output signal $Q_K$. In exemplary embodiments, the $I_K$ and $Q_K$ outputs of all the tracking channels are applied to a common phase loop discriminator 34, which generate the phase signal $\Phi_q$ in the form:

$$\Phi_q = \arctan\left(\frac{\sum_{K=1}^{N} Q_K * I_K}{\sum_{K=1}^{N} I_K^2}\right), \quad (2)$$

where $I_K$ and $Q_K$ are the correlation signals of the k-th channel; and where N is the number of acting (active) channels. Here, the signals $I_K$ provide a weighting function, with stronger signals (as measured by the magnitude of $I_K$) being given more weight. Although the above generated form (2) is currently preferred, the following generated forms of $\Phi_q$ may also be used:

$$\Phi_{q'} = \left(\frac{\sum_{K=1}^{N} Q_K * I_K}{\sum_{K=1}^{N} I_K^2}\right), \text{ or } \Phi_{q'} = \left(\frac{\sum_{K=1}^{N} Q_K * I_K}{\left(\sum_{K=1}^{N} |I_K|\right)^2}\right). \quad (2')$$

In addition, the forms provided by (2') may be transformed by any odd function ODD(*) before being used: $\Phi_q$=ODD($\Phi_q'$). The arctan(*) function is an exemplary odd function. Signal $\Phi_q$ acts to detect a change in the phase or frequency of the main reference oscillator during an interval of time from the phase output signals of the individual PLL circuits. Signal $\Phi_q$ can also detect a common phase change to all of the satellite signals, which may occur from a rotation of the antenna about the antenna's vertical axis. It may be appreciated that signal $\Phi_q$ can also be generated from the G-matrix processing blocks 42–43 shown in FIG. 1 (or 42'–43' shown in FIG. 1A), in which case it would not be necessary to generate the other output signals (e.g., X, Y, Z) from blocks 42–43.

The phase signal $\Phi_q$ generated from the output of the discriminator 34 is provided to a dynamic (loop) filter 35, which generates a phase correction signal $U_q$ therefrom. Filter 35 is known as the "common phase loop filter", and $U_q$ is known as the phase correction signal. The structure and corresponding parameters of loop filter 35 are selected in view of the expected phase fluctuations characteristics of the main reference oscillator 26. One preferred filter structure has the transfer function of the form:

$$K_{PF}(p)=K_1+K_2/p+K_3/p^2, \quad (3)$$

where p is the Laplas (Laplace) transform operator, and the coefficients $K_1$, $K_2$, $K_3$ are the corresponding parameters for the structure, and which set the desired dynamic characteristics of the common phase loop and its equivalent pass band. This equivalent pass band is determined as the band of the common circuit of the carrier phase adjustment under the disconnection of all individual PLLs (i.e., under breaking of the outputs of the PLL loop filters of all channels). Filter 35 may have any of the topologies shown in FIGS. 6–9, and equivalents thereof.

The above generated form (2) of $\Phi_q$ provides a weighted summation of the signals proportional to the individual PLL output signals of the discriminator. In generated forms (2) and (2'), the weight of each channel is chosen as the value of the corresponding inphase signal $I_K$, and is approximately inverse to the variance of the PLL discriminator output signal of the given channel.

The generated forms (2) and (2') also provide for the automatic disconnection from the common loop of a channel (K=J) where the short-term shadowing of the satellite signal has occurred. This is because the corresponded components $I_J$ and $Q_J$ in the numerator of forms (2) and (2') become relatively small (e.g., very close to zero) under such a condition in comparison to their values under normal (unshadowed) conditions.

The phase correction signal $U_q$ may be used in different control methods. FIG. 2 shows one method where $U_q$ is used for the frequency control of the main reference oscillator 26. With this configuration, a feedback loop is created whereby $U_q$ varies the frequency and phase of main reference oscillator 26, which in turn varies the frequency and phase of generator 25 and NCO 29, which in turn varies the phase of the reference code signals and reference carrier signals in all of the tracking channels, which in turn change the values of the correlation signals $I_K$ and $Q_K$ (K=1,...N), which in turn change the values of $\Phi_q$ and $U_q$, thus coming full circle to form the feedback loop. In another method, the phase correction signal $U_q$ is added to all of the control signals 30 of the individual PLLs. This method is shown by the dashed signal line in FIG. 2. In each of these methods, the correction signal $U_q$ modifies the operations of the PLL loops by modifying the phase outputs of the NCOs 29. As in each of these methods, the equivalent pass band of the common phase loop may be made wide enough to precisely track the phase fluctuations of the main reference oscillator 26, and is preferably set to do so. The width of the equivalent pass band may be made substantially larger (almost an order of magnitude larger (10×)) than the pass band of an individual PLL. However, because of the joint action of the signals from the active channels, a larger pass band will not cause a perceptible increase in the noise errors of the individual PLL. During the short-term shadowing of the signal in several channels (such as because of the movement of one or more local objects) the common phase loop continues to compensate for the phase fluctuation of the main reference oscillator 26 and preserves the unaffected channels from the loss of track.

Different Update Rates on the Loops

The embodiments of the present invention may be implemented with any combination of analog circuits, digital circuits, and processors operating under the direction of control programs. Except for the initial high-frequency filtering, initial amplification, and initial frequency down-conversion (which is typically used), the components may be implemented wholly with digital circuits, wholly with one or more processors operating under the direction of control program(s), or a combination of both approaches. For processor implementations, the following modifications may be used to reduce the task burden of the processor. Since the common loops according to the present invention enable the feedback loops of the individual PLL and DLL circuits to be made very narrow-banded, there is an opportunity to use a correspondingly lower frequency of adjustment $F_L$ for these local loops (for example, at frequencies of $F_L$ between 10 Hz and 50 Hz). Vice versa, in the common loops where the band is wider (usually by an order of magnitude), the adjustment frequency $F_f$ should be higher (for example between approximately 200 Hz and approximately 1000 Hz). Since there are several individual channels and relatively few common loops (usually seven at most), the use of two different adjustment frequencies can provide a perceptible decrease of the processor load. In addition to reducing the processing in the individual channels, some of the processing in the common loops can be simplified to further reduce processor load.

An example of these approaches is shown by the channel embodiment of FIG. 4, which is a channel embodiment that may be used with the general embodiments shown in FIGS. 1 and 1A (which are suitable for moving receiver antennas). In this embodiment, a PLL discriminator output $E_{PK}$ is generated at the slower rate as the phase-error signal for the channel's PLL loop, while a faster changing version $E_{OK}$ of the PLL discriminator output is generated as the PLL's phase output signal for the common loop. This saves on processor load since all of the channel PLLs (and DLLs also) are not updated at the same rate as the common loop (version $E_{OK}$). Additionally, the generation of $E_{OK}$ may be simplified over that of $E_{PK}$, thereby further reducing processor load. To generate the two versions $E_{PK}$ and $E_{OK}$, the correlator #2 is constructed to output a slow version of the correlation signal Q, which is indicated as $Q_K$, and a faster version $Q_{F,K}$. This may be simply accomplished by having two accumulators accumulate the multiplication products for different accumulation periods, each accumulator for a respective signal $Q_K$ and $Q_{F,K}$. For example, if $Q_{F,K}$ is to be updated N times faster than $Q_K$, then the accumulator for $Q_{F,K}$ accumulates 1/N times the number of multiplication products accumulated by the accumulator for $Q_K$ before outputting its correlation signal (at which point it is reset to zero in preparation for the next accumulation period). The accumulation period for $Q_K$ will be designated herein as $T_L$, and may be between $T_L \approx 20$ ms–100 ms. The accumulation period for $Q_{F,K}$ will be designated herein as $T_F$, and may be between $T_F \approx 1$ ms–20 ms. In a similar manner, two versions of the inphase correlation signal I are generated in correlator #1: $I_K$ for the PLL and DLL circuits of the individual channel, and the faster-changing signal $I_{F,K}$, which will be mostly used for monitoring the signal quality of the channel's satellite signal.

The version $E_{OK}$ (i.e., the phase output signal) for the common loops may be generated as $E_{OK}=Q_{F,K}/I_{F,K}$, which is easier and faster for a microprocessor to generate than the form Ep=arctan(Q/I), which is commonly used as the phase-error signal in PLL circuits of many tracking channels, including those used in preferred embodiments of the present invention. This is because both forms require a digital division operation for the microprocessor, but the arctan(*) form requires a functional mapping operation to generate the arctangent value. Since both of the signals $I_{F,K}$ and $I_K$ typically vary at a much slower rate than either of $Q_{F,K}$ or $Q_K$, a potentially easier and faster form of $E_{OK}$ is $E_{OK}=Q_{F,K}/I_K$, because several division operations may be replaced by multiplication operations (which are faster). As soon as $I_K$ is updated, the term $J_K=1/I_K$ may be formed immediately thereafter, and then used to generate $E_{OK}$ as $E_{OK}=Q_{F,K}*J$ at every $T_F$ seconds for several updates of $E_{OK}$ before $I_K$ is again updated (every $T_L$ seconds). Therefore, several multiplication steps occur with J rather than a corresponding number of division operations, the latter of which require more processing. Such steps may be performed by component blocks 60 and 62 shown in FIG. 4. The division operation which forms the factor $J_K$, occurs comparatively rarely (with period $T_L$). The multiplication operation in unit 60 takes place more frequently (with period $T_F$). The obtained phase output signal $E_{OK}$ of the k-th channel $E_{OK}$ is further processed in the common loops as previously shown and described with respect to FIG. 3 specifically, and FIGS. 1 and 1A more generally.

The correlation signals $Q_{F,K}$ and $I_{F,K}$ may be used in the unit 53 for the estimation of the signal quality by any of the previously described approaches. Using a pair of correlations signals that are generated at a more frequent rate enables the alarm signal to be generated more quickly, and enables the channel to be de-coupled from the common loops (with the switch (54)) with less delay when there is a deterioration or short-term shadowing of the satellite signal. The correlation signal $Q_{F,K}*J_{F,K}$ for the common loop is decoupled from the common loop by switch 55 when the alarm code is generated. The decoupling may be readily accomplished by having switch 55 provide a zero value (Ø) to block 60 in place of $Q_{F,K}$, and by having switch 55 provide some constant value (e.g., 1) to block 62. As a result, a value of zero is substituted for $Q_{F,K}*J_{F,K}$ when the alarm signal is activated.

In the more simple embodiment of the receiver channel shown in FIG. 2, the corresponding modification for achieving the above results is the following. The common loop is operated at the faster rate. Additionally, both versions of the Q correlation signal are generated, $Q_{F,K}$ and $Q_K$, as described above, and the faster $Q_{F,K}$ signal is provided to the input of the Phase loop Discriminator 34, instead of $Q_K$.

Generation of Program Signals $r_1$–$r_K$

In GPS and GLN receivers, it is advantageous to predict the change that the Doppler shift will have on both the PLL's phase-error signal Ep and the DLL's delay-error signal Ed, and then add a compensating signal representative of the predicted changes to these signals. In this way, the PLL and DLL circuits can be focused on correcting for the unpredictable errors, rather than correcting for both predicable errors and unpredictable errors. As a result of removing the predictable effect of the Doppler shift, the probabilities of PLL cycle slips and the loss of DLL lock are reduced. As a result, the response bandwidths of the feedback loops can be reduced in order to increase noise immunity.

For a given satellite, the Doppler shift in the L1 band signal can be predicted from the receiver's current location, the current time, and information provided in the 50 Hz information signal that is modulated onto the L1-band signal. The receiver's current location and the current time is provided by the Navigator unit, and methods of generating a Doppler-shift correction (DSC) signal based on this information is well known to the global positioning art. Once the DSC signal is provided to the PLL circuit for the L1-band satellite signal, the bandwidth of this PLL circuit may be reduced to improved noise immunity. (When the receiver is first turned on, relatively large bandwidths may be temporarily used in the PLL and DLL circuits before the DSC signal is generated and applied to these circuits.)

In some cases, the combination of the DSC signal with the phase-error signal Ep of the PLL discriminator can provide a better DSC signal, particularly if the phase-error Ep signal is filtered before being combined with the predicted DSC signal. Such filter is performed in the illustrated embodiments disclosed in FIGS. 1–4 and 1A with filter 28 filtering signal $Ep_K$ before it is combined with the predicted signal $r_K$. The improvement is because the phase-error signal of the PLL discriminator corrects for errors in the prediction signal $r_K$, with such errors being relatively small in comparison to the predicted Doppler shift component of $r_K$. The improved DSC signal may then be used for providing a similar correcting signal to the DLL circuit for the C/A-code signal, and to the DLL circuit for the P-code signal in the L1 band if the P-code signal is also being tracked by the receiver. In addition, the improved DSC signal may be used to provide a similar correcting signal to the PLL circuit for the L2-band carrier signal and the DLL circuit for the L2-band. The GPS art has developed the term "controlling loop" to describe the loop of the circuit which generates the improved DSC signal, and the term "controlled loop" to describe the loop of the circuit which receives the improved DSC signal. In the above illustrated example, the PLL loop for the L1-band carrier signal is the controlling loop, and each of the DLL loops which tracks a PR-code signal from the satellite would be a controlled loop (as well as the PLL loop for the L2-band carrier signal).

As a general representation, FIG. 5 shows an improved DSC signal generated by a controlling loop and a controlled loop which receives it. Before the improved DSC signal can be used, it should be scaled by a factor $K_s$ to account for the frequency ratio between the carrier signal tracked by the controlling loop and the center frequency of the modulated signal being tracked in the controlled loop. This is because the Doppler shift affects the frequency of the carrier signal and the frequency of each modulated signal that is present on the carrier signal by an amount which is proportional to each signal's frequency. In the case that the controlling loop is the PLL loop of the L1 band, the carrier frequency of the signal being tracked is 1,575.42 MHz. If the controlled loop is the DLL loop for the C/A-code signal, the center frequency of the C/A-code signal is 1.023 MHz and the frequency scaling factor $K_s$ would be 1.023/1,575.42=1/1,540. If the controlled loop is the DLL loop for the P-code signal, the center frequency of the P-code signal is 10.23 MHz and the frequency scaling factor $K_S$ would be 10.23/1,575.42=1/154. If the controlled loop is the PLL loop for the L2-band carrier signal, the L2-band center frequency is 1227.60 MHz and the frequency scaling factor $K_S$ would be 1,227.60/1,575.42=120/154=0.77922.

In addition, before the improved DSC signal is scaled by factor $K_S$, the pedestal frequency component of the signal in the controlling loop should be removed. As previously described, the pedestal component is a constant value and is introduced in the signal because the original satellite signal has been down converted to the pedestal frequency before being processed by the controlling loop. If necessary, the controlled loop will provide its own pedestal frequency component.

In the embodiment shown in FIG. 2, which is best suited for fixed receiver applications, the correcting signal $33_K$ provided to the k-th DLL block is based upon an improved DSC signal generated by the k-th PLL loop at the output of summer 31 (signal $U_{T,K}$). Signal $33_K$ is generated by subtracting the pedestal component $r_C$ from signal $U_{T,K}$ and then scaling by factor $K_S$: signal $33_K=(U_{T,K}-r_V)*K_s$. A less precise method may use the form $(r_K r_C)*K_S$, which essentially relies upon the prediction of the Doppler shift provided by the navigator unit.

In the embodiments shown in FIGS. 1 and 1A, which are best suited for moving receiver applications, the correcting signal $33_K$ provided to the k-th DLL block is based upon an improved DSC signal generated by the k-th PLL loop at the output of summer 31 (signal $U_{T,K}$) In one implementation, signal $33_K$ is generated by subtracting the pedestal component $r_C$ from signal $U_{T,K}$ and then scaling by factor $K_S$: signal $33_K=(U_{T,K}-r_C)*K_S$, which is equivalent to signal $33_K=(W_K+U_K+r_K-r_C)*K_S$. The accounting for the Doppler shift is provided by signals $r_K$ and $U_K$. Signal $W_K$ is used by the k-th PLL loop to compensate for the effect that the movement of the antenna has upon the tracking of the carrier signal. The benefit of signal $W_K$ is provided to the DLL loop through the same transformation process that is used to provide the benefits of signals $r_K$ and $U_K$. The inventors have found for many moving-receiver applications that it is better to compute signal $33_K=(W_K+r_K-r_C)*K_S$, without signal $U_K$ from the k-th individual PLL discriminator. This is because signal $U_K$ is prone to the effects of cycle slips in the individual PLL loop under rapid movements, and that it is best not to propagate the effects of these cycle slips to the DLL loop under these conditions. In each of the above cases, the frequency scaling factor $K_S$ is equal to 1.023/1,575.42=1/1,540. The form $(W_K+U_K+r_K-r_C)*K_S$ is advantageous as an improved DSC signal for the PLL loop for the L2-band carrier signal. This is because the form $(W_K+U_K+r_K r_C)*K_S$ tracks phases fluctuations due to selective availability and the PLL loop for the L2-band carrier signal may be made more narrow band to increase noise immunity. In this case, the frequency scaling factor $K_S$ is equal to 1,227.60/1,575.42=120/154=0.77922. Simple generators may be used to generate the DSC signals and improved DSC signals.

In digital realizations of oscillator 29, it is advantageous to use the input signals of the oscillator to generate signal 33. If NCO 29 is replaced by a voltage-controlled oscillator (VCO) for an analog implementation, it is advantageous to use the output signal of the VCO to generation signal 33.

Selection of Satellite Signals for the Common Vector Tracking Loop

While we have illustrated the above implementations by tracking the carrier signals modulated by the C/A-code signals (from the GPS or GLN systems) in the DLL and PLL circuits, it may be appreciated that the carrier signals modulated by the P-code signals of the GPS and GLN systems can also be tracked by the DLL and PLL circuits of one or more of the tracking channels (i.e., P1-signal and P2-signal in GPS systems and P1-signal and P2-signal in GLN systems). As abbreviated notation, we call a carrier signal which is modulated by a C/A-code signal as "a C/A-signal", we call a carrier signal which is modulated by a P-code signal in the L1-band as "a P1-signal", and we call a carrier signal which is modulated by a P-code signal in the L2-band as "a P2-signal".

At the present time, the C/A-signals of GPS and GLN systems and the P1-signals of the GLN system are the preferred satellite signals to use in tracking channels which provide inputs for the vector common tracking loop since these signals have the greatest signal-to-noise ratios. This is the case for both civilian and military users. For civilian users, the next preferred signal to use for the vector common tracking loop is the P2-signal of the GLN system, which is weaker than the C/A code by several dB. Because the P2-signal is weaker, it is advisable to use a lower weighting in matrix R for the pseudo-range corresponding to the signal. The P1-signal and P2-signal of the GPS system are not of much use in the vector common tracking loop for civilian users because civilian users must apply anti-spoofing compensation measures on these signals in order to use them. These anti-spoofing measures typically cause a loss of at least 10 dB in the S/N ratios of these signals. For military users who know the full structure of the P1-codes and P2-codes of the GPS system, the P1-signals of the GPS system are the next preferred signal, and the P2-signals of both the GPS and GLN systems are the least preferred signals. Since the P1-signals and P2-signals of the GPS system and the P2-signals of the GLN system are weaker than the corresponding C/A-signals, it is advisable for military users to use a lower weighting in the matrix R for the pseudo-ranges corresponding to these P-signals. Additionally, for both military and civilian users, it is also advisable to use a controlling loop to generate the Doppler shift correction signal for those tracking channels which are tracking the weaker P-signals, and to reduce the bandwidths of the DLL and PLL circuits of these channels in order to compensate for the lower signal-to-noise ratio (SNR) in these signals.

Starting Up the Operation of the Vector Common Tracking Loop

The tracking channels are started up without correction signals provided by the common vector loop, and in the usual manner (i.e., as though the tracking channels were part of a conventional receiver). This usually involves using conventional bandwidths on the PLL and DLL circuits. In a conventional start up process, the first four tracking channels are brought in the tracking mode on respective satellite signals, usually one tracking channel at a time. Forced tuning of the NCO (or VCO) is conventionally done, which requires temporarily breaking the feedback loop. With four tracking channels in operation, a rough estimation of the receiver's position can be made, and the Doppler-shift correction signals $r_1$–$r_4$ can be generated and provided to first four tracking channels. With four tracking channels in operation, the vector common tracking loop may be started. Additional tracking channels may then be started and then incorporated into the vector common tracking loop once they reach initial PLL and DLL lock. With the first four channels in operation, the navigation unit can usually determine very accurate initial settings of the code-signal delays and Doppler shifts for the additional channels so that forced tuning of the PLL and DLL circuits of these channels is not necessary.

While the present invention has been particularly described with respect to the illustrated embodiment, it will be appreciated that various alterations, modifications and adaptations may be made based on the present disclosure, and are intended to be within the scope of the present invention. For example, it may be appreciated that the embodiments illustrated in FIGS. 1 and 1A may only track changes in the spatial coordinates if the frequency oscillations of the main reference oscillator 26 are sufficiently small in comparison to the desired tracking accuracy. In this case, the geometrical pseudo-inverse matrix G could be computed from the geometrical Jacobian Matrix H rather than the complemented Jacobian matrix $H_1$. It may also be appreciated that phase signal $\Phi_q$ for the embodiments illustrated in FIG. 2 may be generated from the pseudo-inverse matrix G. It may be further appreciated that one may have a composite system in which the system shown in either FIG. 1 or 1A is used to account for changes in the spatial coordinates (but not frequency fluctuations in the main reference oscillator 26), and where a system shown in FIG. 2 is used to account for changes in the frequency fluctuations. In this case, the embodiment of FIG. 2 would be further modified using signals from the embodiment of FIG. 1 (or 1A) to remove the effects of movement on the phase signals used by the embodiment of FIG. 2. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

Measuring the Loop Bandwidths $B_l$ of the Individual PLL loops

Given the above exemplary selection of loop orders for the PLL loops and the vector common loops, and our recommended bandwidths for each, it is within the capabilities of those skilled in the GPS art to construct the filters for the loops. In the next few sections, we provide tutorial information to those who are unfamiliar to the GPS art for measuring the bandwidths of the loops so that the effect of a particular filter characteristic upon the loop bandwidth may be determined. The individual PLL loops are discussed first, and then the vector common loops are discussed.

The exemplary PLL and common loops described herein are discrete time systems. To make our analysis of these systems easier, we will construct equivalent "continuous-time" systems. To do this, we replace adders with appropriately-scaled integrators as follows:

$$\sum_{r=1}^{k} z[r] \leftrightarrow F \int_0^t z(t')dt', \tag{4}$$

where F is the frequency of summation, and r is the number of the summable value. In the loop filters, F is equal to the frequency of regulation $F_c$ ($F_c$ is the reciprocal of the period of regulation $T_c$=5 . . . 100 ms, i.e. $F_c$=10 . . . 200 Hz).

The operator expression corresponding to equation (4) is $$\frac{F}{p}.$$

As an example we will write the transfer function of the continuous analogue of the loop filter, presented in FIG. 6:

$$F(p) = K_1 + \frac{K_2 F_c}{p} + \frac{K_3 F_c^2}{p^2}. \tag{5}$$

To begin analyzing an individual PLL loop (see FIG. 1), we form a small-signal model of the behavior of the PLL loop in the absence of influences from the vector common loop and the program signals. To do this, we remove the correction signal $W_K$ and program signal $r_K$ from the PLL's summator 31, or set their values to zero, and we set the value of signal $U_q$ to generator 26 to zero. We then form a linear, small-signal model of the components of the PLL under the condition of these components operating at the point of steady balance of the PLL. This model is shown in FIG. 10. As is known in the art, the correlators and discriminator 27 of the PLL can be modeled as a summation node which receives a first phase signal $\psi_{inp}$ representative of the phase of the down-converted input signal $U_{inp}$ and a second phase signal $\psi_{out}$ representative of the phase of the output signal from the PLL's NCO oscillator 29. This summation node is shown in FIG. 10 as the left-most component in the figure. As previously discussed, the discriminator 27 typically generates its output as the quotient $E_p$=Q($\epsilon$, $\psi$)/I($\epsilon$, $\psi$), or as the arctangent of this quotient, where $\psi = \psi_{inp} - \psi_{ref}$, where $\psi_{inp}$ is the phase of the input satellite signal being tracked by the channel, and where $\psi_{ref}$ is the phase of the reference signal from the channel's NCO 29. In the figure, $\psi_{ref} = \psi_{out}$. In close vicinity of the steady balance point (under small tracking errors $\psi$), $E_p \approx \psi = \psi_{inp} - \psi_{ref} = \psi_{inp} - \psi_{out}$.

For the purposes of some forms of analysis, the noise signals which are coupled to the PLL loop and which may be generated by the components of the loop can be collectively modeled as a single noise signal n(t) provided as a third input to the summator.

To find the transfer function from the small-signal model of any loop, we start with the summation node which forms the difference between the input signal $\psi_{inp}$ and output signal $\psi_{out}$. We then trace the output signal ($\psi_{inp} - \psi_{out}$) from the summator around the loop of processing blocks back to where it enters as the $\psi_{out}$ input to the summator. Each processing block may modify the magnitude or frequency characteristic of the signal, and we will track these modifications to find a total frequency modification M(p) to the starting signal ($\psi_{inp}-\psi_{out}$): M(p)·($\psi_{inp}-\psi_{out}$). We will then set this equal to $\psi_{out}$, $\psi_{out}$=M(p)·($\psi_{inp}-\psi_{out}$), and solve for the ratio of $\psi_{out}/\psi_{inp}$.

The output of the summator ($\psi_{inp}-\psi_{out}$) is provided to the input of the loop filter 28, which has the frequency transfer function F(p), where p=j$\omega$=j2$\pi$f. The output of filter 28 goes to the input of NCO 29. The small-signal model of NCO 29 is that of an integrator having a gain of "k". This model has a transfer function of (k/p). The gain "k" for NCO 29 can be readily determined by those of ordinary skill in the electronics art (usually k=2$\pi\Delta$F where $\Delta$F is the number of discrete output values generated per second by the NCO). We note here that the correlators and discriminator 27 of the PLL loop can have a gain different from 1, and we can adjusted the value of the gain "k" to include this gain, if it is different from 1.

The frequency response K(p) of the PLL loop is defined as:

$$K(p) = \frac{\varphi_{out}(p)}{\varphi_{inp}(p)} \quad (6)$$

and can be determined from the model as:

$$K(p) = \frac{(k/p)F(p)}{1+(k/p)F(p)}.$$

The transfer function K(p) can be divided into a magnitude component $M_K(\omega)=|K(p)|$ and a phase component $\psi_K(\omega)$=angle[K(p)], and related to one another as follows:

$$K(p)=M_K(\omega)*\exp[+j\psi_K(\omega)]$$

With j$\omega$=p. Since $\omega$=2$\pi$f, magnitude and phase components can equivalently be parameterized by frequency f: $M_K(f)$, $\psi_K(f)$.

The bandwidth of the PLL loop may then be determined from the transfer function K(p) by an number of methods. We prefer using the equivalent noise bandwidth definition, $B_L$, which is provided below:

$$B_L = \frac{1}{M_K^2(f=0)}\int_0^\infty M_K^2(f)df \quad (7)$$

where $M_K(f=0)$ is the magnitude of the transfer function at zero frequency. The integrand is definite because the value of $M_K^2(f)$ goes to zero as f goes to infinity ($\infty$). The physical sense of bandwidth $B_L$ is as follows: the integrand $\int M_K^2(f)df$ represents the output power present at the output ($\psi_{out}$) of the PLL loop when a white noise signal having uniform spectral density from f=0 to f=$\infty$ is applied to the input ($\psi_{inp}$) of the PLL loop. The value $M_K^2(f=0)$ is the power density of the noise signal at f=0. The quantity $B_L*M_K^2(f=0)$ represents the same amount of output power over the frequency interval of f=0 to f=$B_L$ as represented by the integrand if it is assumed that that the power density over this interval is at a uniform value of $M_K^2(f=0)$. In other words, $B_L$ is the bandwidth of the rectangular frequency band having a uniform power density equal to the loop's power density at f=0, and having a total power equal to the output noise power of the PLL loop. The PLL is an astatic tracking system, so its frequency response K(p) is equal to 1 at f=0, and $M_K^2(f=0)$=1.

In addition to constructing a small signal model of the PLL loop, the bandwidth of the loop may be measured experimentally by well-known techniques. As an example, a phase-modulated signal with a rather low modulation index $\psi_{inp}^M$<<1 is applied to the PLL input:

$$u_{inp}=U_{inp}\cos[\omega_0 t+\psi_{inp}(t)], \quad (8)$$

where $$\psi_{inp}(t)=\psi_{inp}^M \cos 2\pi ft. \quad (8')$$

Then at the output of the PLL we obtain the signal $$u_{out}=U_{out}\cos[\omega_0 t+\psi_{out}(t)], \quad (9)$$

where $$\psi_{out}(t)=\psi_{out}^M \cos(2\pi ft+\psi). \quad (9')$$

In this case the modulation index of the output signal $\psi_{out}^M$ will depend on the modulating signal frequency f, and K(f) may be determined as $$K(f) = \frac{\varphi_{out}^M(f)}{\varphi_{inp}^M}. \quad (10)$$

The frequency $\omega_0$ is to correspond to the central frequency tracked by the PLL.

In addition to providing the transfer function between the PLL input phase and output phase, the transfer function K(p) (also K(f)) provides the transfer function between the PLL input frequency and output frequency. In other words, K(p) also relates changes in the PLL output frequency $\omega_{out}$ with changes in the PLL input frequency $\omega_{inp}$. It follows from the fact that $\omega_{inp}\equiv\psi'_{inp}$ and $\omega_{out}\equiv\psi'_{out}$, where the prime symbol (') denotes the derivative of the phases with respect to time. Therefore, to measure the frequency response K(f) it is possible to provide to the PLL input a frequency modulated signal with small frequency deviation $\omega_{inp}^M$:

$$u_{inp}=U_{inp}\cos[\omega_0 t+\int\omega_{inp}(t)dt], \quad (11)$$

where $$\omega_{inp}(t)=\omega_{inp}^M \cos 2\pi ft. \quad (11')$$

Then at the PLL output we obtain the frequency modulated signal with deviation $\omega_{out}^M$:

$$u_{out}=U_{out}\cos[\omega_0 t+\int\omega_{out}(t)dt], \quad (12)$$

where $$\omega_{out}(t)=\omega_{out}^M \cos(2\pi ft+\psi), \quad (12')$$

$$K(f) = \frac{\omega_{out}^M(f)}{\omega_{inp}^M} \quad (13)$$

Sometimes it is more convenient to experimentally measure the pulse response h($\tau$) of the PLL instead of K(f). For that it is necessary to provide to the input of the linear system a short pulse with duration much smaller than the system time constant and with sufficiently small area a to keep the PLL in the linear mode. Then the output phase change $\Delta\psi_{out}(\tau)$ is measured, and h($\tau$) is determined as:

$$h(\tau) = \frac{\Delta \varphi_{out}(\tau)}{a}, \quad (14)$$

where $\tau$ is the time from the pulse start. Then one can compute $K(p)$ as:

$$K(p) = \int_0^\infty h(t) e^{-pt} dt, \quad (15)$$

and after that determine $K(f)$ and $B_L$.

It is possible to provide a frequency pulse instead of the phase pulse and to implement similar measurements and calculations.

So $B_L$ may be determined from such functions as $K(f)$ and $(\tau)$ by any of the methods described above.

Measuring the Loop Bandwidths $B_L$ of the Common Loops

As we pointed out above, the bandwidths of the individual loops are measured in the joint tracking system (JTS) under the condition that the common loops are opened, which may be done by setting $W_1 \ldots W_N$ and $U_q$ (FIGS. 1 and 2) to zero. (Setting to a constant value will also work). In a contrary manner, the bandwidths of the common loops are measured under the condition that the individual PLL loops are opened, which may be done by setting $U_1 \ldots U_N$ to zero or disconnecting them from summators 31.

The bandwidth $B_L$ of a common loop can be measured, in essence, in the same way as it is described above for the independent PLL. Indeed, the selected common loop becomes independent if one opens all of the other loops, both individual and common one. A small-signal model may be constructed in a similar manner as previously described. The matrix operations for matrices G and H represent additional complexity. However, as it turns out, the total effective gain to the common loops from these matrices is 1. As an example, the small-signal model for the X-coordinate common loop is shown in FIG. 11. For the purposes of this small-signal model, the outputs from the individual PLL loops have been disconnected from summators 31 (FIG. 1, 1A), and the Y, Z, and $\Phi q$ common loops have been disconnected from the processing blocks 49,50 for matrix H.

Next, we apply a phase signal $\psi^X_{inp}$ to the system which represents motion of the receiver's antenna only along the axis of the X coordinate. A fraction of this signal $\psi^X_{inp}$ is provided as an input signal to each channel's correlators, the fraction being determined by the geometry between the antenna and the satellite being tracked by the channel. These fractions for the 1-st through N-th channels are given by the X-coordinate column of matrix H (usually the 1-st column), with the matrix element $(H_{1,X})$ of the first row of the X-column of H being the fraction for the first channel, and the matrix element $(H_{N,X})$ in the last row of X-column of H being the fraction for the N-th channel. Thus, the input signal to the first channel is $H_{1,X} \cdot \psi^X_{inp}$, and the input signal to the last channel is $H_{N,X} \cdot \psi^X_{inp}$. The correlators of each channel also receive an output signal from the channel's NCO 29. As it turns out, the output signals from the NCOs 29 have the same phase, and have magnitudes which follow the fractions specified by the X-column of matrix H. In other words, the output of the k-th channel's NCO is $H_{k,X} \cdot \psi^X_{out}$. In FIG. 11, we have denoted the output signal from the first channel's NCO as $H_{1,X} \cdot \psi^X_{out}$, and the output signal of the N-th (last) channel as $H_{N,X} \cdot \psi^X_{out}$. The phases of the NCO output signals are the same because they are generated from a common signal $U_X$, (since the other three common loops have been disconnected from blocks 49,50), and because the frequency response of the NCOs 29 are the same (k/p). Under these conditions, the processing blocks 49,50 act to multiply signal $U_X$ by the X-column of matrix H and distributes the resulting N multiplication products $(H_{1,X} \cdot U_X, \ldots, H_{k,X} \cdot U_X, \ldots, H_{N,X} \cdot U_X)$ to the corresponding inputs of the NCOs 29. The output of the k-th NCO 29 is therefore $H_{k,X} \cdot U_X \cdot (k/p)$. We can correspond this to our previous statement that the NCO output of the K-th channel is $H_{1,X} \cdot \psi^X_{out}$, and determine that $\psi^X_{out} = U_X \cdot (k/p)$, and confirm that the magnitudes of the NCO outputs are proportional to the X-column of matrix H.

As we did above with the individual loops, we start with the outputs of the summation nodes and trace the signals around the loop to find the total modification to the difference signals. The processing blocks 42,43 take these signals and perform the multiplication with the G matrix to produce the X signal as follows:

$$X = \sum_{k=1}^{N} G_{X,k} \cdot H_{k,X} \cdot (\varphi^X_{inp} - \varphi^X_{out}).$$

The summation of the G and H matrix elements is 1:

$$\sum_{k=1}^{N} G_{X,k} \cdot H_{k,X} = 1,$$

which provides for the simplified form of signal X as $X = (\psi^X_{inp} - \psi^X_{out})$. Signal X is processed to form the $U_X$ signal by the transfer function of filter 46 as follows:

$$U_X = F_X(p) \cdot X = F_X(p) \cdot (\psi^X_{inp} - \psi^X_{out}).$$

We previously found that $\psi^X_{out} = U_X \cdot (k/p)$, and we may now combine these last two equations to determine a system equation:

$$\psi^X_{out} = F_X(p) \cdot (\psi^X_{inp} - \psi^X_{out}) \cdot (k/p).$$

The system equation may be rearranged to produce the ratio of $\psi^X_{out}/\psi^X_{inp} = K_X(p)$ as follows:

$$K_X(p) = \frac{\varphi^X_{out}}{\varphi^X_{inp}} = \frac{(k/p) \cdot F_X(p)}{1 + (k/p) \cdot F_X(p)}, \quad (16)$$

where $K_X(p)$ is, of course, the transfer function of the X-coordinate common loop. From the transfer function $K_X(p)$, the bandwidth of the loop may be determined by any of the above methods described for the individual PLL loops. The Y and Z coordinate common loops may be similarly analyzed, but using the appropriate columns for matrix H and appropriate rows for matrix G.

The small-signal analysis of the common phase loop for the common phase $\Phi_q$ is somewhat different, but produces a similar result. In the analysis, we will disconnect the coordinate common loops and the individual PLL loops, and we will assume that the input satellite signals have no unexpected phase shifts. Let us then suppose that the output of reference oscillator 26 has an unexpected phase shift $-\psi^q_{inp}$ which requires correction by the common phase loop. The phase shift $-\psi^q_{inp}$ is seen by frequency generator 25, which generates the reference frequencies for the down-conversion stage (see reference frequency ③ in FIG. 1) and the time-base frequencies for the NCOs 29. As it turns out, the major effect on the system by the phase shift $-\psi^q_{inp}$ will be through the effects on the down-conversion stage rather than the time-base of the NCOs 29. Frequency generator 25 converts the frequency of oscillator 26, which is typically between 20 MHz and 40 MHz, to a reference frequency which is equal to the nominal carrier frequency of the satellite signals (e.g., 1575.42 MHz for L1-band GPS satellites) minus a small amount for the receiver's pedestal frequency (which is usually between 10 kHz and 10 MHz). We will define the ratio of the carrier frequency to the frequency of oscillator 26 as $K_S$, and we will define the ratio of the pedestal frequency to the frequency of oscillator 26 as $K_{PED}$. The conversion process of generator 25 causes a corresponding phase shift of $-(K_S-K_{PED})\cdot\psi^q_{inp}$ in the reference frequency ③. In the input down-conversion stage, the magnitude of the phase shift is not changed but the sign is reversed so that a phase shift of $(K_S-K_{PED})\cdot\psi^q_{inp}$ occurs. This phase shift is applied to all of the correlators and phase discriminators of the N channels. Each discriminator detects the phase shift and generates a corresponding value for it. However, because the correlators use the pedestal frequencies from NCOs 29, the amount of detected phase shift is increased by $K_{PED}\cdot\psi^q_{inp}$, so that the total detected amount from the discriminator output is $K_S\cdot\psi^q_{inp}$. The discriminator outputs are provided to the G-matrix processing blocks, which multiplies each discriminator output by fractional amount and then sums them together. The sum of the fractional amounts is equal to 1. (In the case where matrix R=I, each fractional amount is equal to 1/N). The net result is that the detected value of the phase shift $K_S\cdot\psi^q_{inp}$ is unchanged by the G-matrix processing blocks. The detected value is provided to the loop filter $F_q(p)$ for the common phase loop, and a correction signal is provided to oscillator 26 which causes a phase correction of $\psi^q_{out}$ to occur at the output of oscillator 26.

The small-signal model of the common phase loop is shown in FIG. 12. We have provided a "mathematical" node at the output of oscillator 26 for introducing the unexpected phase shift $-\psi^q_{inp}$ into the loop so that it may be corrected by the phase correction $\psi^q_{out}$. We will denote the output of this node as $\psi^q_{REF}=(\psi^q_{out}-\psi^q_{inp})$. To simplify the presentation, we have combined the models of the frequency generator 25, the down conversion stage, the correlators and the discriminators into a single block 25\*, which have a total effect of $-K_S$. We now conduct the analysis as we have done previously by tracing the modifications to signal $\psi^q_{REF}$ around the loop until it returns back to the node. We then equate the modified form with the correction $\psi^q_{out}$ to form the system equation. Given FIG. 12 and our previous discussion, the reader can verify that the modified form is $-K_S\cdot F_q(p)\cdot(k/p)\cdot\psi^q_{REF}$, and that the system equation for the common phase loop is:

$$\psi^q_{out}=-K_S\cdot F_q(p)\cdot(k/p)\cdot(\psi^q_{out}-\psi^q_{inp}).$$

The system equation may be rearranged to produce the ratio of $\psi^q_{out}/\psi^q_{inp}=K_q(p)$ as follows:

$$K_q(p) = \frac{\varphi^q_{out}}{\varphi^q_{inp}} = \frac{(k'/p)F_q(p)}{1+(k'/p)F_q(p)}, \tag{17}$$

where $K_q(p)$ is, of course, the transfer function of the phase common loop, and where k' is a constant equal to $k'=K_S\cdot k$. From the transfer function $K_q(p)$, the bandwidth of the loop may be determined by any of the above methods described for the individual PLL loops.

The bandwidth $B_L$ of one of the common coordinate loops (X, Y, or Z), may be determined (after opening the individual loops) by a number of experimental measurement techniques. We demonstrate one such method where the receiver's antenna is moved along one of the coordinate's axis (X, Y, or Z) in a sinusoidal motion with a sweep frequency $f_s$, which will result in changing by the harmonic rule (with the same frequency $f_s$) of the corresponding receiver's coordinate (X, Y, or Z). As an example, we will demonstrate this with the X coordinate which is moved in a sinusoidal motion about a point $X_0$:

$$X=X_0+X^M \cos 2\pi f_s t. \tag{18}$$

The change of the receiver coordinate can be recalculated into the change of the received signal phase shift in the X coordinate loop of:

$$\varphi^X_{inp} = 2\pi \frac{X}{\lambda}, \tag{19}$$

where $\lambda$ is the carrier wavelength. The corresponding frequency change is:

$$\omega^X_{inp} = (\varphi^X_{inp})' = \omega^M \sin 2\pi f_s t, \tag{20}$$

where $\omega^M = -\frac{4\pi^2 X^M f_S}{\lambda}$.

By the harmonic rule, the signals X and $U_X$, and the NCO output signals also change with the same frequency $f_S$, but have different magnitudes and phases. Each of these signals can be measured during the time that the sinusoidal motion is applied to the antenna. Taking this into account, we can write the output frequency $\omega^X_{out}$ of the k-th NCO 29 under these conditions as:

$$\omega_{out}^X(t)=\omega_{out}^X(f_S)\cdot\sin(2\pi f_S t+\psi_X(f_S)), \tag{21}$$

Then the magnitude $M_K(f_S)$ of the frequency response $K(p/2\pi)$ of the X coordinate loop ($M_K(f_S)=|K(p/2\pi)|$) will be $$M_K(f_S) = \frac{\omega^X_{out}(f_S)}{H_{K,X}\cdot\omega^M}. \tag{22}$$

where the matrix element $H_{K,X}$ has be introduced to account for the fact that the NCO outputs are scaled by the corresponding components of the matrix H. The loop bandwidth may then be determined from the previously described formula:

$$B_L = \frac{1}{M_K^2(f=0)}\int_0^\infty M_K^2(f)\,df$$

with $f=f_S$, and with $M_K^2(f_S=0)=1$ because the common loop is astatic.

In a similar way, the magnitudes of the frequency responses $K_Y(f)$ for Y and $K_Z(f)$ for Z may be determined.

A similar approach may be used to find the frequency response $K_q(f)$ of the common phase loop. The easiest way to do this is to place a summation node between filter 46 and oscillator so that a small modulation variation of $\omega^M \sin(2\pi f_S t)$ may be added to the input of oscillator 26 along with signal Uq. Then, in the stationary mode, Uq will also change by the frequency $f_S$ of the modulation signal as follows:

$$U_q=\omega_{out}^q(f_S)\cdot\sin(2\pi f_S t+\psi_q(f_S)), \tag{23}$$

and $$M_q(f_S) = \frac{\omega_{out}^q(f_S)}{\omega^M}. \quad (24)$$

From Mq, the bandwidth can be computed as described above. We note that while the insertion point of the test summation node is different from the position shown in FIG. 12, the same results are obtained.

Tutorial Information on Selecting Loop Characteristics and Bandwidths

In the theoretical literature the characteristics of tracking systems are frequently obtained with the aid of synthesis. The synthesis is usually carried out in the linear (small-signal) approximation. To perform the synthesis, it is necessary to construct models (i.e. statistical characteristics) of the input satellite signals and of the interference/disturbance signals. One often uses as the optimization the minimum of the average square of the tracking error. The Kalman synthesis is widely known, resulting in systems with variable parameters (in particular with the variable bandwidth of the tracking system), and the Wiener synthesis too, with the help of which it is convenient to synthesize optimum stationary systems (with the stationary bandwidth). The bandwidth of a tracking system increases as the spectrum width of the variations of the traced parameter increases, and as the ratio of the signal power to the spectral density of the interference increases (the interference is mostly considered as the white Gauss noise).

In engineering practice people often use other approaches (mainly heuristic ones), and different teams and authors use different approaches. We use a technique described in our 1980 book entitled "Digital Systems of Phase Synchronization" (in Russian). This technique, which is mainly heuristic, has been successfully used for years to design many PLL and DLL loops operating in communication, navigation and control-measuring systems, mainly in the field of space radio-electronics. The technique is described below for the benefit of the reader unfamiliar with this field of electronics.

The individual PLL loops should be of the second-order or third order types; the DLL systems should be of the first or second-order types. We first analyze the PLL loop and the PLL tracking error. The phase error of the PLL loop is $\psi = \psi_{inp} - \psi_{out}$, where $\psi_{inp}$, $\psi_{out}$ are input and output phases. While the PLL loop acts to drive $\psi$ to a value of zero, noise signals and dynamic tracking errors can cause it to have a non-zero value. Dynamic tracking errors are caused by movements in the receiver (if joint tracking is not used), by phase variations in the receiver's main oscillator (if joint tracking is not used), by phase variations in the satellite's oscillator, by selective availability, and by movements of the satellites (if program signals are not used). When designing a tracking system, we take into account, first of all, the noise errors and the steady dynamic errors (SDE) of tracking. The SDE may be determined as follows. We assume that the variation of the input signal phase may be described as a polynomial:

$$\varphi_{inp}(t) = \varphi_{inp0} + t\varphi'_{inp0} + \frac{t^2}{2}\varphi''_{inp0} + \frac{t^3}{6}\varphi'''_{inp0}, \quad (25)$$

where $\psi_{inp0}$, $\psi'_{inp0}$, $\psi''_{inp0}$, $\psi'''_{inp0}$ are the values of the input signal phase and of its derivative at t=0. The order of the polynomial is matched to order of the PLL loop (i.e., equal orders), and the signal is applied (e.g., mathematically) to the loop. After the loop establishes a steady state response to this signal (i.e., after transients have dissipated), a constant phase error will develop (if we neglect the influence of the noise). This constant phase error is the dynamic tracking error $\psi_{ste}$.

For the PLL of the second order (FIG. 13), which has $\psi'''_{inp0}=0$, we have $$\varphi_{ste} = \frac{(1+kT_i)^2 \varphi''_{inp0}}{16B_L^2 kT_i} \text{ where } B_L = \frac{k}{4}\left(1 + \frac{1}{kT_i}\right). \quad (26)$$

For the PLL of the 3-d order (FIG. 14), we have $$\varphi_{ste} \approx \frac{(0.72\varphi'''_{inp0})}{(B_L^3)} \text{ where } B_L \approx \frac{k}{2}. \quad (27)$$

In these formulas, $B_L$ is the equivalent noise bandwidth of the PLL loop.

The formula (26) corresponds to the general PLL structure having an arbitrary relationship between $K_1$ and $K_2$. Its linearized small-signal model (the continuous analogue) can be presented with the help of FIG. 13. Here n(t) is the white Gauss noise with the one-side spectral density $N_0$. The linearized small-signal model of the 3-rd order PLL (the continuous analogue) is presented in FIG. 14.

The formula (27) corresponds to the following recommended relation between parameters:

$$T_{i2} = 4T_{i1}; k\sqrt{T_{i1}T_{i2}} \approx 2.4 \quad (28)$$

For the second order PLL (FIG. 13) it is recommended to choose the quantity $kT_i$ in the range from 1 up to 4.

The dotted line in each of FIGS. 13–14 goes round those parts of the PLL scheme which (to within a constant factor) correspond to the loop filters. Their transfer functions are equal to: for FIG. 13:

$$F_1(p) = 1 + \frac{1}{pT_i} \quad (29)$$

For FIG. 14:

$$F_2(p) = 1 + \frac{1}{pT_{i1}}\left(1 + \frac{1}{pT_{i2}}\right). \quad (30)$$

The total gain "k" of the loops (FIGS. 13 and 14) is determined by all of the elements of the loop: by the filter, the NCO, the discriminator.

The fluctuation error of tracking in the linear approximation is equal to $$\sigma_\varphi^2 = \kappa \frac{N_0}{P_s} B_L, \quad (31)$$

where $P_S$ is the input signal power, κ is the factor of power losses due to the digital character of processing (usually κ≈0.5 . . . 1.5 dB, that is κ=1.1 . . . 1.4)

So we have given above the formulas for computing the SDE ($\psi_{ste}$) and the noise error $\sigma_\psi$, and we also have recommended certain relations between the parameters of the filter. In designing the loop, we want to keep the both the dynamic tracking error $\psi_{ste}$ and the fluctuation $\sigma_\psi$ under respective specified values. The selection of the bandwidth may accomplish this goal. However, we note that while the dynamic tracking error $\psi_{ste}$ decreases in value as the loop bandwidth $B_L$ increases, the fluctuation error $\sigma_\psi$ increases as $B_L$ increases. The bandwidth $B_L$ is usually chosen simultaneously with the choice of the order of the tracking system. Several slightly different approaches are possible, and we considered one of them here.

In the technical project for the design of the receiver, one frequently specifies the maximum values of speed ($V_M$) and acceleration ($a_M$) of the receiver, and sometimes also the derivative of the acceleration ($a'_M$). Using these values, one can easily compute the coefficients of the polynomial (25) if one uses the Doppler formula:

$$F_D = \frac{v_R}{c} f_0, \qquad (32)$$

where $V_R$ is the radial closing speed (approach velocity) of the receiver and satellite, with c being the speed of light, $f_0$ being the signal frequency (for the PLL it is the carrier frequency, for example, 1.6 GHz for $L_1$; for the DLL it is the code clock frequency, for example, 1.023 MHz). So we have:

$$F'_D = \frac{a}{c} f_0; \quad F''_D = \frac{a'}{c} f_0, \qquad (33)$$

where $a = V_R'$; $a' = V_R''$ are the radial acceleration and the derivative of this acceleration. From this, the coefficients of the polynomials are:

$$\varphi'_{inp} = 2\pi \frac{v_R}{c} f_0; \qquad (34)$$

$$\varphi''_{inp} = 2\pi \frac{a}{c} f_0;$$

$$\varphi'''_{inp} = 2\pi \frac{a'}{c} f_0$$

It is possible to assume as the first approximation, that the maximum SDE in the loop of the second order is determined only by $\psi''_{inp\,max}$, and in the loop of the third order only by $\psi'''_{inp\,max}$.

We then set a maximum allowable value of the SDE $\psi_{ste}$, for example 30° (corresponding to $\pi/6$ radians), and then we test to see if a second order loop will enable us to keep the fluctuation error $\sigma_\psi$ below its specified value, for example 15° (corresponding to $\pi/12$ radians). If not, we see if a third-order loop will enable us to meet both criterion. Starting with the maximum value for the SDE, we determine $B_L$ for the second-order loop from equation (26). Then, from equation (31) we find $\sigma_\psi$. If the obtained value of $\sigma_\psi$ does not surpass the allowable value (e.g., 15°, or $\pi/12$ radian), we may use the second order. Otherwise we look at using a third-order loop. From the value of the allowable SDE, we determine $B_L$ for the third order loop from equation (27); then we determine $\sigma_\psi$ from equation (31). Usually the values obtained for both $B_L$ and $\sigma_\psi$ for the third-order loop are several times less than values for the second-order loop. But if the third-order loop does not provide a satisfactory value for $\sigma_\psi$, we would then look to improving the signal-to-noise ratio of the system, such as by increasing the transmitter power or the amplification factor of the antenna, or by reducing the noise temperature of the low-noise amplifier (LNA), etc.

Approaches for Designing Various Loops in the Joint Tracking System (SJT) Individual PLL Loops As the first approximation, the individual PLL loops may be designed taking into account only individual influences, namely the selective access (SA) and the fluctuations in the onboard reference oscillators of the satellites. In such an approach, it is supposed that the large dynamic influences due to the movement of the receiver are handled by the coordinate loops, that the dynamic influences due to fluctuations of the receiver's oscillator are handled by the phase loop, and that the dynamic influences due to the predictable movement of the satellites are handled by the prediction signals.

So, the statistical characteristics of the SA and of the fluctuations of the satellite reference oscillators may be used to select the bandwidth of the individual PLL loops (at that, the relationships between factors of the loop filters are chosen as described above, i e., as for independent tracking loops).

If the maximum values of the first and second derivatives $f'_M$ and $f''_M$ of the signal frequency variation due to the SA and the fluctuations of the satellite oscillator are known, and, hence, ($\psi''_M = 2\pi f'_M$ and $\psi'''_M = 2\pi f''_M$ are known too, then by substituting them into equations (26) and (27) (in the places of $\psi''_{inp0}$ and $\psi'''_{inp0}$, respectively) it is possible to find the SDE for the PLL for second-order and third-order loop configurations, and, as it was described above, to choose simultaneously both the order and the bandwidth $B_L$.

One may also use simulation modeling to determine the order and bandwidth of the individual PLL loops without having to determine $f'_M$ and $f''_M$. By using the common technique of pair-wise differences of full phases between different satellites, one can record the full phases of the satellite signals with just the fluctuations caused by SA and the satellite reference oscillators, and without the fluctuations caused by the receiver's oscillator. When these signals are recorded at a sufficiently high frequency, such as 20 times per second, they may be used as input data to a simulation model of the loop, and then different loop configurations and bandwidths may be tested by the simulation model to find a desired loop-order and bandwidth.

This last (experimental) approach has lead us to the following conclusions: it is advantageous to make the individual PLL loops for tracking of the GPS signals second-order with a bandwidth of approximately 2 Hz or (better), or third-order with a bandwidth of approximately 1 Hz. For GLN signals, it is advantageous to use second-order PLL loops with a bandwidth of approximately 2 Hz to approximately 3 Hz. The greater bandwidth of the individual PLL loops for GLN signal in comparison with GPS signals is due to the higher level of fluctuations in the satellite reference oscillators of GLN system.

Common Phase Loop

The loop parameters for the common phase loop depend substantially on the conditions of the receiver's use: on the presence or absence of vibrations and shocks, on their intensity, on the presence or absence of the shock absorption system for the oscillator's quartz crystal (flexible/soft suspension), and also on the intrinsic quartz characteristics. The fact is that under the influence of the acceleration "a", the quartz frequency shifts by the value $$\Delta f_q = S_g f_q a_g, \qquad (35)$$

where $a_g$ is the acceleration in units of g, g=9.8 m/s², $f_q$ is the quartz frequency, $S_g$ is the quartz sensitivity to the acceleration (a typical value is $S_g \approx 10^{-9} \left[\frac{radian}{g}\right]$).

In the analysis and design of the phase loop, we translate the quartz frequency fluctuations to corresponding fluctuations in the carrier frequency $f_0$, i.e. to use the following formula instead of the formula (35):

$$\Delta f_0 = S_g f_0 a_g. \tag{36}$$

In all other respects the method of designing of the phase loop is similar to the one described above. Its use shows that in the absence of vibrations and shocks one may choose for the phase loop a second-order or third-order system with a bandwidth $B_L$ of about 3 Hz, and in the presence of moderate vibrations a bandwidth of about 20 Hz. At the maximally strong vibrations and shocks, that the receiver can withstand mechanically, it is desirable to increase $B_L$ still more (up to 40 or 50 Hz); in this case, it is possible that we would have to simultaneously decrease the control period $T_c$ to 4 . . . 1 ms.

Coordinate Loops

The use of the method described above shows that at the stationary case (for the immobile receiver) one can use a second-order or third-order loop for the common coordinate loops, with a bandwidth $B_L$ in the range of approximately 3 Hz to approximately 6 Hz. At high dynamics (maximal acceleration—up to 6 g, maximal acceleration derivative—up to 10 g per second) it is desirable to use a third-order loop for the coordinate loops, with a bandwidth $B_L \approx 20$ Hz to 30 Hz.

GPS Frequency Reference Tracking Embodiments

In some applications of the present invention, it would be advantageous for the receiver to generate a reference signal whose frequency precisely follows the global GPS reference frequency present in the GPS satellites. On first inspection, one might think that the output of reference oscillator 26 (FIGS. 1, 1A, 2 or 3) could provide such a signal since the objective of the phase correction loop is to correct for deviations in the receiver's oscillator phase based upon the signals transmitted from the satellites. However, there is an interaction between the vector common phase loop and the individual PLL loops which prevents the frequency of oscillator 26 from tracking the global GPS reference frequency.

To understand this interaction, we will use the receiver topology of FIG. 1, with the receiver set in a fixed position. To begin the analysis, we will assume that there are no noise signals and that all of the loops are at steady state conditions, meaning that signals X, Y, Z, $\Phi q$, $U_X$, $U_Y$, $U_Z$, Uq, $E_{P1}$ through $E_{PN}$, and $U_1$ through $U_N$ have stabilized to constant values. We then induce a frequency shift of $\Delta\omega_T$ in oscillator 26 from $\omega_{REF}$ to $(\omega_{REF}+\Delta\omega_T)$. This will cause the common phase loop to act to correct the frequency shift by adjusting the value of Uq by an appropriate amount. The frequency shift causes the NCOs 29 to shift their phases in a linearly increasing manner, which is detected by the channel discriminators 27. In turn, signals $E_{P1}$ through $E_{PN}$ begin to change in value by the same amount, which is detected by phase loop signal $\Phi q$ due to the G-matrix processing of blocks 42–43. (Because signals $E_{P1}$ through $E_{PN}$ change by the same amount, the G-matrix produces no changes in the common coordinate signals X, Y, and Z.) The change in signal $\Phi q$ causes signal Uq to change the output of reference oscillator 26 to reverse the induced frequency shift $\Delta\omega_T$ to bring the output frequency of oscillator 26 back to $\omega_{REF}$. The correction of the oscillator 26 causes the NCOs 29 to correct back to their previous frequencies. However, this takes a finite amount of time, during which signals $U_1$ through $U_N$ in the individual PLL loops also change because of the changes in signals $E_{P1}$ through $E_{PN}$. The changes in signals $U_1$ through $U_N$ are provided to NCOs 29 through summators 31, and also cause the NCOs to correct back to their previous frequencies. As a result, a portion of the necessary frequency correction $-\Delta\omega_T$ is caused by the action of the individual PLL loops, which we denote as $-\Delta\omega_1$, and the remaining portion is caused by the common phase loop, which we denote as $-\Delta\omega_2$. The sum of these two correction portions being $-\Delta\omega_T$:$-\Delta\omega_{T1}+(-\Delta\omega_2)=-\Delta\omega_T$. Both correction portions have magnitudes which are less than the magnitude of the original shift $\Delta\omega_T$. As a result, generator 25 is corrected back to a value of $(\omega_{REF}+\Delta\omega_T-\Delta\omega_2)=(\omega_{REF}+\Delta\omega_1)$, not to the original starting value of $\omega_{REF}$. The frequency offset that is left in generator 26 is equal to, but opposite in value, to the correction provided by the individual PLL loops. Therefore, the output of generator 26 will not, in general, track the global GPS frequency reference (which we have assumed to be constant throughout this exercise).

We note that while the interaction of the local PLL loops with the common phase loop makes it difficult to use the output frequency of oscillator 26 as a tracking signal for the global GPS reference frequency, it does not interfere with the previously described goals and benefits of the Joint Tracking system.

We now describe addition processing steps which can enable the output of oscillator 26 closely track the global GPS reference frequency. These additional steps may, of course, be implemented by corresponding processing blocks in an apparatus, an they may be applied to any of the previously described embodiments. The navigator unit of any GPS receiver may be augmented by well known methods to track the frequency shift $\Delta\omega$ of the receiver's local reference oscillator relative to the global GPS reference frequency. This signal can be periodically generated during each epoch (for example, once a second), along with the receiver's position, velocity, and clock offset. One may then generate a frequency correction signal $U_{\Delta\omega}$ from this frequency shift $\Delta\omega$, and thereafter feed $U_{\Delta\omega}$ into the common phase loop. An easy way of doing this is to inject the signal $U_{\Delta\omega}$ into the input of the last accumulation (integration) stage of filter Fq(p). We show this in FIG. 15 with a second order loop that follows the filter topology of FIG. 6. This configuration causes signal $U_{\Delta\omega}$ to set the "D.C. bias point", or long-term level, of control signal Uq instead of signal $\Phi q$. Signal $\Phi q$ is then left to correct for short term errors. With this configuration, signal $U_{\Delta\omega}$ provides good long-term stability of the reference frequency while signal $\Phi q$ provides good short-term stability of the reference frequency.

The receiver's navigator unit provides a shift estimate of the receiver's reference frequency relative to the global GPS reference frequency $\Delta\omega$ once every epoch, with a frequency $F_e$ (see, for example, "Understanding GPS: Principles and Applications", ed. by Elliot D. Kaplan, Artech House, Boston-London, 1996, p.48). The signal $U_{\Delta\omega}$ is generated from $\Delta\omega$ as follows:

$$U_{\Delta\omega}=k_f \Delta\omega,$$

where $k_f$ is a constant.

Using this correction signal $U_{\Delta\omega}$ means that, in essence, we are using a first-order frequency lock loop (FLL) system that is formed between the common phase loop and the navigator unit. At the start of each epoch, the navigator unit provides a new value of $U_{\Delta\omega}$ to the common phase loop. Then, during the time between epochs, the common phase loop adjust the oscillator frequency, the result of which is then detected by the navigator unit at the next epoch. The desired equivalent noise bandwidth of this FFL system, $B_{FLL}$, is adjusted by fitting the value $k_f$ with known methods. It is necessary to set this bandwidth less than the FLL control frequency $F_e$, preferably 1–2 orders (i.e., 10 to 100 times) less than frequency $F_e$, for example, $B_{FLL}$=0.1 . . . 0.01 Hz (for $F_e$=1 Hz). Because of the very narrow band of this loop, it can only compensate for long-term reference instability. The bandwidth of the common phase loop is much greater (20 . . . 200 Hz), so it can compensate for short-term instability.

As one variation of the topology shown in FIG. 15, the positions of blocks $K_2$ and $\Sigma_1$ may be exchanged. As another variation, the position of gain block $K_2$ and the summator for $U_{\Delta\omega}$ may be exchanged (see FIG. 16); in this case, signal $U_{\Delta\omega}$ is generated as $K_2 \cdot U_{\Delta\omega}$. As another variation, the signal $U_{\Delta\omega}$ may be separately accumulated and the accumulated signal may be directed added to signal Uq (see FIG. 17); in this variation, signal $U_{\Delta\omega}$ would not be inject into the input of the last accumulation (integration) stage of filter Fq(p). The topologies shown in FIGS. 15–17 and their modifications have the effect of accumulating the frequency-shift signal $U_{\Delta\omega}$ and thereafter adding the accumulated frequency-shift signal to the phase correction signal Uq.

Embodiments for Improving L2 Phase Tracking

While the use of an improved Doppler-shift correction (DSC) signal in the PLL loop of a channel which tracks an L2-band signal is extremely useful, there are some situations where the improved DSC signal is not sufficient. The deficiencies of the improved DSC signal can be addressed by using an additional common phase loop for the PLL loops which track L2-band signals. Before we describe such an additional common phase loop, let us explain the deficiencies of the improved DSC signal.

The satellite signals are circularly polarized, and practitioners in the global positioning art often use circularly polarized antennas in the receivers in order to improve signal reception. Because of the polarization, when we rotate a circularly-polarized antenna around its vertical axis, we cause a phase shift in the received versions of the satellite signals even though we have not moved the phase center of the antenna in any of the positional (X, Y, Z) coordinates. If we rotate the antenna by an angle Ψ, the phases of all the satellite signals in both the L1 and L2 bands get the same phase shift ψ, which is equal to the rotation angle Ψ (ψ=Ψ). The common phase loop detects the phase shift and corrects for it in the PLL loops which are tracking L1-band signals. Here we have assumed a civilian application where the common phase loop does not use phase information from L2-band signals, and where the PLL loops of the L2-band signals receive improved DSC signals. The correction Ψ by the common phase loop is provided to the L2-band PLLs through the improved DSC signals as follows:

$$K_s \cdot \Psi = \frac{f_2}{f_1} \cdot \Psi = 0.77922 \cdot \Psi \tag{37}$$

because of the frequency scaling $K_s$ between the controlling loops and the controlled loops. However, the L2-band PLL loops see the full amount of rotation Ψ, and thus need the full amount of correction Ψ. The improved DSC signals fail to provide the L2-band PLL loops with the full correction, and are deficient by the amount of: $(1-K_s)\Psi$=0.22078·Ψ. The L2-band PLL loops would have to compensate for these deficiencies. However, such compensation by the L2-band PLLs is often impractical because the bandwidths of these loops have been significantly reduced in order to compensate for the lower signal-to-noise (S/N) ratio in the L2-band signals. Whereas the common phase loop for the L1-bands signals have a bandwidth of about 20 Hz, the L2-band PLLs have bandwidths of 0.2 Hz or even 0.02 Hz, which is 100 to 1,000 times less. Thus, while the L2-band PLLs only have to compensate for 1/4.5 (22%) of the correction done by the L1-band common phase loop, their reaction speed (as measured by bandwidth) is usually $\frac{1}{100}^{th}$ or less than that of the L1-band common phase loop. Thus, while the additional amount of needed correction is small, it is still dangerous for the L2-band PLLs, and L2-band PLLs may slip several carrier cycles during their responses to provide the correction.

Further embodiments of the present invention which addresses this problem adds to any of the previously described embodiments an additional common phase loop for the L2-band signals which detects the additional 22% amount of required correction for antenna rotations. This phase loop can have the configuration shown in FIG. 2, except that only L2-band tracking channels are used, and can generate a phase signal $\Phi_{q,L2}$ in the form of expressions (2) or (2'), or other forms discussed above (e.g., G-matrix processing blocks). The additional common phase loop is shown in FIG. 18, where only one L2-band tracking channel has been shown for visual clarity. The second common phase loop detects common phase shifts in the phase output signals of the individual L2-band PLL circuits, and generates signal $\Phi q_{L2}$ which is representative of the detected common phase shift. The phase signal $\Phi q_{L2}$ is then filtered to generate a phase correction signal $Uq_{L2}$, which is added to each phase correction signal $U_{K,L2}$ of each L2-band PLL loop by summator 31, along with the improved DSC signal for the individual PLL loop. This step modifies the operation of the L2-band PLL circuits to account for the common phase shift. The improved DSC signal for each L2-band PLL loop is generated from the corresponding L1-band tracking channel as described above, and of course includes the phase correction signal $U_K$ and program signal of the L1-band PLL loop, and any correction signals from the common loops for the L1-band signals. The second common loop for the L2-band signals can operate at a bandwidth which is higher than the bandwidths of the L2-band PLLs, and which is sufficiently high to respond to the antenna rotations.

The rotation of the antenna about its phase center does not result in an offset in code delay of the DLL just an offset of carrier phase in the PLL). Therefore, the correction signal $33_K$ to the DLL can be generated as described in previous embodiments.

In the above discussion, we have only considered antenna rotations around the antenna's vertical axis. These rotations can, for example, occur when the receiver is mount to an automobile and the automobile turns a corner. There can also be rotations around the two horizontal axes, such as when the automobile enters an inclined turn, which can cause similar problems for the L2-band PLLs. However, these rotations are typically less frequent and are of less magnitude than the rotations around the vertical axis.

It should be noted that, unlike antenna rotations about the vertical axis, antenna rotations about the horizontal axes result in different phase shifts in the received satellite signals (the differences depend upon elevation and satellite azimuth). Generally speaking, it is possible to add additional common loops for the L2-band PLLs for tracking the rotations about the horizontal axes. The design of these loops will be differ from both the second common phase loop for tracking rotation about vertical axis, and the coordinate common loops which are used for tracking the motion of the antenna's phase center. However, the additional complexity required for implementing these loops is usually not justified since horizontal rotations of substantial magnitude are very infrequent.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

Appendix A

The Form of the H' Matrix for Tracking Coordinate Changes and Rotational Changes The matrix H' is used in a situation where a group of M antennas are attached to a movable object. The position (X, Y, Z) of the object is tracked with respect to a global coordinate system, and the rotations of the same object about a predefined point are also tracked. The predefined point is usually on the object or within the object. The global coordinate system is fixed and has three axes (XG, YG, ZG). To track the object's rotations, a local coordinate system, which usually has three axes (XL, YL, ZL), is defined within the global coordinate system. The origin of the local coordinate system coincides with the predefined point from which the rotations are tracked. Three rotational coordinates $\alpha$, $\beta$, and $\gamma$ are used to track the rotation of the object about respective axes of the local coordinate system. When each of $\alpha$, $\beta$, and $\gamma$ are zero (0,0,0), the local coordinate system is aligned to the global coordinate system in a predetermined manner, which we call the "initial orientation".

In typical cases, both the global and local coordinate systems comprise the Cartesian coordinate system (also called the rectangular coordinate system); in this case, it is typical to have the coordinate axes of the local coordinate system be parallel to corresponding axes of the global coordinate system when the local coordinate is in the "initial orientation". As shown below, the initial orientation of the local coordinate system plays an important role in defining relationships between local coordinate values and global coordinate values of a point on the object. For this reason, we will define an "initial local coordinate system", which is equal to the local coordinate system under the condition of $(\alpha, \beta, \gamma)=(0, 0, 0)$. For the purpose of illustrating how matrix H' may be formed, we will use the Earth-Centered, Earth-Fixed coordinate system (the "ECEF system") for coordinates X, Y, and Z (the global coordinate system), and the Vehicle-Body Coordinate system (the "VBCS system") for the rotational coordinates $\alpha$, $\beta$, $\gamma$ (the local coordinate system). These are common selections of the coordinate systems. These coordinate systems are shown in FIG. 19, where axes XG, YG, and ZG are the global coordinate system (ECEF system), and the initial orientation of the local coordinate system is shown in dashed axes XL, YL, ZL. Both systems are right-handed Cartesian systems (i.e., axis XG crossed into axis YL defines axis ZG). By the conventional definition of the ECEF system, the origin of the global coordinate system coincides with the center of the earth, the ZG axes passes through the Earth's North Pole, and the XG axis passes through the Greenwich Meridian (at the Equator). By convention, and without loss of generality, the VBCS system has its initial orientation aligned with the orientation of the global system (i.e., axis XL is parallel to axis XG, axis YL is parallel to axis YG, and axis ZL is parallel to axis ZG). $\alpha$ is the heading angle, and is the rotation about the ZL-axis. $\beta$ is the pitch angle, and is the rotation about the YL-axis. $\gamma$ is the roll angle, and is the rotation about the XL-axis. Each rotation ($\alpha$, $\beta$, $\gamma$) has a right-handed orientation about its respective axis (z, y, x), as shown in FIG. 19. The distance vector between the origins of the two systems is defined herein as $X^G_0 = (x^G_0, y^G_0, z^G_0)^T$, as measured in the global coordinate system.

By changing the values of $\alpha$, $\beta$, $\gamma$ to non-zero values, the local coordinate system is rotated away from its initial orientation. An example of non-zero values of $\alpha$, $\beta$, $\gamma$ is shown by the coordinate system drawn with solid lines for its axes. It is known in the global positioning art that any vector r in the initial local coordinate system (dashed-lines) may be expressed as vector r' in the current orientation of the local coordinate system (solid lines) by applying the matrix transformation r'=A·r, where matrix A is the well known "attitude matrix".

$$A = \begin{bmatrix} \cos\beta \cdot \cos\alpha & \cos\beta \cdot \sin\alpha & -\sin\beta \\ (-\cos\gamma \cdot \sin\alpha + \sin\gamma \cdot \sin\beta \cdot \cos\alpha) & (\cos\gamma \cdot \cos\alpha + \sin\gamma \cdot \sin\beta \cdot \sin\alpha) & (\sin\gamma \cdot \cos\beta) \\ (\sin\gamma \cdot \sin\alpha + \cos\gamma \cdot \sin\beta \cdot \cos\alpha) & (-\sin\gamma \cdot \cos\alpha + \cos\gamma \cdot \sin\beta \cdot \sin\alpha) & (\cos\gamma \cdot \cos\beta) \end{bmatrix}$$

The matrix elements of A depend upon the current values of $\alpha$, $\beta$, $\gamma$. Under the condition of $(\alpha, \beta, \gamma)=(0,0,0)$, matrix A reduces to the identity matrix (I), and r'=r. The matrix transpose of A is denoted as $A^T$, and is equal to the matrix inverse of A: $A^T=A^{-1}$, and $A \cdot A^T = A \cdot A^{-1} = I$. In the reverse process, any vector r' in the current orientation of the local coordinate system (solid lines) may be expressed as vector r in the initial local coordinate system (dashed-lines) by applying the matrix transformation $r=A^T \cdot r'$. In turn, vector r in the initial local coordinate system has the corresponding global coordinates ($X^G_0+r$) in the global coordinate system. Applying this to the previous relation of $r=A^T \cdot r'$, the vector r' in the local coordinate system has the corresponding global coordinates ($X^G_0 + A^T \cdot r'$) in the global coordinate system.

As indicated above, a plurality of M antennas are attached to the object which is rotated around in the local coordinate system. The position of such an antenna may be specific in the global coordinate system as $X^G_A = (x^G_A, y^G_A, z^G_A)^T$, and in the local coordinate system as $X^L_A = (x^L_A, y^L_A, z^L_A)^T$. Applying the above correspondence relationship between coordinate systems, $X^G_A$ and $X^L_A$ can be related to one another by:

$$X^G_A = A^T(\alpha,\beta,\gamma) \cdot X^L_A + X^G_0 \qquad [A1]$$

where $X^G_0$ is the set of global-coordinates for the origin of the local coordinate system.

As described in the specification, the matrix H' is used in the relationship $W = H' \cdot U_C$, where the vector $U_C = (U_\alpha, U_\beta, U_\gamma, U_X, U_Y, U_Z)^T$, and where the vector W represents the phase changes to be made to the corresponding phase-lock loops of the tracking system. The matrix H' is formally known as Jacoby's matrix, or the Jacobian matrix, and it is also used by the Navigator unit to compute the values of the coordinates ($\alpha$, $\beta$, $\gamma$, X, Y, Z), such as by the standard iterative computation process. In the coordinate systems chosen above, $\alpha$, $\beta$, and $\gamma$ represent the rotations around the axes of the local coordinate system, and X, Y, Z represent the global coordinates of the origin of the local coordinate system, which is $X^G_0$. Given a vector of small changes in the coordinates ($\Delta\alpha$, $\Delta\beta$, $\Delta\gamma$, $\Delta X$, $\Delta Y$, $\Delta Z$), the matrix H' provides one with the corresponding changes in the pseudo-ranges $\Delta R_{K,J}$ between the satellites and the antennas by the following relationship:

$$\begin{bmatrix} \Delta R_{1,1} \\ \Delta R_{1,2} \\ \vdots \\ \Delta R_{K,J} \\ \vdots \\ \Delta R_{M,N} \end{bmatrix} = H' \cdot \begin{bmatrix} \Delta\alpha \\ \Delta\beta \\ \Delta\gamma \\ \Delta X \\ \Delta Y \\ \Delta Z \end{bmatrix} \quad [A2]$$

Here, index "K" in $\Delta R_{K,J}$ is the $K^{th}$ antenna (out of M antennas), and the index "J" is the $J^{th}$ satellite (out of N satellites). Understanding this basic definition will enable one to generate the form for matrix H' for any selection of coordinate system definitions for X, Y, and Z and $\alpha$, $\beta$, $\gamma$. For the sake of generality, we will assume N satellites and M antennas, and we will assume the system is tracking N satellites with M antennas for a total of M*N tracking signals. Thus, there will be M*N pseudo-ranges, and matrix H' will have the dimensions of M*N rows by six columns. In most cases, not all M*N pseudo-ranges are tracked by a system. The Matrix H' for such cases may be derived from the form given below by removing those rows which correspond to antenna-satellite combinations which are not being tracked.

As provided by form [A2], each row of matrix H' corresponds to unique combination of one satellite and one antenna. Additionally, the dot product of a matrix row of H' with a vector of small coordinate changes ($\Delta\alpha$, $\Delta\beta$, $\Delta\gamma$, $\Delta X$, $\Delta Y$, $\Delta Z)^T$ provides the resulting change in the pseudo-range between the corresponding combination of the satellite and antenna. If the $i^{th}$ row of matrix H' is associated with the $K^{th}$ antenna, the $J^{th}$ satellite, and the pseudo-range $R_{K,J}$, then the elements of this row comprise the partial derivatives of the pseudo-range $R_{K,J}$, with the coordinates:

$(H'_{i,1}, H'_{i,2}, H'_{i,3}, H'_{i,4}, H'_{i,5}, H'_{i,6}) = (\partial R_{K,J}/\partial\alpha, \partial R_{K,J}/\partial\beta, \partial R_{K,J}/\partial\gamma, \partial R_{K,J}/\partial X, \partial R_{K,J}/\partial Y, \partial R_{K,J}/\partial Z)$ [A3]

The pseudo-range $R_{K,J}$ is the distance between the $J^{th}$ satellite and the $K^{th}$ antenna, and is most conveniently expressed in the global coordinate system (in this example, the ECEF system):

$$R_{K,J} = \sqrt{(x^G_J - x^G_{a,K})^2 + (y^G_J - y^G_{a,K})^2 + (z^G_J - z^G_{a,K})^2} + c^*\delta_\tau \quad [A4]$$

where $(x^G_J, y^G_J, z^G_J) = X^G_J$ are the global coordinates of the $J^{th}$ satellite, where $(x^G_{a,K}, y^G_{a,K}, z^G_{a,K}) = X^G_{a,K}$ are the global coordinates of the $K^{th}$ antenna, where c is the speed of light, and where $\delta_\tau$ is the drift in the local time scale. The position of each antenna is known in the local coordinate system($X^L_{a,K}$), and the corresponding global position may be found from equation [A1] as $X^G_{a,K} = A^T(\alpha,\beta,\gamma) \cdot X^L_{a,K} + X^G_0$, where we can set $X^G_0$ equal to the three translational coordinates X, Y, Z:

$x^G_{a,K} = A_{11}(\alpha,\beta,\gamma) \cdot x^L_{a,K} + A_{21}(\alpha,\beta,\gamma) \cdot y^L_{a,K} + A_{31}(\alpha,\beta,\gamma) \cdot z^L_{a,K} + X,$ $y^G_{a,K} = A_{12}(\alpha,\beta,\gamma) \cdot x^L_{a,K} + A_{22}(\alpha,\beta,\gamma) \cdot y^L_{a,K} + A_{32}(\alpha,\beta,\gamma) \cdot z^L_{a,K} + Y,$ $z^G_{a,K} = A_{13}(\alpha,\beta,\gamma) \cdot x^L_{a,K} + A_{23}(\alpha,\beta,\gamma) \cdot y^L_{a,K} + A_{33}(\alpha,\beta,\gamma) \cdot z^L_{a,K} + Z.$ [A5]

The relationships provided by [A5] may be incorporated into the relationship for $R_{K,J}$, and the partial derivative may then be taken to form the matrix elements of the $i^{th}$ row of matrix H'. Through conventional exercise of mathematics (calculus and algebra), the $i^{th}$ row of matrix H' may be written as:

$$(H'_{i,1}, H'_{i,2}, H'_{i,3}, H'_{i,4}, H'_{i,5}, H'_{i,6}) = \quad [A6]$$

$$(H_{X,i}, H_{Y,i}, H_{Z,i}) \cdot \begin{bmatrix} A'_{11} & A'_{12} & A'_{13} & | & 1 & 0 & 0 \\ A'_{21} & A'_{22} & A'_{23} & | & 0 & 1 & 0 \\ A'_{31} & A'_{32} & A'_{33} & | & 0 & 0 & 1 \end{bmatrix}$$

where the first three columns of the 3-by-6 matrix are based upon the partial derivatives of the matrix A with respect to $\alpha$, $\beta$, and $\gamma$, and where the last three columns are based upon partial derivative with respect to X, Y, and Z. The elements of the pre-scaling row, $H_{X,i}$, $H_{Y,i}$, and $H_{Z,i}$, are defined as:

$$H_{X,i} = -\frac{(x^G_J - x^G_{a,K})}{R_{K,J}}; \quad [A7]$$

$$H_{Y,i} = -\frac{(y^G_J - y^G_{a,K})}{R_{K,J}};$$

$$H_{Z,i} = -\frac{(z^G_J - z^G_{a,K})}{R_{K,J}}.$$

and where matrix elements $A'_{11}$ through $A'_{33}$ are defined below as:

$A'_{11}(dA_{11}/d\alpha, dA_{21}/d\alpha, dA_{31}/d\alpha) \cdot (x^L_{a,K}, y^L_{a,K}, z^L_{a,K})^T$ $A'_{12} = (dA_{11}/d\beta, dA_{21}/d\beta, dA_{31}/d\beta) \cdot (x^L_{a,K}, y^L_{a,K}, z^L_{a,K})^T$ $A'_{13} = (dA_{11}/d\gamma, dA_{21}/d\gamma, dA_{31}/d\gamma) \cdot (x^L_{a,K}, y^L_{a,K}, z^L_{a,K})^T$ $A'_{21} = (dA_{12}/d\alpha, dA_{22}/d\alpha, dA_{32}/d\alpha) \cdot (x^L_{a,K}, y^L_{a,K}, z^L_{a,K})^T$ $A'_{22} = (dA_{12}/d\beta, dA_{22}/d\beta, dA_{32}/d\beta) \cdot (x^L_{a,K}, y^L_{a,K}, z^L_{a,K})^T$ $A'_{23} = (dA_{12}/d\gamma, dA_{22}/d\gamma, dA_{32}/d\gamma) \cdot (x^L_{a,K}, y^L_{a,K}, z^L_{a,K})^T$ $A'_{31} = (dA_{13}/d\alpha, dA_{23}/d\alpha, dA_{33}/d\alpha) \cdot (x^L_{a,K}, y^L_{a,K}, z^L_{a,K})^T$ $A'_{32} = (dA_{13}/d\beta, dA_{23}/d\beta, dA_{33}/d\beta) \cdot (x^L_{a,K}, y^L_{a,K}, z^L_{a,K})^T$ $A'_{33} = (dA_{13}/d\gamma, dA_{23}/d\gamma, dA_{33}/d\gamma) \cdot (x^L_{a,K}, y^L_{a,K}, z^L_{a,K})^T$ [A8]

The navigation unit tracks the current position $\alpha$, $\beta$, $\gamma$, X, Y, and Z, and each of the terms used in equations [A7] and [A8] can be readily computed from this information. The matrix elements in [A8] are specific to the $K^{th}$ antenna (because of their dependence upon $x^L_{a,K}$, $y^L_{a,K}$, $z^L_{a,K}$, which are know beforehand), and may be grouped together as matrix $A_K'$. Equation [A6] may then be abbreviated as:

$(H'_{i,1}, H'_{i,2}, H'_{i,3}, H'_{i,4}, H'_{i,5}, H'_{i,6}) = (H_{X,i}, H_{Y,i}, H_{Z,i}) \cdot [A'_K|I]$ [A9]

Note that matrix elements of $A_K'$ are valid for any satellite signal received by the $K^{th}$ antenna, but that the row elements $H_{X,i}$, $H_{Y,i}$, and $H_{Z,i}$ are specific to the $J^{th}$ satellite and the $K^{th}$ antenna. Each satellite will have its own row elements ($H_X$, $H_Y$, $H_Z$) for the $K^{th}$ antenna. We may group rows of satellites 1–N for the $K^{th}$ antenna together into a sub-matrix matrix $H_K$, and the rows of matrix H' associated with the $K^{th}$ antenna may be expressed as: $H_K \cdot [A_K'|I]$, or equivalently as $[H_K \cdot A_K'|H_K]$, where matrix $H_K$ has J rows (one for each satellite). Matrix $H_K$ has the same form as matrix H does for the one antenna case (in which case only X, Y, and Z are being tracked). The row expressions for the antennas may then be grouped together to provide the matrix H' in full form.

$$H' = \begin{bmatrix} H_1 \cdot A_1' & | & H_1 \\ \vdots & | & \vdots \\ H_K \cdot A_K' & | & H_K \\ \vdots & | & \vdots \\ H_M \cdot A_M' & | & H_M \end{bmatrix} \quad [A10]$$

From the form of matrix H' in this selection of coordinate systems, the form of matrix H' for other selection of coordinate systems can be generated by applying known transformations. It may also be generated by following the general derivation steps outlined above for the specific coordinate systems employed (i.e., defining the coordinate systems, finding the mapping relationship between systems, forming the appropriate partial derivatives, and then consolidating the derivatives in matrix form).

From equation [A10], matrix G' may be computed as:

$$G' = (H_1'^T \cdot R'^{-1} \cdot H_1')^{-1} \cdot H_1'^T \cdot R'^{-1},$$

where matrix $H'_1 = [H'|1]$, and where matrix R' is a generalization to M antennas of the convariance matrix R for the one antenna case (R has dimension of N-by-N). Matrix R' may have the form:

$$R' = \begin{bmatrix} R & | & 0 & | & \cdots & | & 0 \\ 0 & | & R & | & \cdots & | & 0 \\ \vdots & | & \vdots & | & \vdots & | & \vdots \\ 0 & | & 0 & | & \cdots & | & R \end{bmatrix}$$

What is claimed is:

1. A method of tracking a plurality N (N≧3) of global positioning satellite signals received by an antenna, each satellite signal having a carrier signal, said method comprising the steps of:

(a) tracking the carrier signal of each of the satellite signals with an individual phase-lock loop (PLL) circuit having a corresponding reference carrier generator which generates a corresponding reference carrier signal, said reference carrier signal having a phase which is approximately equal to the phase of the satellite carrier signal as provided to the PLL circuit, each PLL circuit generating a phase output signal representative of the phase difference between the satellite carrier signal being tracked and the corresponding reference carrier signal;

(b) detecting a change in the position of the antenna within a selected coordinate system from the phase output signals of the individual PLL circuits;

(c) generating a correction signal ($W_K$) for each individual PLL circuit in relation to the detected change in the antenna's position; and (d) modifying the operation of each individual PLL circuit based on the value of the corresponding correction signal for it.

2. The method of claim 1 wherein each satellite signal further comprises a repeating pseudo-random code signal which is modulated onto its carrier signal, and wherein said method further comprises the steps of:

(e) tracking the pseudo-random signal of each satellite signal with a respective reference code signal in an individual delay-lock loop (DLL) circuit, each satellite signal thereby being tracked by a PLL circuit and a corresponding DLL circuit;

(f) generating a correction signal for an individual DLL circuit from the correction signal ($W_K$) generated for the corresponding PLL circuit; and (g) modifying the phase of the reference code signal of said individual DLL circuit based on the value of the correction signal generated by step (f).

3. The method of claim 1 wherein there are a plurality of pseudo-ranges corresponding to the number of satellite carrier signals being tracked by the PLL circuits, each pseudo-range being between the satellite which transmits the satellite carrier signal and the antenna; and wherein said step (b) comprises the steps of:

(e) grouping the phase output signals of said PLL circuits in the form of a first vector $E_P$ of signals; and (f) generating a second vector $V_C$ of signals representative of the matrix multiplication of a geometric pseudo-inverse matrix G with said first vector $E_P$ of signals, said matrix G comprising a pseudo-inverse matrix of a geometric Jacobian matrix H for said plurality of pseudo-ranges or a pseudo-inverse of a complemented geometric Jacobian matrix $H_1$ for said plurality of pseudo-ranges, the matrix elements of said matrix H or said matrix $H_1$ being representative of the changes in the pseudo-ranges that would be caused by changes in the antenna's position in the selected coordinate system, said second vector $V_C$ of signals being representative of a change in the position of the antenna.

4. The method of claim 3 wherein said step (c) comprises the steps of:

(g) generating a third vector $U_C$ of control signals from said second vector $V_C$ of signals, each signal of said third vector $U_C$ being generated by filtering a corresponding signal of said second vector $V_C$;

(h) generating a fourth vector W of signals representative of the matrix multiplication of a geometric Jacobian matrix H with the third vector $U_C$ of control signals, each said signal of said fourth vector W being one of said correction signals ($W_K$) for a respective PLL circuit.

5. The method of claim 4 wherein each individual PLL circuit further comprises a loop filter which has an input and which generates a PLL loop control signal ($U_k$) in response to a signal coupled to the loop filter's input, the signal coupled to the input of the loop filter being representative of the phase difference between the satellite carrier signal being tracked by the PLL circuit and the corresponding reference carrier signal of the PLL circuit;

wherein said step (a) comprises the step of varying the output phase of the reference carrier generator of each PLL circuit in response to its PLL loop control signal ($U_k$); and wherein said step (d) comprises the step of further varying the output phase of the reference carrier generator of each PLL circuit in response to the corresponding correction signal ($W_k$) for the PLL circuit.

6. The method of claim 5 wherein the reference carrier generator of each said PLL circuit comprises an input for receiving a control signal, and wherein said generator varies the phase of its output signal in response to the signal at its input, and wherein said step (d) further comprises the step of combining the corresponding correction signal ($W_k$) for each PLL circuit with the PLL loop control signal ($U_k$) of the PLL circuit to generate a combined control signal ($U_{T,K}$), and the step of providing said combined control signal to the input of the reference carrier generator of the PLL circuit.

7. The method of claim 4 further comprising the step of removing the phase output signal of a selected PLL circuit from the processing provided in steps (e)–(h), said removal step comprising the steps of:

removing the phase output signal of the selected PLL circuit from said first vector $E_P$ of signals;

forming a reduced matrix H or a reduced matrix $H_1$ which has the matrix row corresponding to the phase output signal of said selected PLL circuit removed; and computing a replacement matrix G from said reduced matrix H or from said reduced matrix $H_1$.

8. The method of claim 7 wherein updated matrix elements of matrices H and G are provided at selected time points, and wherein said step of removing the phase output signal of a selected PLL circuit occurs between said selected time points.

9. The method of claim 5 further comprising the step of removing the phase output signal of a selected PLL circuit from the processing provided in steps(e)–(h), said removal step comprising the steps of:

removing the phase output signal of the selected PLL circuit from said first vector $E_P$ of signals;

forming a reduced matrix H or a reduced matrix $H_1$ which has the matrix row corresponding to the phase output signal of said selected PLL circuit removed; and computing a replacement matrix G from said reduced matrix H or from said reduced matrix $H_1$.

10. The method of claim 9 wherein updated matrix elements of matrices H and G are provided at selected time points, and wherein said step of removing the phase output signal of a selected PLL circuit occurs between said selected time points.

11. The method of claim 9 further comprising the step of decoupling the signal going to the input of the PLL loop filter of said selected PLL circuit.

12. The method of claim 11 further comprising the step of re-introducing the phase output signal of said selected PLL circuit to the processing provided in steps (e)–(h), said re-introduction step comprising the steps of:

forming an augmented matrix H or an augmented matrix $H_1$ which includes a matrix row corresponding to said selected PLL circuit; and thereafter computing a replacement matrix G from said augmented matrix H or augmented matrix $H_1$;

thereafter providing the phase output signal of said selected PLL circuit to said first vector $E_P$ of signals;

thereafter waiting a period of time; and thereafter re-coupling the signal to the input of the PLL loop filter of the selected PLL circuit.

13. The method of claim 9 wherein the phase output signal of said selected PLL circuit is removed from said first vector $E_P$ of signals when the signal-to-noise ratio of the satellite signal being tracked by said selected circuit falls below a selected level.

14. The method of claim 9 wherein the phase output signal of said selected PLL circuit is removed from said first vector $E_P$ of signals when the magnitude of the phase output signal of said selected PLL circuit rises above a selected level.

15. The method of claim 9 wherein each said reference carrier signal is in quadrature format having an in-phase component and a quadrature-phase component;

wherein said step (a) comprises the step of generating a first correlation signal ($I_K$) in said selected PLL circuit, said step including the step of multiplying the satellite carrier signal being tracked by said selected PLL circuit by the in-phase component of the reference carrier signal of said selected PLL circuit;

wherein said step (a) further comprises the step of generating a second correlation signal ($Q_K$) in said selected PLL circuit, said step including the step of multiplying the satellite carrier signal being tracked by said selected PLL circuit by the quadrature component of the reference carrier signal of said selected PLL circuit;

wherein said step (a) further comprises the step of generating a quality signal $S_K$ in a form which is a function of the quantity ($I_K^2 + Q_K^2$); and wherein the phase output signal of said selected PLL circuit is removed from said first vector $E_P$ of signals when the value of signal $S_K$ falls below a selected level.

16. The method of claim 9 wherein each said reference carrier signal is in quadrature format having an in-phase component and a quadrature-phase component;

wherein said step (a) comprises the step of generating a first correlation signal ($I_K$) in said selected PLL circuit, said step including the step of multiplying the satellite carrier signal being tracked by said selected PLL circuit by the in-phase component of the reference carrier signal of said selected PLL circuit;

wherein said step (a) further comprises the step of generating a second correlation signal ($Q_K$) in said selected PLL circuit, said step including the step of multiplying the satellite carrier signal being tracked by said selected PLL circuit by the quadrature component of the reference carrier signal of said selected PLL circuit;

wherein said step (a) further comprises the step of generating a quality signal $S_K$ in a form which is a function of the quantity ($I_K^2 - Q_K^2$); and wherein the phase output signal of said selected PLL circuit is removed from said first vector $E_P$ of signals when the value of signal $S_K$ falls below a selected level.

17. The method of claim 9 wherein each said reference carrier signal is in quadrature format having an in-phase component and a quadrature-phase component;

wherein said step (a) comprises the step of generating a first correlation signal ($I_K$) in said selected PLL circuit, said step including the step of multiplying the satellite carrier signal being tracked by said selected PLL circuit by the in-phase component of the reference carrier signal of said selected PLL circuit;

wherein said step (a) further comprises the step of generating a second correlation signal ($Q_K$) in said selected PLL circuit, said step including the step of multiplying the satellite carrier signal being tracked by said selected PLL circuit by the quadrature component of the reference carrier signal of said selected PLL circuit;

wherein said step (a) further comprises the step of generating a quality signal $S_K$ in a form which is a function of the quantity $\arctan(Q_K/I_K)$; and wherein the phase output signal of said selected PLL circuit is removed from said first vector $E_P$ of signals when the magnitude of signal $S_K$ rises above a selected level.

18. The method of claim 5 wherein step (d) further comprises the step of further varying the output phase of the reference carrier generator of a selected PLL circuit in response to a signal reflective of the frequency Doppler-shift of the satellite signal being tracked by said selected PLL circuit.

19. The method of claim 4 wherein said step (g) comprises the step of filtering each signal of said second vector $V_C$ of signals with a filter structure which is equivalent to three parallel signal processing paths which receive the signal to be filtered and separately process the signal, the outputs of said paths being combined to provide the filtered output, said first path multiplying the signal by a first gain factor ($K_1$), said second path multiplying the signal by a second gain factor ($K_2$) and integrating the signal with one integrator, and said third path multiplying the signal by a third gain factor ($K_3$) and integrating the signal with two integrators.

20. The method of claim 5 wherein each individual PLL circuit further comprises a correlator which generates a correlation signal from the satellite carrier signal tracked by the PLL circuit and from the reference carrier signal of the PLL circuit, and a phase discriminator which generates an output signal in response to said correlation signal, the output signal of the phase discriminator being provided to the input of the loop filter and being representative of the phase difference between the satellite carrier signal being tracked by the PLL circuit and the corresponding reference carrier signal of the PLL circuit;

wherein the correlator, the phase discriminator, the loop filter, and the reference signal generator of each said PLL circuit collectively comprise a second-order feedback loop whose frequency response has a first bandwidth;

wherein processing steps included by steps (b)–(h) form a common vector tracking loop which conveys a vector feedback signal for each PLL circuit through the processing steps included by steps (b)–(h) and through the reference generator, correlator, and phase discriminator of the PLL circuit;

wherein the frequency response of the common vector tracking loop to changes in at least one of the coordinates of the antenna's position has a second bandwidth; and wherein said second bandwidth is greater than said first bandwidth.

21. The method of claim 20 wherein said step (g) comprises the step of filtering each signal of said second vector $V_C$ of signals with a filter structure which is equivalent to three parallel signal processing paths which receive the signal to be filtered and separately process the signal, the outputs of said paths being combined to provide the filtered output, said first path multiplying the signal by a first gain factor ($K_1$), said second path multiplying the signal by a second gain factor ($K_2$) and integrating the signal with one integrator, and said third path multiplying the signal by a third gain factor ($K_3$) and integrating the signal with two integrators.

22. The method of claim 20 wherein the said second bandwidth is greater than said first bandwidth by a factor which is between approximately 4 and approximately 20.

23. The method of claim 22 wherein said first bandwidth is between approximately 1 Hz and approximately 5 Hz.

24. The method of claim 23 wherein the loop control signals ($U_K$) of the individual PLL circuits are generated in digital form and the values thereof are provided a first number of times per second, said first number being between approximately 10 and approximately 200; and wherein the phase output signal of the individual PLL circuits, the signals vector $V_C$, the signals of vector $U_C$, and the signals of vector W are generated in digital form and the values thereof are provided a second number of times per second, said second number being between approximately 200 and approximately 1,000.

25. The method of claim 20 wherein each said reference carrier signal is in quadrature format having an in-phase component and a quadrature-phase component;

wherein said step (a) comprises the step of generating a first correlation signal ($I_K$) in each PLL circuit, said first correlation signal ($I_K$) being generated in digital form and the values thereof are provided a first number of times per second, said step including the step of multiplying the satellite carrier signal being tracked by the PLL circuit by the in-phase component of the reference carrier signal of the PLL circuit, wherein there are N said first correlation signals (K=1 to K=N);

wherein said step (a) further comprises the step of generating a second correlation signal ($Q_K$) in each PLL circuit, said second correlation signal ($Q_K$) being generated in digital form and the values thereof are provided a second number of times per second, said step including the step of multiplying the satellite carrier signal being tracked by the PLL circuit by the quadrature component of the reference carrier signal of the PLL circuit, wherein there are N said second correlation signals (K=1 to K=N);

wherein step (a) further comprises the step of generating the phase output signals of each PLL circuit from the corresponding first and second correlation signals of the PLL circuit; and wherein the second number is greater than said first number, the values of the second correlation signals thereby being provided more frequently than the values said first correlation signal.

26. The method of claim 25 wherein step (a) further comprises the step of generating the phase output signal of a PLL circuit by the steps of: forming the reciprocal ($1/I_K$) of the current value of the first correlation signal ($I_K$), multiplying said reciprocal by the values of the second correlation signal ($Q_K$) until the value of said first correlation signal is next updated, and thereafter re-forming said reciprocal with the updated value of the first correlation signal ($I_K$).

27. The method of claim 1 wherein there are a plurality of pseudo-ranges corresponding to the number of satellite carrier signals being tracked by the PLL circuits, each pseudo-range being between the antenna and the satellite which transmits the satellite carrier signal;

wherein each reference carrier generator generates its output from a main reference oscillator whose frequency may vary in time; and wherein said step (b) comprises the steps of:

grouping the phase output signals of said PLL circuits in the form of a first vector $E_P$ of signals; and generating a second vector $V_D$ of signals representative of the matrix multiplication of a geometric pseudo-inverse matrix G with said first vector $E_P$ of signals, said matrix G comprising a pseudo-inverse matrix of a complemented geometric Jacobian matrix $H_1$ for said plurality of pseudo-ranges, the matrix elements of said matrix $H_1$ being representative of the changes in the pseudo-ranges that would be caused by changes in the antenna's position in the selected coordinate system and changes in the oscillation frequency of the main reference oscillator, said second vector $V_D$ of signals having a sub-vector $V_C$ of signals representative of a change in the position of the antenna and a signal $\Phi_q$ representative of a change in the frequency of the main reference oscillator.

28. The method of claim 27 wherein said step (c) comprises the steps of:
    generating a third vector $U_C$ of control signals from the sub-vector $V_C$ of said second vector $V_D$ of signals, each signal of said third vector $U_C$ being generated by filtering the corresponding signal of the sub-vector $V_C$ of said second vector $V_D$ of signals;
    generating a fourth vector W of signals representative of the matrix multiplication of a geometric Jacobian matrix H with the third vector $U_C$ of signals, the matrix elements of said matrix H being representative of the changes in the pseudo-ranges that would be caused by changes in the antenna's position in the selected coordinate system, each said signal of said fourth vector W being one of said correction signals ($W_K$) for a respective PLL circuit; and
    generating a phase correction signal $U_q$ by filtering the signal $\Phi_q$ of the second vector $V_D$ of signals.

29. The method of claim 28 wherein each individual PLL circuit further comprises a loop filter which has an input and which generates a PLL loop control signal ($U_k$) in response to a signal coupled to the loop filter's input, the signal coupled to the input of the loop filter being representative of the phase difference between the satellite carrier signal being tracked by the PLL circuit and the corresponding reference carrier signal of the PLL circuit;
    wherein said step (a) comprises the step of varying the output phase of the reference carrier generator of each PLL circuit in response to its PLL loop control signal ($U_k$); and
    wherein said step (d) comprises the step of further varying the output phase of the reference carrier generator of each PLL circuit in response to the corresponding correction signal ($W_k$) for the PLL circuit.

30. The method of claim 29 wherein the reference carrier generator of each said PLL circuit comprises an input for receiving a control signal, and wherein said generator varies the phase of its output signal in response to the signal at its input, and
    wherein said step (d) further comprises the step of combining the corresponding correction signal ($W_k$) for each PLL circuit with the PLL loop control signal ($U_k$) of the PLL circuit to generate a combined control signal ($U_{T,K}$), and the step of providing said combined control signal to the input of the reference carrier generator of the PLL circuit.

31. The method of claim 28 further comprising the step of modifying the phase of the main reference oscillator in response to said phase correction signal $U_q$.

32. A method of tracking a plurality N (N≧3) of global positioning satellite signals received by an antenna, each satellite signal having a carrier signal, said method comprising the steps of:
    (a) tracking the carrier signal of each of the satellite signals with an individual phase-lock loop (PLL) circuit having a corresponding reference carrier generator which generates a corresponding reference carrier signal, said reference carrier signal having a phase which is approximately equal to the phase of the satellite carrier signal as provided to the PLL circuit, each PLL circuit generating a phase output signal representative of the phase difference between the satellite carrier signal being tracked and the corresponding reference carrier signal, each reference carrier generator generating its output from a main reference oscillator whose frequency may vary in time;
    (b) detecting a change in the frequency of the main reference oscillator during an interval of time from the phase output signals of the individual PLL circuits;
    (c) generating a phase correction signal $U_q$ in response to the detected change; and
    (d) modifying the operation of at least one individual PLL circuit based on the value of said phase correction signal $U_q$.

33. The method of claim 32 wherein each said reference carrier signal is in quadrature format having an in-phase component and a quadrature-phase component;
    wherein said step (a) comprises the step of generating a first correlation signal ($I_K$) in each PLL circuit, said step including the step of multiplying the satellite carrier signal being tracked by the PLL circuit by the in-phase component of the reference carrier signal of the PLL circuit, wherein there are N said first correlation signals (K=1 to K=N);
    wherein said step (a) further comprises the step of generating a second correlation signal ($Q_K$) in each PLL circuit, said step including the step of multiplying the satellite carrier signal being tracked by the PLL circuit by the quadrature component of the reference carrier signal of the PLL circuit, wherein there are N said second correlation signals (K=1 to K=N), the phase output signal of a PLL circuit comprising the second correlation signal of the PLL circuit; and
    wherein step (b) comprises the step of generating a plurality of product signals, each product signal being proportional to the multiplication product of the first and second correlation signals ($I_K$, $Q_K$) of a PLL circuit, and the step of generating a common phase signal $\Phi_q$ from a summation of said product signals.

34. The method of claim 33 wherein said step (c) comprises the step of filtering said phase signal $\Phi_q$ and generating said phase correction signal $U_q$ in relation to the filtered phase signal $\Phi_q$.

35. The method of claim 33 wherein step (b) further comprises the step of forming a normalization signal related to the magnitudes of a plurality of said first correction signals ($I_K$), and the step of scaling said phase signal $\Phi_q$ by said normalization signal.

36. The method of claim 35 wherein said phase signal $\Phi_q$ is generated in the form:

$$\Phi_q = \left( \frac{\sum_{K=1}^{N} Q_K * I_K}{\sum_{K=1}^{N} I_k^2} \right).$$

37. The method of claim 35 wherein said phase signal $\Phi_q$ is generated in the form:

$$\Phi_q = \left( \frac{\sum_{K=1}^{N} Q_K * I_K}{\left(\sum_{K=1}^{N} |I_K|\right)^2} \right).$$

38. The method of claim 35 wherein said phase signal $\Phi_q$ is generated in the form:

$$\Phi_q = \arctan\left(\frac{\sum_{K=1}^{N} Q_K * I_K}{\sum_{K=1}^{N} I_K^2}\right).$$

39. The method of claim 35 wherein said phase signal $\Phi_q$ is generated in the form:

$$\Phi_q = ODD\left(\frac{\sum_{K=1}^{N} Q_K * I_K}{\sum_{K=1}^{N} I_K^2}\right),$$

where ODD(*) is an odd function.

40. The method of claim 35 wherein said phase signal $\Phi_q$ is generated in the form:

$$\Phi_q = ODD\left(\frac{\sum_{K=1}^{N} Q_K * I_K}{\left(\sum_{K=1}^{N} |I_K|\right)^2}\right),$$

where ODD(*) is an odd function.

41. The method of claim 33 wherein each said first correlation signal ($I_K$) is generated in digital form and the value thereof is provided a first number p of times per second;

wherein each said second correlation signal ($Q_K$) is generated in digital form and the value thereof is provided a second number q of times per second where q is greater than p.

42. The method of claim 41 wherein the value of said first correlation signal ($I_K$) is provided at periodic intervals having a first period $T_L$, and wherein the value of said second correlation signal ($Q_K$) is provided at periodic intervals having a second period $T_f$.

43. The method of claim 32 wherein each said individual phase-lock loop circuit modified by said step (d) comprises a phase discriminator which generates an output signal representative of the phase difference between the satellite carrier signal being tracked and the circuit's reference carrier signal, and a loop filter which generates a PLL loop control signal ($U_k$) in response to the output signal of said phase discriminator, wherein said step (a) comprises the step of varying the output phase of the reference carrier generator of each said PLL circuit in response to its PLL loop control signal ($U_k$); and wherein said step (d) comprises the step of further varying the output phase of the reference carrier generator of each said PLL circuit in response to said phase correction signal ($U_q$).

44. The method of claim 32 further comprising the step of modifying the output frequency of the main reference oscillator in response to said phase correction signal $U_q$.

45. The method of claim 34 wherein each individual PLL circuit further comprises a loop filter which has an input and which generates a PLL loop control signal ($U_k$) in response to a signal coupled to the loop filter's input, the signal coupled to the input of the loop filter being representative of the phase difference between the satellite carrier signal being tracked by the PLL circuit and the corresponding reference carrier signal of the PLL circuit;

wherein said step (a) comprises the step of varying the output phase of the reference carrier generator of each PLL circuit in response to its PLL loop control signal ($U_k$); and wherein said step (d) comprises the step of further varying the output phase of the reference carrier generator of each PLL circuit in response to the phase correction signal ($U_q$).

46. The method of claim 45 wherein the reference carrier generator of each said PLL circuit comprises an input for receiving a control signal, and wherein said generator varies the phase of its output signal in response to the signal at its input, and wherein said step (d) further comprises the step of combining the phase correction signal ($U_q$) with the PLL loop control signal ($U_k$) of the PLL circuit to generate a combined control signal ($U_{T,K}$), and the step of providing said combined control signal to the input of the reference carrier generator of the PLL circuit.

47. The method of claim 46 wherein step (d) further comprises the step of further varying the output phase of the reference carrier generator of a selected PLL circuit in response to a signal reflective of the frequency Doppler-shift of the satellite signal being tracked by said selected PLL circuit.

48. The method of claim 34 wherein said step of filtering said phase signal $\Phi_q$ comprises the step of filtering said signal $\Phi_q$ with a filter structure which is equivalent to three parallel signal processing paths which receive the signal to be filtered and separately process the signal, the outputs of said paths being combined to provide the filtered output, said first path multiplying the signal by a first gain factor ($K_1$), said second path multiplying the signal by a second gain factor ($K_2$) and integrating the signal with one integrator, and said third path multiplying the signal by a third gain factor ($K_3$) and integrating the signal with two integrators.

49. The method of claim 45 wherein each individual PLL circuit further comprises a correlator which generates a correlation signal from the satellite carrier signal tracked by the PLL circuit and from the reference carrier signal of the PLL circuit, and a phase discriminator which generates an output signal in response to said correlation signal, the output signal of the phase discriminator being provided to the input of the loop filter and being representative of the phase difference between the satellite carrier signal being tracked by the PLL circuit and the corresponding reference carrier signal of the PLL circuit;

wherein the correlator, the phase discriminator, the loop filter, and the reference signal generator of each said PLL circuit collectively comprise a second-order feedback loop whose frequency response has a first bandwidth;

wherein processing steps included by steps (b)–(d) form a common phase loop which conveys signal $\Phi_q$ as a feedback signal to each PLL;

wherein the frequency response of the common phase loop as seen by each feedback signal has a second bandwidth; and wherein said second bandwidth is greater than said first bandwidth.

50. The method of claim 49 wherein the said second bandwidth is greater than said first bandwidth by a factor which is between approximately 4 and approximately 20.

51. The method of claim 50 wherein said first bandwidth is between approximately 1 Hz and approximately 5 Hz.

52. The method of claim 51 wherein the phase output signal and the loop control signal ($U_k$) of each individual PLL circuit, the phase signal $\Phi_q$, and the phase correction signal $U_q$ are generated in digital form, wherein the values of the loop control signals ($U_k$) of the individual PLL circuits are provided a first number of times per second, said first number being between approximately 10 and approximately 200; and wherein the values of the phase output signals of the individual PLL circuits, the phase signal $\Phi_q$, and the phase correction signal $U_q$ are provided a second number of times per second, said second number being between approximately 200 and approximately 1,000.

53. A method of tracking a plurality N (N≧3) of satellite signals using a plurality M (M≧2) of antennas and a plurality K of individual phase-lock loop (PLL) circuits, said plurality K being greater than 3 and less than or equal to M*N, said antennas being disposed on an object, said method comprising the steps of:

(a) tracking, in each of said plurality K of PLL circuits, the carrier signal of a satellite signal as received by an antenna, each said PLL circuit having a corresponding reference carrier generator which generates a corresponding reference carrier signal, said reference carrier signal having a phase which is approximately equal to the phase of the satellite carrier signal as provided to the PLL circuit, each PLL circuit generating a phase output signal representative of the phase difference between the carrier signal of the satellite being tracked and the corresponding reference carrier signal, each PLL circuit using the output of one of said antennas;

(b) detecting a change in the position or directional orientation of the object within a selected coordinate system from the phase output signals of the individual PLL circuits;

(c) generating a correction signal ($W_K$) for each individual PLL circuit in relation to the detected change in the object's position and directional orientation; and (d) modifying the operation of each individual PLL circuit based on the value of the corresponding correction signal for it.

54. The method of claim 53 wherein there are a plurality of pseudo-ranges corresponding to the number of PLL circuits which are tracking satellite carrier signals, each pseudo-range being between a satellite whose carrier signal is being tracked by a corresponding PLL circuit and the antenna being used by the same PLL circuit, and wherein said step (b) comprises the steps of:

(e) grouping the phase output signals of said PLL circuits in the form of a first vector $E_P$ of signals; and (f) generating a second vector $V_C$ of signals representative of the matrix multiplication of a geometric pseudo-inverse matrix G' with said first vector $E_P$ of signals, said matrix G' comprising a pseudo-inverse matrix of a geometric Jacobian matrix H' for said plurality of pseudo-ranges or a pseudo-inverse of a complemented geometric Jacobian matrix $H_1$' for said plurality of pseudo-ranges, the matrix elements of said matrix H' or said matrix $H_1$' being representative of the changes in the pseudo-ranges that would be caused by changes in the position and directional orientation of the object within said selected coordinate system, said second vector $V_C$ of signals being representative of a change in the position and directional orientation of the object.

55. The method of claim 54 wherein said step (c) comprises the steps of:

(g) generating a third vector $U_C$ of control signals from said second vector $V_C$ of signals, each signal of said third vector $U_C$ being generated by filtering the corresponding signal of said second vector $V_C$;

(h) generating a fourth vector W of signals representative of the matrix multiplication of a geometric Jacobian matrix H' with the third vector $U_C$ of control signals, the matrix elements of said matrix H' being representative of the changes in the pseudo-ranges that would be caused by changes in the position and directional orientation of the object within said selected coordinate system, each said signal of said fourth vector W being one of said correction signals ($W_K$) for a respective PLL circuit.

56. The method of claim 55 wherein each individual PLL circuit further comprises a loop filter which has an input and which generates a PLL loop control signal ($U_k$) in response to a signal coupled to the loop filter's input, the signal coupled to the input of the loop filter being representative of the phase difference between the satellite carrier signal being tracked by the PLL circuit and the corresponding reference carrier signal of the PLL circuit;

wherein said step (a) comprises the step of varying the output phase of the reference carrier generator of each PLL circuit in response to its PLL loop control signal ($U_k$); and wherein said step (d) comprises the step of further varying the output phase of the reference carrier generator of each PLL circuit in response to the corresponding correction signal ($W_k$) for the PLL circuit.

57. The method of claim 56 wherein the reference carrier generator of said each PLL circuit comprises an input for receiving a control signal, and wherein said generator varies the phase of its output signal in response to the signal at its input, and wherein said step (d) further comprises the step of combining the corresponding correction signal ($W_k$) for each PLL circuit with the PLL loop control signal ($U_k$) of the PLL circuit to generate a combined control signal ($U_{T,K}$), and the step of providing said combined control signal to the input of the reference carrier generator of the PLL circuit.

58. The method of claim 57 wherein step (d) further comprises the step of further varying the output phase of the reference carrier generator of at least one PLL circuit in response to a signal reflective of the frequency Doppler-shift of the satellite signal being tracked by each said PLL circuit.

59. The method of claim 53 wherein there are a plurality of pseudo-ranges corresponding to the number of PLL circuits which are tracking satellite carrier signals, each pseudo-range being between a satellite whose carrier signal is being tracked by a corresponding PLL circuit and the antenna being used by the same PLL circuit, wherein each reference carrier generator generates its output from a main reference oscillator whose frequency may vary in time; and wherein said step (b) comprises the steps of:

(e) grouping the phase output signals of said PLL circuits in the form of a first vector $E_P$ of signals; and (f) generating a second vector $V_D$ of signals representative of the matrix multiplication of a geometric pseudo-inverse matrix G' with said first vector $E_P$ of signals, said matrix G' comprising a pseudo-inverse matrix of a complemented geometric Jacobian matrix $H_1$' for said plurality of pseudo-ranges, the matrix elements of said matrix $H_1$' being representative of the changes in the pseudo-ranges that would be caused by changes in the position and directional orientation of the object within said selected coordinate system and by changes in the oscillation frequency of the main reference oscillator, said second vector $V_D$ of signals having a sub-vector $V_C$ of signals representative of a change in the position and directional orientation of the object and a signal $\Phi_q$ representative of a change in the frequency of the main reference oscillator.

60. The method of claim 59 wherein said step (c) comprises the steps of:

(g) generating a third vector $U_C$ of control signals from the sub-vector $V_C$ of said second vector $V_D$ of signals, each signal of said third vector $U_C$ being generated by filtering the corresponding signal of the sub-vector $V_C$ said second vector $V_D$ of signals;

(h) generating a fourth vector W of signals representative of the matrix multiplication of a geometric Jacobian matrix H' with the third vector $U_C$ of control signals, the matrix elements of said matrix H' being representative of the changes in the pseudo-ranges that would be caused by changes in the position and directional orientation of the object within said selected coordinate system, each said signal of said fourth vector W being one of said correction signals ($W_K$) for a respective PLL circuit; and generating a phase correction signal $U_q$ by filtering the signal $\Phi_q$ of the second vector $V_D$ of signals.

61. The method of claim 60 further comprising the step of modifying the frequency of the main reference oscillator in response to said phase correction signal $U_q$.

62. The method of claim 60 wherein each individual PLL circuit further comprises a loop filter which has an input and which generates a PLL loop control signal ($U_k$) in response to a signal coupled to the loop filter's input, the signal coupled to the input of the loop filter being representative of the phase difference between the satellite carrier signal being tracked by the PLL circuit and the corresponding reference carrier signal of the PLL circuit;

wherein said step (a) comprises the step of varying the output phase of the reference carrier generator of each PLL circuit in response to its PLL loop control signal ($U_k$); and wherein said step (d) comprises the step of further varying the output phase of the reference carrier generator of each PLL circuit in response to the corresponding correction signal ($W_k$) for the PLL circuit.

63. The method of claim 62 wherein the reference carrier generator of each said PLL circuit comprises an input for receiving a control signal, and wherein said generator varies the phase of its output signal in response to the signal at its input, and wherein said step (d) further comprises the step of combining the corresponding correction signal ($W_k$) for each PLL circuit with the PLL loop control signal ($U_k$) of the PLL circuit to generate a combined control signal ($U_{T,K}$), and the step of providing said combined control signal to the input of the reference carrier generator of the PLL circuit.

64. The method of claim 55 further comprising the step of removing the phase output signal of a selected PLL circuit from the processing provided in steps (e)–(h), said removal step comprising the steps of:

removing the phase output signal of the selected PLL circuit from said first vector $E_P$ of signals;

forming a reduced matrix H' or a reduced matrix $H_1$' which has the matrix row corresponding to the phase output signal of said selected PLL circuit removed; and computing a replacement matrix G' from said reduced matrix H' or from said reduced matrix $H_1$'.

65. The method of claim 64 wherein updated matrix elements of matrices H' and G' are provided at selected time points, and wherein said step of removing the phase output signal of a selected PLL circuit occurs between said selected time points.

66. The method of claim 56 further comprising the step of removing the phase output signal of a selected PLL circuit from the processing provided in steps (e)–(h), said removal step comprising the steps of:

removing the phase output signal of the selected PLL circuit from said first vector $E_P$ of signals;

forming a reduced matrix H' or a reduced matrix $H_1$' which has the matrix row corresponding to the phase output signal of said selected PLL circuit removed; and computing a replacement matrix G' from said reduced matrix H' or from said reduced matrix $H_1$'.

67. The method of claim 66 wherein updated matrix elements of matrices H' and G' are provided at selected time points, and wherein said step of removing the phase output signal of a selected PLL circuit occurs between said selected time points.

68. The method of claim 66 further comprising the step of decoupling the signal going to the input of the PLL loop filter of the selected PLL circuit.

69. The method of claim 68 further comprising the step of re-introducing the phase output signal of said selected PLL circuit to the processing provided in steps (e)–(h), said re-introduction step comprising the steps of:

forming an augmented matrix H' or an augmented matrix $H_1$' which includes a matrix row corresponding to selected PLL circuit; and thereafter computing a replacement matrix G' from said augmented matrix H' or augmented matrix $H_1$';

thereafter providing the phase output signal of said selected PLL circuit to said first vector $E_P$ of signals;

thereafter waiting a period of time; and thereafter re-coupling the signal to the input of the PLL loop filter of the selected PLL circuit.

70. The method of claim 66 wherein the phase output signal of said selected PLL circuit is removed from said first vector $E_P$ of signals when the signal-to-noise ratio of the satellite signal being tracked by said selected circuit falls below a selected level.

71. The method of claim 55 wherein said step (g) comprises the step of filtering each signal of said second vector $V_C$ of signals with a filter structure which is equivalent to three parallel signal processing paths which receive the signal to be filtered and separately process the signal, the outputs of said paths being combined to provide the filtered output, said first path multiplying the signal by a first gain factor ($K_1$), said second path multiplying the signal by a second gain factor ($K_2$) and integrating the signal with one integrator, and said third path multiplying the signal by a third gain factor ($K_3$) and integrating the signal with two integrators.

72. The method of claim 56 wherein each individual PLL circuit further comprises a correlator which generates a correlation signal from the satellite carrier signal tracked by the PLL circuit and from the reference carrier signal of the PLL circuit, and a phase discriminator which generates an output signal in response to said correlation signal, the output signal of the phase discriminator being provided to the input of the loop filter and being representative of the phase difference between the satellite carrier signal being tracked by the PLL circuit and the corresponding reference carrier signal of the PLL circuit;

wherein the correlator, the phase discriminator, the loop filter, and the reference signal generator of each said PLL circuit collectively comprise a second-order feedback loop whose frequency response has a first bandwidth;

wherein processing steps included by steps (b)–(h) form a common vector tracking loop which conveys a vector feedback signal for each PLL circuit through the processing steps included by steps (b)–(h) and through the reference generator, correlator, and phase discriminator of the PLL circuit;

wherein the frequency response of the common vector tracking loop to changes in at least one of the coordinates of the antenna's position and orientation has a second bandwidth; and wherein said second bandwidth is greater than said first bandwidth.

73. The method of claim 72 wherein said step (g) comprises the step of filtering each signal of said second vector $V_C$ of signals with a filter structure which is equivalent to three parallel signal processing paths which receive the signal to be filtered and separately process the signal, the outputs of said paths being combined to provide the filtered output, said first path multiplying the signal by a first gain factor ($K_1$), said second path multiplying the signal by a second gain factor ($K_2$) and integrating the signal with one integrator, and said third path multiplying the signal by a third gain factor ($K_3$) and integrating the signal with two integrators.

74. The method of claim 72 wherein the said second bandwidth is greater than said first bandwidth by a factor which is between approximately 4 and approximately 20.

75. The method of claim 74 wherein said first bandwidth is between approximately 1 Hz and approximately 5 Hz.

76. The method of claim 75 wherein the loop control signals ($U_K$) of the individual PLL circuits are generated in digital form and the values thereof are provided a first number of times per second, said first number being between approximately 10 and approximately 200; and wherein the phase output signal of the individual PLL circuits, the signals vector $V_C$, the signals of vector $U_C$, and the signals of vector $W$ are generated in digital form and the values thereof are provided a second number of times per second, said second number being between approximately 200 and approximately 1,000.

77. The method of claim 72 wherein each said reference carrier signal is in quadrature format having an in-phase component and a quadrature-phase component;

wherein said step (a) comprises the step of generating a first correlation signal ($I_K$) in each PLL circuit, said first correlation signal ($I_K$) being generated in digital form and the values thereof are provided a first number of times per second, said step including the step of multiplying the satellite carrier signal being tracked by the PLL circuit by the in-phase component of the reference carrier signal of the PLL circuit, wherein there are N said first correlation signals (K=1 to K=N);

wherein said step (a) further comprises the step of generating a second correlation signal ($Q_K$) in each PLL circuit, said second correlation signal ($Q_K$) being generated in digital form and the values thereof are provided a second number of times per second, said step including the step of multiplying the satellite carrier signal being tracked by the PLL circuit by the quadrature component of the reference carrier signal of the PLL circuit, wherein there are N said second correlation signals (K=1 to K=N);

wherein step (a) further comprises the step of generating the phase output signals of each PLL circuit from the corresponding first and second correlation signals of the PLL circuit; and wherein the second number is greater than said first number, the values of the second correlation signals thereby being provided more frequently than the values said first correlation signals.

78. The method of claim 77 wherein step (a) further comprises the step of generating the phase output signal of a PLL circuit by the steps of: forming the reciprocal ($1/I_K$) of the current value of the first correlation signal ($I_K$), multiplying said reciprocal by the values of the second correlation signal ($Q_K$) until the value of said first correlation signal is next updated, and thereafter re-forming said reciprocal with the updated value of the first correlation signal ($I_K$).

79. The method of claim 31 further comprising the steps of:

receiving a frequency-shift signal $U_{\Delta\omega}$ representative of the frequency shift $\Delta\omega$ of the main reference oscillator relative to the global GPS reference frequency;

accumulating said frequency-shift signal $U_{\Delta\omega}$; and adding the accumulated frequency-shift signal to said phase correction signal Uq.

80. The method of claim 32 further comprising the steps of:

receiving a frequency-shift signal $U_{\Delta\omega}$ representative of the frequency shift $\Delta\omega$ of the main reference oscillator relative to the global GPS reference frequency;

accumulating said frequency-shift signal $U_{\Delta\omega}$; and adding the accumulated frequency-shift signal to said phase correction signal Uq.

81. A method of tracking a first plurality N (N≧3) of L1-band global positioning satellite signals received by an antenna from a set of selected satellites, and a second plurality M of L2-band global positioning satellite signals received by the antenna, each satellite signal having a carrier signal, and each L2 band satellite signal and a corresponding one of the L1-band satellite signals being transmitted from a common satellite, said method comprising the steps of:

(a) tracking the carrier signal of each of the L1-band satellite signals with an individual phase-lock loop (PLL) circuit having a corresponding reference carrier generator which generates a corresponding reference carrier signal, said reference carrier signal having a phase which is approximately equal to the phase of the L1-band satellite carrier signal as provided to the PLL circuit, each L1-band PLL circuit generating a phase output signal representative of the phase difference between the L1-band satellite carrier signal being tracked and the corresponding reference carrier signal, each L1-band PLL circuit further having a loop filter which has an input and which generates an L1-band PLL loop control signal $U_{K,L1}$ in response to a signal coupled to the loop filter's input, the signal coupled to the input of the loop filter being representative of the phase difference between the satellite carrier signal being tracked by the L1-band PLL circuit and the corresponding reference carrier signal of the L1-band PLL circuit;

(b) tracking the carrier signal of each L2-band satellite signal with an individual phase-lock loop circuit having a corresponding reference carrier generator which generates a corresponding reference carrier signal, said reference carrier signal having a phase which is approximately equal to the phase of the L2-band satellite carrier signal as provided to the L2-band PLL circuit, each L2-band PLL circuit generating a phase output signal representative of the phase difference between the L2-band satellite carrier signal being tracked and the corresponding reference carrier signal, each individual L2-band PLL circuit further having a loop filter which has an input and which generates an L2-band PLL loop control signal $U_{K,L2}$ in response to a signal coupled to the loop filter's input, the signal coupled to the input of the loop filter being representative of the phase difference between the L2-band satellite carrier signal being tracked by the L2-band PLL circuit and the corresponding reference carrier signal of the L2-band PLL circuit, said step (b) comprising the step of varying the output phase of the reference carrier generator of each L2-band PLL circuit in response to the loop control signal $U_{K,L2}$ of said L2-band PLL circuit;

(c) generating a correction signal for each L2-band PLL circuit from at least the L1-band PLL loop control signal $U_{K,L1}$ of the corresponding L1-band PLL circuit;

(d) further varying the output phase of the reference carrier generator of each L2-band PLL circuit in response to its correction signal;

(e) detecting a common phase shift in the phase output signals of the L2-band PLL circuits;

(f) generating an L2-band phase correction signal $Uq_{L2}$ in response to the detected common phase shift; and (g) further varying the output phase of the reference carrier generator of at least one L2-band PLL circuit in response to the value of said L2-band phase correction signal $Uq_{L2}$.

82. The method of claim 81 wherein each said reference carrier signal in each L2-band PLL circuit is in quadrature format having an in-phase component and a quadrature-phase component;

wherein said step (b) comprises the step of generating a first correlation signal $(I_K)$ in each L2-band PLL circuit, said step including the step of multiplying the satellite carrier signal being tracked by the L2-band PLL circuit by the in-phase component of the reference carrier signal of the L2-band PLL circuit, wherein there are M said first correlation signals (K=1 to K=M);

wherein said step (b) further comprises the step of generating a second correlation signal $(Q_K)$ in each L2-band PLL circuit, said step including the step of multiplying the satellite carrier signal being tracked by the L2-band PLL circuit by the quadrature component of the reference carrier signal of the L2-band PLL circuit, wherein there are M said second correlation signals (K=1 to K=M), the phase output signal of an L2-band PLL circuit comprising the second correlation signal of the L2-band PLL circuit;

wherein step (e) comprises the step of generating a plurality of product signals, each product signal being proportional to the multiplication product of the first and second correlation signals $(I_K, Q_K)$ of an L2-band PLL circuit, and the step of generating a common phase signal $\Phi_{q,L2}$ from a summation of said product signals, said phase signal $\Phi_{q,L2}$ being representative of the detected common phase shift.

83. The method of claim 82 wherein said phase signal $\Phi_{q,L2}$ is generated as a function of at least one of the forms of:

$$\left(\frac{\sum_{K=1}^{N} Q_K * I_K}{\sum_{K=1}^{N} I_K^2}\right), \left(\frac{\sum_{K=1}^{N} Q_K * I_K}{\left(\sum_{K=1}^{N} |I_K|\right)^2}\right), \arctan\left(\frac{\sum_{K=1}^{N} Q_K * I_K}{\sum_{K=1}^{N} I_K^2}\right),$$

and odd functions thereof.

84. An apparatus for tracking a plurality N of at least three global positioning satellite signals, each satellite signal having a carrier signal, said apparatus comprising:

a first plurality of K tracking channels, each tracking channel tracking a selected one of said N satellite signals, each said tracking channel having a phase-lock loop (PLL) circuit which tracks the phase of the carrier signal of the satellite signal being tracked by said channel, said phase-lock loop (PLL) circuit having a corresponding reference carrier generator which generates a corresponding reference carrier signal, said reference carrier signal having a phase which is approximately equal to the phase of the satellite carrier signal as provided to the PLL circuit, each PLL circuit generating a phase output signal representative of the phase difference between the satellite carrier signal being tracked and the corresponding reference carrier signal;

at least one common tracking loop responsive to the phase output signals of said plurality K of tracking channels which detects changes in the phase output signals which are caused by a common source, each said common tracking loop generating at least one correction signal; and wherein the operation of at least one PLL circuit is modified in response to said correction signal.

85. The apparatus of claim 84 wherein each reference carrier generator generates its output from a main reference oscillator whose frequency may vary in time;

wherein one of said common tracking loops detects changes in the frequency of said main reference oscillator during an interval of time and generates a phase correction signal $U_q$ in response to the detected change; and wherein the operation of at least one PLL circuit is modified by varying the output frequency of the main reference oscillator in response to said phase correction signal $U_q$.

86. The apparatus of claim 84 wherein each reference carrier generator generates its output from a main reference oscillator whose phase and frequency may vary in time;

wherein one of said common tracking loops detects changes in the frequency of said main reference oscillator during an interval of time and generates a phase correction signal $U_q$ in response to the detected change; and wherein the operation of at least one PLL circuit is modified by varying the output phase of its reference carrier generator in response to its PLL loop control signal $(U_k)$.

87. The apparatus of claim 84 wherein at least two common loops detect changes in the phase output signals which are caused by a change in the position of the antenna within a selected coordinate system, said common loops collectively generating a correction signal ($W_K$) for at least one individual PLL circuit in relation to the detected change in the antenna's position, and wherein the operation of at least one PLL circuit is modified by varying the output frequency of its reference carrier generator in response to the correction signal ($W_K$) for the individual PLL circuit.

88. The apparatus of claim 87 wherein there are a plurality of pseudo-ranges corresponding to the number of satellite carrier signals being tracked by the PLL circuits, each pseudo-range being between the satellite which transmits the satellite carrier signal and the antenna; and wherein said at least two common loops:

group the phase output signals of the PLL circuits in the form of a first vector $E_P$ of signals, generate a second vector $V_C$ of signals representative of the matrix multiplication of a geometric pseudo-inverse matrix G with said first vector $E_P$ of signals, said matrix G comprising a pseudo-inverse matrix of a geometric Jacobian matrix H for said plurality of pseudo-ranges or a pseudo-inverse of a complemented geometric Jacobian matrix $H_1$ for said plurality of pseudo-ranges, the matrix elements of said matrix H or said matrix $H_1$ being representative of the changes in the pseudo-ranges that would be caused by changes in the antenna's position in the selected coordinate system, said second vector $V_C$ of signals being representative of a change in the position of the antenna, generate a third vector $U_C$ of control signals from said second vector $V_C$ of signals, each signal of said third vector $U_C$ being generated by filtering a corresponding signal of said second vector $V_C$, and generate a fourth vector W of signals representative of the matrix multiplication of a geometric Jacobian matrix H with the third vector $U_C$ of control signals, each said signal of said fourth vector W being a correction signals ($W_K$) for a respective PLL circuit.

89. The apparatus of claim 84 wherein said apparatus tracking a plurality N (N≧3) of satellite signals using a plurality M (M≧2) of antennas and a plurality K of individual phase-lock loop (PLL) circuits, said plurality K being greater than 3 and less than or equal to M*N, said antennas being disposed on an object;

wherein each of said plurality K of PLL circuits uses the output of one of said antennas and tracks the carrier signal of a satellite signal as received by the antenna;

wherein at least two common loops detect changes in the phase output signals which are caused by a change in the position or directional orientation of the object within a selected coordinate system, said common loops collectively generating a correction signal ($W_K$) for at least one individual PLL circuit in relation to the detected change;

wherein the operation of at least one PLL circuit is modified by varying the output frequency of its reference carrier generator in response to the correction signal ($W_K$) for the individual PLL circuit;

wherein there are a plurality of pseudo-ranges corresponding to the number of PLL circuits which are tracking satellite carrier signals, each pseudo-range being between a satellite whose carrier signal is being tracked by a corresponding PLL circuit and the antenna being used by the same PLL circuit; and wherein said at least two common loops:

group the phase output signals of said PLL circuits in the form of a first vector $E_P$ of signals, generate a second vector $V_C$ of signals representative of the matrix multiplication of a geometric pseudo-inverse matrix G' with said first vector $E_P$ of signals, said matrix G' comprising a pseudo-inverse matrix of a geometric Jacobian matrix H' for said plurality of pseudo-ranges or a pseudo-inverse of a complemented geometric Jacobian matrix $H_1$' for said plurality of pseudo-ranges, the matrix elements of said matrix H' or said matrix $H_1$' being representative of the changes in the pseudo-ranges that would be caused by changes in the position and directional orientation of the object within said selected coordinate system, said second vector $V_C$ of signals being representative of a change in the position and directional orientation of the object, generating a third vector $U_C$ of control signals from said second vector $V_C$ of signals, each signal of said third vector $U_C$ being generated by filtering the corresponding signal of said second vector $V_C$, and generate a fourth vector W of signals representative of the matrix multiplication of a geometric Jacobian matrix H' with the third vector $U_C$ of control signals, the matrix elements of said matrix H' being representative of the changes in the pseudo-ranges that would be caused by changes in the position and directional orientation of the object within said selected coordinate system, each said signal of said fourth vector W being a correction signals ($W_K$) for a respective PLL circuit.

90. The apparatus of claim 84 wherein said plurality N of satellite signals comprise L1-band global positioning satellite signals which are received by an antenna from a set of selected satellites;

wherein said K tracking channels track corresponding ones of the L1-band global positioning satellite signals, wherein the PLL circuit of each tracking channels further has a loop filter which has an input and an output which generates an L1-band PLL loop control signal $U_{K,L1}$ in response to a signal coupled to the loop filter's input, the signal coupled to the input of the loop filter being representative of the phase difference between the Li-band satellite carrier signal being tracked by the PLL circuit and the corresponding reference carrier signal of the PLL circuit, wherein each said PLL circuit varies the output phase of its reference carrier generator in response to the loop control signal $U_{K,L1}$;

wherein said apparatus further receives a number of L2-band global positioning satellite signals transmitted from the set of selected satellites, each said L2-band satellite signal sharing a common satellite with a corresponding one of the L1-band satellite signals;

wherein said apparatus further comprises:

a number M of additional ones of said tracking channels for tracking a corresponding number M of the L2-band global positioning satellite signals, each PLL circuit of said additional tracking channels being referred to as an L2-band PLL circuit, each L2-band PLL circuit having a loop filter which has an input and an output which generates an L2-band PLL loop control signal $U_{K,L2}$ in response to a signal coupled to the loop filter's input, the signal coupled to the input of the loop filter being representative of the phase difference between the L2-band satellite carrier signal being tracked by the L2-band PLL circuit and the corresponding reference carrier signal of the PLL circuit, wherein each said L2-band PLL circuit varies the output phase of its reference carrier generator in response to the loop control signal $U_{K,L2}$;

a plurality M of generators which generate corresponding correction signals for the L2-band PLL circuits, the correction signal for each L2-band PLL circuit being generated in proportion to at least the L1-band PLL loop control signal $U_{K,L1}$ from a PLL circuit which is tracking the corresponding L1-band satellite signal, said correction signal being provided to the corresponding L2-band PLL circuit, and wherein said L2-band PLL circuit modifies the output phase of its the reference carrier generator in response to the correction signal; and one additional common tracking loop responsive to the phase output signals of said plurality M of tracking channels for the L2-band satellite signals, said additional common tracking loop detects a common phase shift in the phase output signals said plurality of M tracking channels and generates an L2-band phase correction signal $Uq_{L2}$ in response to the detected common phase shift, said additional common tracking loop further varies the output phase of the reference carrier generator of at least one L2-band PLL circuit in response to the value of said L2-band phase correction signal $Uq_{L2}$.

* * * * *